US009153031B2

(12) United States Patent
El-Saban et al.

(10) Patent No.: US 9,153,031 B2
(45) Date of Patent: Oct. 6, 2015

(54) MODIFYING VIDEO REGIONS USING MOBILE DEVICE INPUT

(75) Inventors: Motaz El-Saban, Cairo (EG); Ayman Kaheel, Bellevue, WA (US); Mohamed Shawky, Cairo (EG); James Kai Yu Lau, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1019 days.

(21) Appl. No.: 13/166,503

(22) Filed: Jun. 22, 2011

(65) Prior Publication Data

US 2012/0327172 A1 Dec. 27, 2012

(51) Int. Cl.
*H04N 7/14* (2006.01)
*G06T 7/00* (2006.01)
*G06K 9/00* (2006.01)
*G06K 9/22* (2006.01)

(52) U.S. Cl.
CPC .......... *G06T 7/0081* (2013.01); *G06K 9/00228* (2013.01); *G06K 9/00664* (2013.01); *G06K 9/228* (2013.01); *G06T 7/0087* (2013.01); *G06T 7/0093* (2013.01); *G06T 7/0097* (2013.01); *G06T 2207/10016* (2013.01); *G06T 2207/10024* (2013.01); *G06T 2207/20096* (2013.01); *G06T 2207/20104* (2013.01); *G06T 2207/20144* (2013.01); *G06T 2207/30201* (2013.01); *H04N 2007/145* (2013.01)

(58) Field of Classification Search
CPC ...................................................... H04N 7/14
USPC .......... 348/14.01, 14.02, 14.03, 14.08, 14.07, 348/14.12, 14.14, 14.15, 14.16
See application file for complete search history.

(56) References Cited

U.S. PATENT DOCUMENTS

| | | | |
|---|---|---|---|
| 5,638,136 A | 6/1997 | Kojima et al. |
| 5,764,306 A | 6/1998 | Steffano |
| 7,620,266 B2 | 11/2009 | Brown et al. |
| 7,720,283 B2 | 5/2010 | Sun et al. |
| 2002/0048401 A1 | 4/2002 | Boykov et al. |
| 2002/0191846 A1 | 12/2002 | Crinon et al. |
| 2003/0058939 A1 | 3/2003 | Lee et al. |
| 2004/0008886 A1 | 1/2004 | Boykov |

(Continued)

OTHER PUBLICATIONS

Anonymous, "Min-Cut Algorithm," http://www.me.utexas. edu/~bard/MIP/Handouts/Min-Cut Algorithm.pdf, 3 pp. (document not dated, downloaded on May 5, 2011).

(Continued)

*Primary Examiner* — Olisa Anwah
(74) *Attorney, Agent, or Firm* — Bryan Webster; Kate Drakos; Micky Minhas

(57) ABSTRACT

Apparatus and methods are disclosed for modifying video based on user input and or face detection data received with a mobile device to generate foreground regions (e.g., to separate a user image from background in the video). According to one disclosed embodiment, a method comprises receiving user input and/or face regions generated with a mobile device, producing an initial representation for segmenting input video into a plurality of portions based on the user input, where the initial representation includes probabilities for one or more regions of the input video being designated as foreground regions or background regions. Based on the initial representation, input video is segmented by designating one or more of the regions of the input video as foreground regions or background regions.

38 Claims, 23 Drawing Sheets

(56) References Cited

U.S. PATENT DOCUMENTS

| | | | |
|---|---|---|---|
| 2004/0032906 A1* | 2/2004 | Lillig | 375/240.08 |
| 2004/0228530 A1* | 11/2004 | Schwartz et al. | 382/173 |
| 2005/0033139 A1 | 2/2005 | Li et al. | |
| 2005/0162523 A1 | 7/2005 | Darrell et al. | |
| 2005/0169537 A1 | 8/2005 | Keramane | |
| 2005/0213837 A1 | 9/2005 | Boykov et al. | |
| 2005/0271273 A1 | 12/2005 | Blake et al. | |
| 2006/0039611 A1 | 2/2006 | Rother et al. | |
| 2006/0104542 A1 | 5/2006 | Blake et al. | |
| 2006/0192775 A1 | 8/2006 | Nicholson et al. | |
| 2006/0239553 A1 | 10/2006 | Florin et al. | |
| 2006/0285747 A1* | 12/2006 | Blake et al. | 382/180 |
| 2006/0291721 A1 | 12/2006 | Torr et al. | |
| 2007/0031037 A1 | 2/2007 | Blake et al. | |
| 2007/0091085 A1 | 4/2007 | Wang et al. | |
| 2007/0177817 A1 | 8/2007 | Szeliski et al. | |
| 2007/0216675 A1* | 9/2007 | Sun et al. | 345/419 |
| 2007/0286483 A1 | 12/2007 | Delong et al. | |
| 2007/0286520 A1* | 12/2007 | Zhang et al. | 382/264 |
| 2007/0292025 A1 | 12/2007 | Boykov et al. | |
| 2008/0069438 A1 | 3/2008 | Winn et al. | |
| 2008/0075361 A1 | 3/2008 | Winn et al. | |
| 2008/0077953 A1* | 3/2008 | Fernandez et al. | 725/32 |
| 2008/0215318 A1 | 9/2008 | Zhang et al. | |
| 2008/0303949 A1* | 12/2008 | Ciudad et al. | 348/586 |
| 2008/0310743 A1 | 12/2008 | Rother et al. | |
| 2008/0317331 A1 | 12/2008 | Winn et al. | |
| 2009/0074292 A1 | 3/2009 | Rother et al. | |
| 2009/0096808 A1 | 4/2009 | Winn et al. | |
| 2009/0154807 A1* | 6/2009 | Rossato et al. | 382/173 |
| 2009/0249387 A1 | 10/2009 | Magdy et al. | |
| 2009/0285544 A1 | 11/2009 | Fitzgibbon et al. | |
| 2009/0290795 A1 | 11/2009 | Criminisi et al. | |
| 2009/0315915 A1 | 12/2009 | Dunn et al. | |
| 2009/0322915 A1 | 12/2009 | Cutler | |
| 2010/0119147 A1 | 5/2010 | Blake et al. | |
| 2010/0128984 A1 | 5/2010 | Lempitsky et al. | |
| 2010/0171846 A1 | 7/2010 | Wood et al. | |
| 2010/0211918 A1 | 8/2010 | Liang et al. | |
| 2010/0214419 A1 | 8/2010 | Kaheel et al. | |
| 2010/0220921 A1 | 9/2010 | Blake et al. | |
| 2010/0272367 A1 | 10/2010 | Criminisi et al. | |
| 2010/0296571 A1 | 11/2010 | El-Saban et al. | |
| 2010/0302376 A1 | 12/2010 | Boulanger et al. | |
| 2010/0322525 A1 | 12/2010 | Kohli et al. | |
| 2011/0007933 A1 | 1/2011 | Lempitsky | |
| 2011/0038536 A1 | 2/2011 | Gong | |
| 2011/0064303 A1 | 3/2011 | Winn et al. | |
| 2011/0090303 A1* | 4/2011 | Wu et al. | 348/14.16 |
| 2011/0164823 A1* | 7/2011 | Park et al. | 382/173 |
| 2011/0216976 A1* | 9/2011 | Rother et al. | 382/173 |
| 2011/0254950 A1* | 10/2011 | Bibby et al. | 348/135 |
| 2011/0293247 A1* | 12/2011 | Bhagavathy et al. | 386/278 |
| 2012/0075331 A1* | 3/2012 | Mallick et al. | 345/594 |
| 2012/0227074 A1* | 9/2012 | Hill et al. | 725/61 |
| 2014/0055551 A1* | 2/2014 | Hong et al. | 348/14.01 |

OTHER PUBLICATIONS

Blake et al., "Interactive Image Segmentation Using an Adaptive GMMRF model," 14 pp. (also published as Blake et al., "Interactive Image Segmentation Using an Adaptive GMMRF model," *European Conference on Computer Vision* (ECCV), pp. 428-441 (2004)).

Boykov et al., "An Experimental Comparison of Min-Cut/Max-Flow Algorithms for Energy Minimization in Vision," *IEEE Transactions on Pattern Analysis and Machine Intelligence (PAMI)*, vol. 26, No. 9, pp. 1124-1137 (Sep. 2004).

Boykov et al., "Computing Geodesics and Minimal Surfaces via Graph Cuts," 8 pp. (also published as Boykov et al., "Computing Geodesics and Minimal Surfaces via Graph Cuts," *Int'l Conf. on Computer Vision*, Nice, France, pp. 1-8 (Oct. 2003)).

Boykov et al., "Fast Approximate Energy Minimization via Graph Cuts," *IEEE Transactions on PAMI*, vol. 23, No. 11, pp. 1222-1239 (2001).

Boykov et al., "Graph Cuts and Efficient N-D Image Segmentation," *Int'l Journal of Computer Vision*, vol. 70, No. 2, pp. 109-131 (2006).

Boykov et al., "Interactive Graph Cuts for Optimal Boundary & Region Segmentation of Objects in N-D Images," *Proc. of Int'l Conf. on Computer Vision*, Vancouver, Canada, vol. 1, pp. 105-112 (Jul. 2001).

Chan et al., "Active Contours without Edges for Vector-Valued Images," *Journal of Visual Communication and Image Representation*, vol. 11, pp. 130-141 (2000).

Criminisi et al., "Bilayer Segmentation of Live Video," 8 pp. (also published as *IEEE Computer Society Conf. on Computer Vision and Pattern Recognition*, (CVPR '06), pp. 53-60 (2006)).

Criminisi et al., "GeoS: Geodesic Image Segmentation," *European Conference on Computer Vision* (ECCV 2008), Lecture Notes on Computer Science, vol. 5302, Part I, pp. 99-112 (2008).

Duda et al., "Linear Discriminant Functions," in Pattern Classification, Ch. 5, 71 pp. (2d ed., preliminary version, Sep. 3, 1997).

El-Saban et al., "Fast Stitching of Videos Captured from Freely Moving Devices by Exploiting Temporal Redundancy," *Proceedings of the 2010 IEEE 17th Int'l Conf. on Image Processing* (ICIP), pp. 1193-1196 (2010).

El-Saban et al., "Stitching Videos Streamed by Mobile Phones in Real-time," *ACM Multimedia 2009*, 2 pp. (Oct. 2009).

Fulkerson et al., "Class Segmentation and Object Localization with Superpixel Neighborhoods," 8 pp. (also published as *IEEE 12th Int'l Conf. on Computer Vision*, pp. 670-677 (2009)).

Ibrahim et al., "Higher Order Potentials with Superpixel Neighbourhood (HSN) for Semantic Image Segmentation," 4 pp. (document not dated, downloaded on Jun. 15, 2011).

Ibrahim, "ResearchGate," downloaded from http://researchgate.net/profile/Mostafa_Ibrahim3/, 2 pp. (document not dated, downloaded on May 10, 2011).

Jepson et al., "Image Segmentation," downloaded from http://www.cs.toronto.edu/~jepson/csc2503/segmentation.pdf, pp. 1-32 (document marked 2004).

Johnson et al., "Optimization by Simulated Annealing: An Experimental Evaluation; Part I, Graph Partitioning," *Operations Research*, vol. 37, No. 6, pp. 865-891 (1989).

Johnson et al., "Optimization by Simulated Annealing: An Experimental Evaluation; Part II, Graph Coloring and Number Partitioning," *Operations Research*, vol. 39, No. 3, pp. 378-406 (1991).

Kaheel, et al., "Mobicast: A system for collaborative event casting using mobile phones," 8 pp. (also published as Kaheel, et al., "Mobicast: A system for collaborative event casting using mobile phones," *ACM Mobile and Ubiquitous Multimedia* (MUM '09), 8 pp. (Nov. 2009)).

Kernighan et al., "An Efficient Heuristic Procedure for Partitioning Graphs," *Bell Systems Tech. Journal*, vol. 49, No. 2, pp. 291-307 (1970).

Kirkpatrick et al., "Optimization by Simulated Annealing," *Science*, vol. 220, No. 4598, pp. 671-680 (1983).

Kohli et al., "Dynamic Graph Cuts and Their Applications in Computer Vision," *Computer Vision*, SCI 285, pp. 51-108 (2010).

Kohli et al., "Dynamic Graph Cuts for Efficient Inference in Markov Random Fields," 11 pp. (also published as Kohli et al., "Dynamic Graph Cuts for Efficient Inference in Markov Random Fields," *Pattern Analysis and Machine Intelligence, IEEE Transactions*, vol. 29, Issue 12, pp. 2079-2088 (2007)).

Kohli et al., "Efficiently Solving Dynamic Markov Random Fields using Graph Cuts," 8 pp. (also published as Kohli et al., "Efficiently Solving Dynamic Markov Random Fields using Graph Cuts," *Proc. of the Tenth Int'l Conf. on Computer Vision*, pp. 922-929 (2005)).

Lempitsky et al., "Image Segmentation by Branch-and-Mincut," downloaded from http://research.microsoft.com/apps/pubs/default.aspx?id=77292, 14 pp. (also published as Lempitsky et al., "Image Segmentation by Branch-and-Mincut," *European Conference on Computer Vision* (ECCV) (2008)).

Lempitsky et al., "Image Segmentation by Branch-and-Mincut [slide presentation]," downloaded from http://research.microsoft.com/en-us/um/people/carrot/presentations/eccv08.ppt, 18 pp. (also published as Lempitsky et al., Microsoft Research Cambridge, "Image Segmentation by Branch-and-Mincut," *European Conference on Computer Vision* (ECCV), 18 pp. (2008)).

(56) References Cited

OTHER PUBLICATIONS

Lempitsky et al., "Image Segmentation with a Bounding Box Prior," *ICCV 2009*, downloaded from http://research.microsoft.com/pubs/81800/iccv2009.pdf, 8 pp. (2009).

Lempitsky et al., "Image Segmentation with a Bounding Box Prior," Technical Report, downloaded from http://research.microsoft.com/pubs/81800/iccv2009TR.pdf, 11 pp. (2009).

Levine, "Experimental Study of Minimum Cut Algorithms," Thesis, Massachusetts Institute of Technology, 126 pp. (1997).

Mathieu, "Min Cut Algorithm," downloaded from http://www.cs.brown.edu/courses/cs295-4/mincut.pdf, 1 page (document not dated, document downloaded May 5, 2011).

Microsoft Corporation, "Microsoft's Latest LifeCams Bring Life to Video Calls With Versatile New Designs," downloaded from http://www.microsoft.com/presspass/press/2008/sep08/09-09ShowMogu1PR.mspx, 3 pages (document marked Sep. 9, 2008, document downloaded May 24, 2011).

Microsoft Corporation, "Using the LifeCam Dashboard," downloaded from http://download.microsoft.com/download/6/7/6/676E0E40-A3E0-498F-AE82-4EBFB8024EBA/How%20to%20Use%20the%20LifeCam%20Dashboard.docx, 3 pages (document not dated, document downloaded May 24, 2011).

Microsoft Corporation, "Things to Try When Reviewing the Microsoft LifeCam VX-5000," downloaded from http://download.microsoft.com/download/f/8/3/f831dba8-b7f5-420c-beec-deab96944270/VX5000RG_Things%20to%20Try_HL2.pdf, 5 pp. (document not dated, document downloaded May 24, 2011).

Rother et al., "GrabCut—Interactive Foreground Extraction using Iterated Graph Cuts," downloaded from http://research.microsoft.com/apps/pubs/default.aspx?id=67890, 6 pp. (also published as Rother et al., "GrabCut—Interactive Foreground Extraction using Iterated Graph Cuts," *ACM Transactions on Graphics* (*SIGGRAPH '04*), vol. 23, No. 3, pp. 307-312 (2004)).

Rother et al., "Interactive Foreground Extraction using Graph Cut," *Microsoft Technical Report: MSR-TR-2011-46*, downloaded from http://research.microsoft.com/pubs/147408/RotherEtA1MRFBook-GrabCut.pdf, 20 pp. (Mar. 2011).

Saha et al., "Fast Incremental Minimum-Cut Based Algorithm for Graph Clustering," 12 pp. (also published as Saha et al., "Fast Incremental Minimum-Cut Based Algorithm for Graph Clustering," *Proc. SIAM Conference on Data Mining* (SDM '07) (2007)).

Shi et al., "Tutorial Graph Based Image Segmentation," downloaded from http://www.cis.upenn.edu/~jshi/GraphTutorial/Tutorial-ImageSegmentationGraph-cut1-Shi.pdf, 38 pp. (document not dated, downloaded on May 3, 2011).

Stoer et al., "A Simple Min-Cut Algorithm," *Journal of the ACM*, vol. 44, No. 4, pp. 585-591 (1997).

Szeliski et al., "A Comparative Study of Energy Minimization Methods for Markov Random Fields," 14 pp. (also published as Szeliski et al., "A Comparative Study of Energy Minimization Methods for Markov Random Fields," *Ninth European Conference on Computer Vision* (ECCV 2006), vol. 2, pp. 16-29 (2006)).

Szeliski et al., "A Comparative Study of Energy Minimization Methods for Markov Random Fields with Smoothness-Based Priors," *IEEE Transactions on Pattern Analysis and Machine Intelligence* (*PAMI*), vol. 30, No. 6, pp. 1068-1080 (2008).

Vedaldi et al., "Quick Shift and Kernel Methods for Mode Seeking," 14 pp. (also published as "Quick Shift and Kernel Methods for Mode Seeking," *Science*, vol. 5305, pp. 705-771 (2008)).

Vicente et al., "Graph Cut Based Image Segmentation with Connectivity Priors," 8 pp. (also published as Vicente et al., "Graph Cut Based Image Segmentation with Connectivity Priors," *IEEE Conf. on Computer Vision and Pattern Recognition 2008* (*CVPR 2008*) pp. 1-8 (2008)).

Viola et al., "Multiple Instance Boosting for Object Detection," 8 pp. (also published as Viola et al., "Multiple Instance Boosting for Object Detection," *Proceedings of the Twentieth Annual Conference on Neural Information Processing Systems* (*NIPS 18*), pp. 1419-1426 (2006).

Viola et al., "Robust Real-time Object Detection," *Second Int'l Workshop on Statistical and Computational Theories of Vision—Modeling, Learning, Computing, and Sampling*, Vancouver, Canada, pp. 1-25 (2001).

Yeh et al., "A Picture is Worth a Thousand Keywords: Image-Based Object Search on a Mobile Platform," *CHI 2005*, Portland, Oregon, pp. 1-4 (2004).

Zhang et al., "A Survey of Recent Advances in Face Detection," *Microsoft Research Technical Report MSR-TR-2010-66*, 17 pp. (Jun. 2010).

Zhang et al., "Multi-view video based multiple objects segmentation using graph cut and spatiotemporal projections," *Journal of Visual Communications and Image Representation*, vol. 21, pp. 453-461 (2010).

Agarwala, "Efficient Gradient-Domain Compositing Using Quadtrees," *ACM Transactions on Graphics* (*Proceedings of SIGGRAPH 2007*), 26(3), 94:1-94:5, 2007.

Agarwala et al., "Interactive Digital Photomontage," *ACM Transactions on Graphics* (*Proceedings of SIGGRAPH 2004*), vol. 23, Issue 3, Aug. 2004.

Bay et al., "SURF: Speeded Up Robust Features," *European Conference on Computer Vision*, vol. 3951, pp. 404-417, 2006.

Brown et al., "Automatic Panoramic Image Stitching using Invariant Features," *International Journal of Computer Vision*, vol. 74, Issue 1, 16 pages, Aug. 2007.

Burt et al., "A Multiresolution Spline With Application to Image Mosaics," *ACM Transactions on Graphics*, vol. 2, Issue 4, 20 pages, Oct. 1983.

Carreira et al., "Constrained Parametric Min-Cuts for Automatic Object Segmentation," *2010 IEEE Conference on Computer Vision and Pattern Recognition*, pp. 3241-3248, Jun. 2010.

Comaniciu et al., "Mean Shift: A Robust Approach Toward Feature Space Analysis," *IEEE Transactions on Pattern Analysis and Machine Intelligence*, vol. 24, Issue 5, pp. 603-619, May 2002.

Doutre et al., "Fast Vignetting Correction and Color Matching for Panoramic Image Stitching", *2009 16th IEEE International Conference on Image Processing* (*ICIP*), pp. 709-712, Nov. 2009.

El-Saban et al., "Improved Optimal Seam Selection Blending for Fast Video Stitching of Videos Captured from Freely Moving Devices," *2011 18th IEEE International Conference on Image Processing* (*ICIP*), pp. 1481-1484, Sep. 2011.

Everingham et al, "The PASCAL Visual Object Classes 2006 (VOC2006) Challenge," *International Journal of Computer Vision*, 57 pages, Sep. 2006.

Felzenszwalb et al., "Efficient Graph Based Image Segmentation," *International Journal of Computer Vision*, vol. 59, Issue 2, 16 pages, Sep. 2004.

Gonfaus et al., "Harmony Potentials for Joint Classification and Segmentation," *2010 IEEE Conference on Computer Vision and Pattern Recognition* (*CVPR*), pp. 3280-3287, Jun. 2010.

Ibrahim et al, "Higher order Potentials with Superpixel Neighbourhood (HSN) for Semantic Image Segmentation," *IEEE International Conference on Image Processing* (*ICIP*), pp. 2881-2884, Sep. 2011.

Kohli et al., "Robust Higher Order Potentials for Enforcing Label Consistency," *IEEE Conference on Computer Vision and Pattern Recognition*, 8 pages, Jun. 2008.

Kopf et al., "Capturing and Viewing Gigapixel Images," *ACM Transactions on Graphics* (*Proceedings of ACM SIGGRAPH 2007*), vol. 26, No. 3, 10 pages, Aug. 2007.

kolor Blog, http://www.kolor.com/blog-en/tag/video-stitching/, 2 pages, Aug. 10, 2011.

"Kolor experiments video stitching," http://www.kolor.com/blog-en/2008/09/10/kolor-experiments-video-stitching/, 3 pages, Sep. 10, 2008.

Ladický et al., "Associative Hierarchical CRFs for Object Class Image Segmentation," *IEEE 12th International Conference on Computer Vision*, pp. 739-746, Sep.-Oct. 2009.

Lafferty et al., "Conditional Random Fields: Probabilistic Models for Segmenting and Labeling Sequence Data," *2001 Proceedings of the Eighteenth International Conference on Machine Learning* (*ICML*), 8 pages, Jun.-Jul. 2001.

(56) References Cited

OTHER PUBLICATIONS

Lowe, "Distinctive Image Features from Scale-Invariant Keypoints," *International Journal of Computer Vision (IJCV)*, vol. 60, Issue 2, 28 pages, Nov. 2004.

Mikolajczyk et al., "A Performance evaluation of local descriptors," *IEEE Transactions on Pattern Analysis and Machine Intelligence*, vol. 27, Issue 10, pp. 1615-1630, Oct. 2005.

Mills et al., "Image stitching with dynamic elements," *Image and Vision Computing*, vol. 27, Issue 10, 10 pages, Sep. 2009.

Mills, "Simple Network Time Protocol (SNTP), Version 4 for IPv4 and IPv6 and OSI," *RFC 2030 The Internet Engineering Task Force*, 19 pages. Oct. 1996.

MindTree, http://www.slideshare.net/MindTreeLtd/mindtree-video-analytics-suite-real-time-image-stitching-1135870, 2 pages, Mar. 2009.

Paalanen et al., "Image Based Quantitative Mosaic Evaluation with Artificial Video," *Lappeenranta University of Technology*, Research Report 106, 2007.

Pantofaru et al., "Object Recognition by Integrating Multiple Image Segmentations," *European Conference on Computer Vision*, vol. 5304, pp. 481-494, Oct. 2008.

Pérez et al., Poisson Image Editing, *ACM Transactions on Graphics (TOG)- Proceedings of ACM SIGGRAPH 2003*, vol. 22, Issue 3, 6 pages, Jul. 2003.

Shimizu et al., "A Fast Video Stitching Method for Motion-Compensated Frames in Compressed Video Streams," *International Conference on Consumer Electronics (ICCE '06)*, pp. 173-174, Jan. 2006.

Shotton et al., "Semantic Texton Forests for Image Categorization and Segmentation," *IEEE Conference on Computer Vision and Pattern Recognition (CVPR 2008)*, 8 pages, Jun. 2008.

Shotton et al., "TextonBoost for Image Understanding: Multiclass Object Recognition and Segmentation by Jointly Modeling Texture, Layout, and Context," *International Journal of Computer Vision*, vol. 81, Issue 1, pp. 2-23, Jan. 2009.

Szeliski, "Image Alignment and Stitching: A Tutorial," MSR Tech Report, 89 pages (last updated Dec. 2006).

Tian et al., "Colour correction for panoramic imaging", *Proceedings of the Sixth International Conference on Information Visualization*, pp. 483-488, Jul. 2002.

Uyttendaele et al., "Eliminating Ghosting and Exposure Artifacts in Image Mosaics," *2001 IEEE Computer Society Conference on Computer Vision and Pattern Recognition (CVPR 2001)*, pp. 509-516, Dec. 2001.

Zeng et al., "Depth Adaptive Video Stitching," *Eighth IEEE/ACIS International Conference on Computer and Information Science*, pp. 1100-1105, Jun. 2009.

Zhao, "Flexible Image Blending for Image Mosaicing with Reduced Artifacts," *International Journal of Pattern Recognition and Artificial Intelligence*, pp. 609-628, 2006.

\* cited by examiner

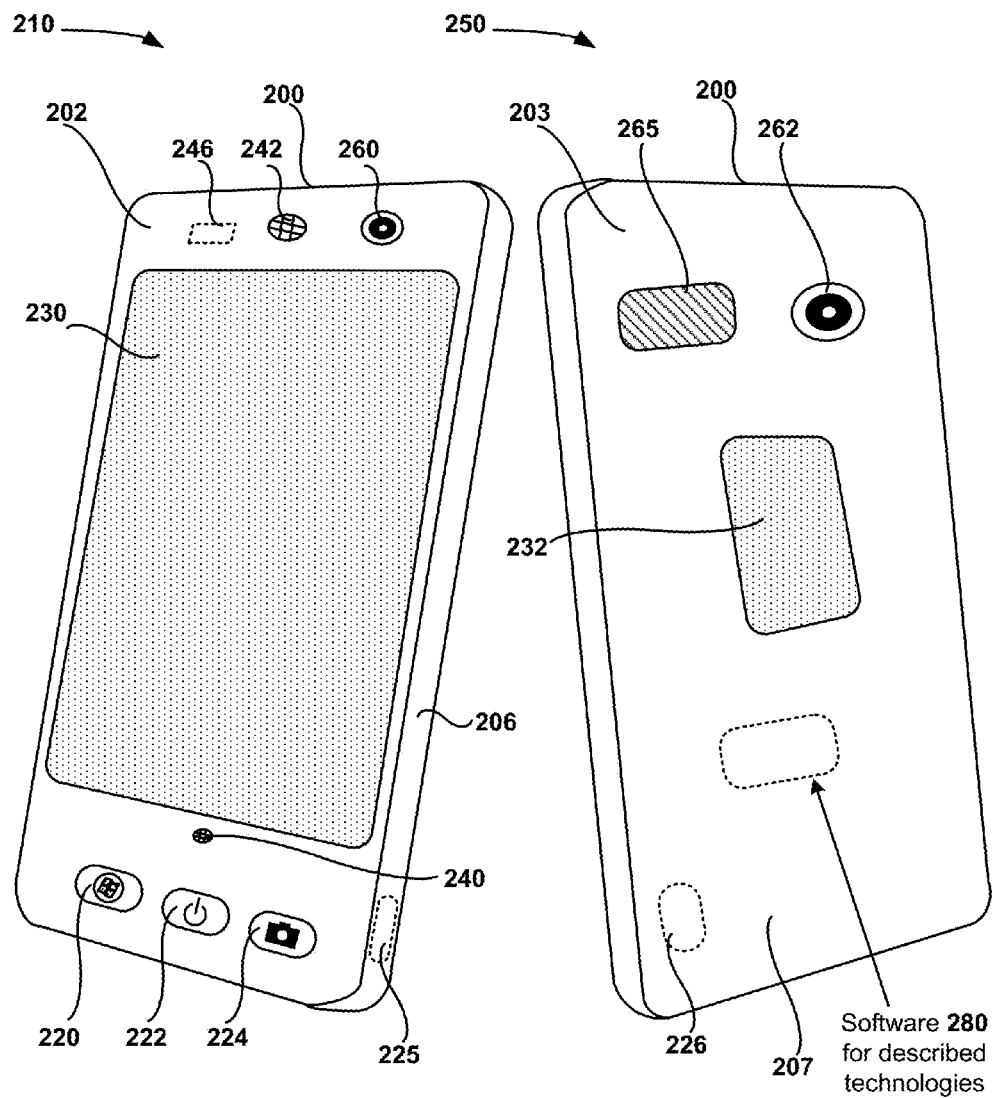

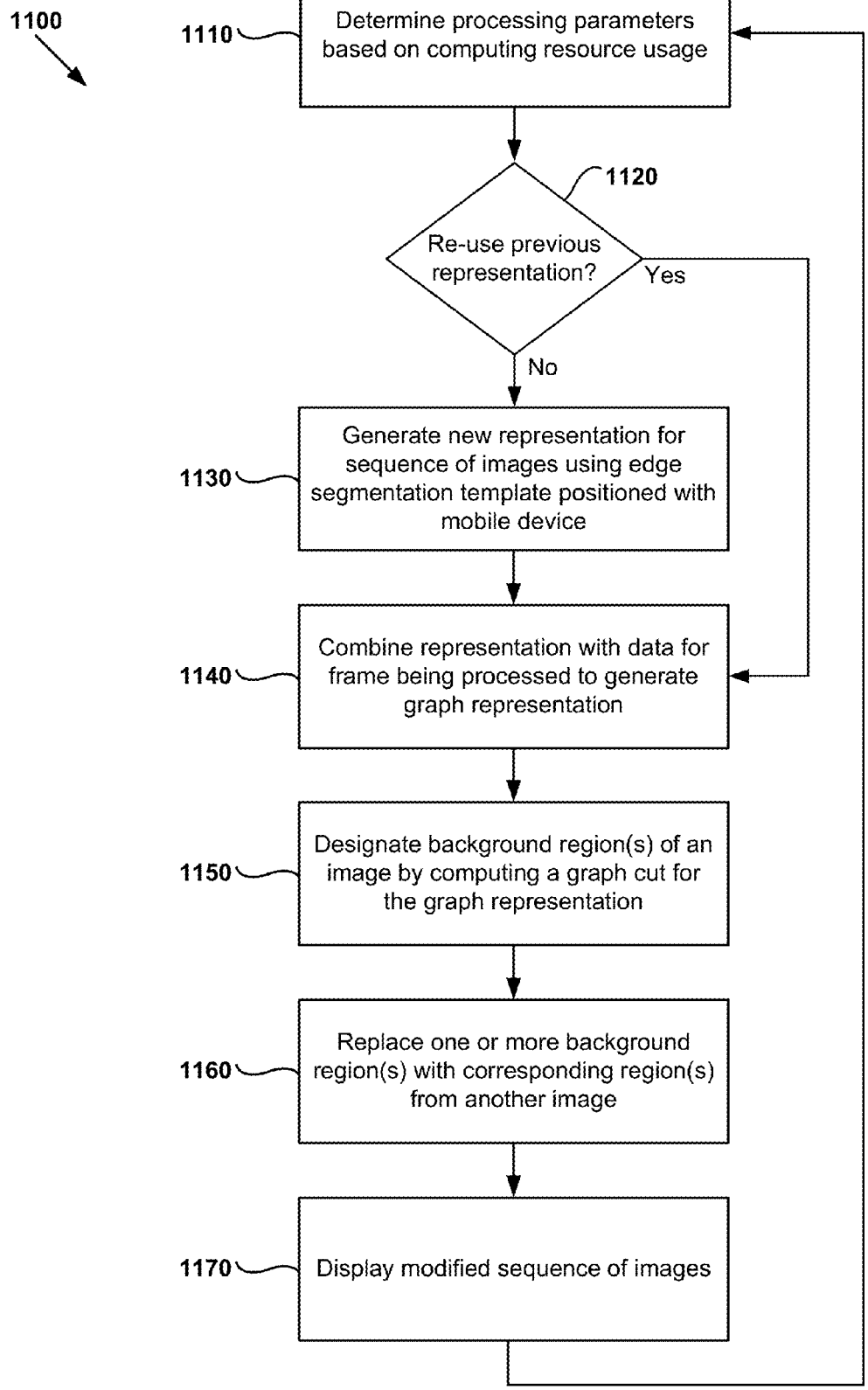

MODIFYING VIDEO REGIONS USING MOBILE DEVICE INPUT

FIELD

The present disclosure pertains to devices and methods for modifying video data based on user input and/or face detection.

BACKGROUND

With the increasing popularity of mobile devices having image-capture functionality, including cellphone devices, handheld devices, handheld computers, smartphones, and PDAs, there is a need for improving the user experience. Modern mobile devices typically include the capability to capture and transmit video over a computer network in real time.

Mobile device applications, such as video chat applications, include the transmission and/or recording of video using a video camera coupled to the mobile device. Modifying image regions in video captured utilizing hand-held mobile devices presents challenges not addressed by existing techniques.

Therefore, there exists ample opportunity for improvement in technologies to allow mobile users use of improved video applications in the mobile domain.

SUMMARY

Apparatus, computer-readable storage media, and methods are disclosed for modifying input video data based on user input and/or face detection regions received using a mobile device.

Image processing in video applications presents several issues when implemented in the mobile domain. In particular, mobile devices tend to have less processing power and are frequently battery-powered. Further, video applications for mobile devices deal with issues including camera motion, subject motion, and illumination changes that are often more severe than those encountered with more traditional video applications, especially mobile device video applications executing in real time.

Processing video to hide, replace, or blur background regions can be desirable for a number of reasons. For example, a mobile device user may want to preserve privacy and not reveal the background where the user is located when sending video to other users. Further, some background regions, such as offices, tend to be mundane. Hence, the bandwidth and processing power consumed in transmitting background video is often of low value. Further, removing background regions from video before transmission can be used to reduce the transmission bandwidth used, as well as facilitate combining video with other video sources. Further, replacing mundane backgrounds with a more interesting background, such as images or videos of famous places, text information from documents related to a video conferencing session, or humorous, interesting, or otherwise desirable backgrounds can enhance video communication applications and user experiences.

In some examples of the disclosed technology, a method includes automatically and accurately replacing background regions in a source video using a real-time background/foreground separation technique implemented locally on the mobile device (e.g., a smart phone or tablet computer). The background/foreground segmentation disclosed herein can be used for hiding, replacing, and/or blurring background regions in real time during a video call.

In some examples of the disclosed technology, a method includes receiving input generated with a mobile device for positioning an edge segmentation template, producing an initial representation for segmenting input video into a plurality of portions, where the initial representation is based on the positioned edge segmentation template and includes weights for one or more regions of the input video to be designated as foreground regions or background regions, and based on the initial representation, segmenting the input video by designating one or more of the portions of the input video as foreground regions or background regions. In some examples, input for positioning the edge segmentation template is generated based on user input received with a mobile device and/or face detection based on the input video.

In some examples of the disclosed technology, a method of designating background regions in a first image selected from a sequence of images includes generating one or more energy terms for the first image based on an edge segmentation template positioned using a mobile device, based on the energy terms, designating one or more regions of the first image as background regions, and replacing one or more of the designated background regions of the image with corresponding regions from a different image or video than the first image to produce a modified sequence of images. In some examples, a modified sequence of images includes one or more regions of the image designated as foreground portions displaying the modified sequence of images on a display coupled to the mobile device. In some examples, the modified sequence of images is transmitted to another computer or device as part of a video call application.

In some examples of the disclosed technology, a mobile device includes a video camera operable to produce input video, a touch screen display for receiving touch screen input and displaying video, a processor coupled to the video camera and the touch screen display, a communication interface coupled to the processor; and one or more computer-readable storage media storing computer-readable instructions executable by the at least one processor for transmitting modified video based on the input video. In some examples, the computer-readable instructions include instructions for receiving touch screen input from the touch screen display and designating one or more regions of the input video based on the touch screen input, instructions for designating one or more regions of a portion of the input video using a representation of a conditional random field (CRF), instructions for replacing one or more of the designated regions in the input video with corresponding regions from a second image or video to produce the modified video based at least in part on the designated regions, and instructions for transmitting the modified video using the communication interface.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

The foregoing and other objects, features, and advantages of the disclosed technology will become more apparent from the following detailed description, which proceeds with reference to the accompanying figures.

BRIEF DESCRIPTION OF THE DRAWINGS

FIGS. 2A and 2B illustrate a generalized example of a mobile device, including a touch screen display and video camera.

FIG. 11 is a flow chart that further details the exemplary implementation illustrated in FIG. 9.

FIGS. 13A-D illustrate a generalized example of a representation for designating foreground and background regions of an image based on combining representations of user input and previous frame data.

DETAILED DESCRIPTION

Introduction

Figure 1:
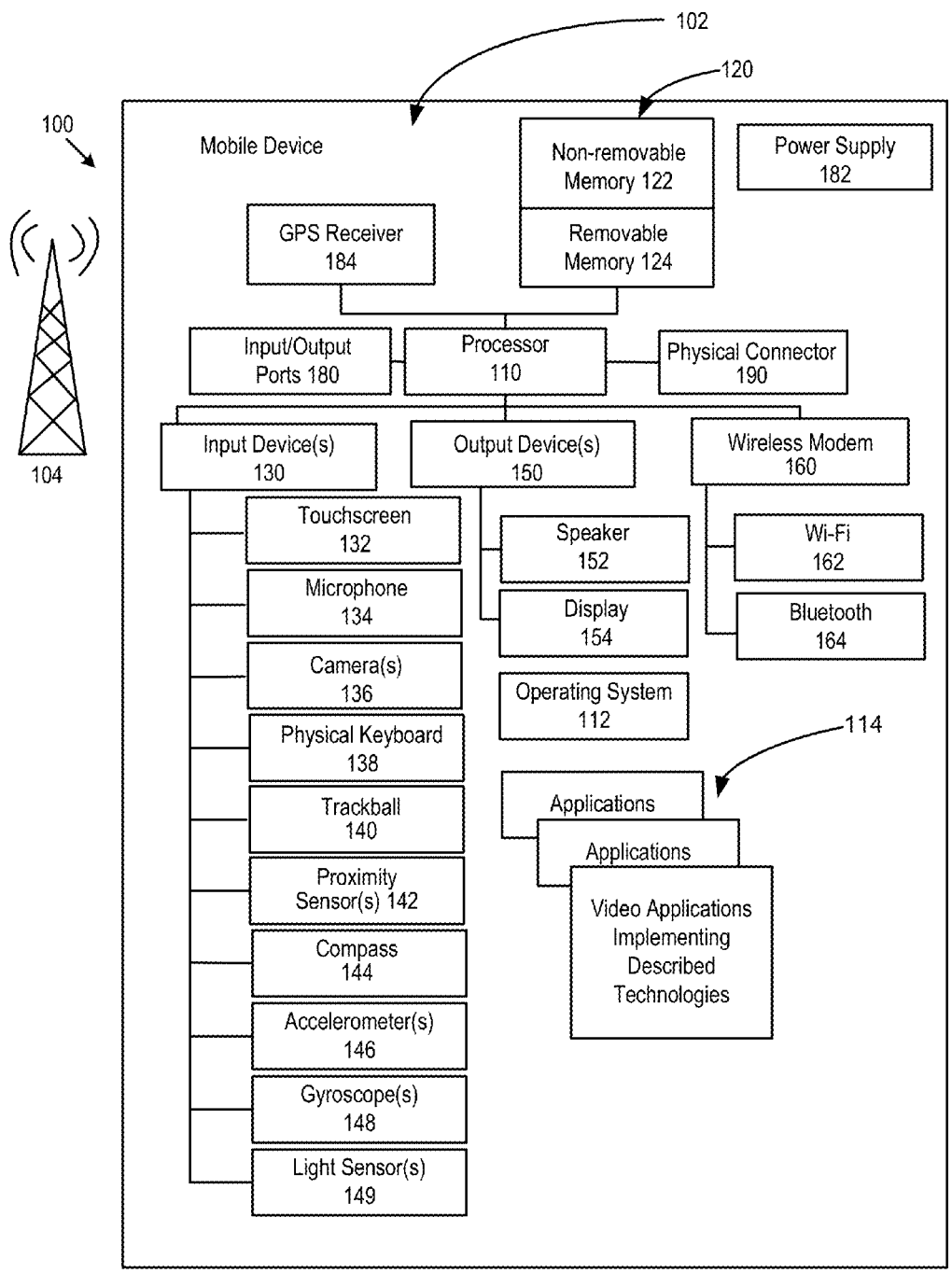
FIG. 1 is a block diagram illustrating a mobile device for an exemplary embodiment of the disclosed technology, including a touch screen and computer-readable storage media.

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and method. Additionally, the description sometimes uses terms like "produce," "generate," "display," "receive," "designate," "replace," and "provide" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In the following description, certain terms may be used such as "up," "down," "upper," "lower," "horizontal," "vertical," "left," "right," "over," "on," "near," and the like. These terms are used, where applicable, to provide some clarity of description when dealing with relative relationships. But, these terms are not intended to imply absolute relationships, positions, and/or orientations.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Adobe Flash, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Techniques for background/foreground segmentation can be based on Conditional Random Fields (CRFs). Generally speaking, CRF techniques can be used to model image or video pixels as random variables taking on possible labels based on observed quantities. CRFs are a form of a probabilistic graphical models, where nodes are pixels and edge weights are based on measurable image or video features. By modeling an image or video as a CRF, an energy function can be then formulated which takes on different values for various possible labelings of an image/video. For example, in a binary image segmentation problem, the possible labels that a pixel can take are either 0 or 1, yielding to a total number of $2^{W \times H}$ possible configurations for the whole image, where W, H are image width and height, respectively. A minimum energy configuration is sought to estimate an optimal segmentation. Searching for a minimum energy configuration is a combinatorial problem that is typically NP-hard. Exact and approximate solutions can be found using techniques such as min-cut. The CRF techniques disclosed herein can use a number of terms to formulate an energy function, including spatial (e.g., using Ising prior) data and temporal data (e.g., using second-order Markov chains to impose temporal continuity of foreground and/or background labels) based on previous frames in a sequence of images. Other CRF techniques include the use of motion probabilities based on background stability and foreground motion and color probabilities. Optimization techniques that can be applied include the use of dynamic graph cuts that reuse at least a portion of a previous graph cut solution, avoid reconstruction of an entire graph for a frame, and the use of face detection techniques to automatically adjust an initial representation of input video.

In some examples, other techniques can be used to build representations used to model images besides CRF techniques. In some examples, an explicit representation is not built, instead a threshold value is used to segment an image or video into multiple regions. As will be readily understood by one of ordinary skill in the art, selection of appropriate image modeling techniques can be selected based on computing resource availability, or other suitable design factors.

In some examples, a video frame is represented by a graph having weighted edges and node values that is manipulated to automatically determine foreground and background region(s) of the video frame. User input, previous frame representations, and/or face detection can be used to create a representation with values designating portions of the frame as foreground and/or background regions. These representations can be used to accelerate and/or improve quality when computing foreground regions (also called object regions) and background regions in comparison to approaches that compute these regions using only an image (e.g., approaches that do not use user input and/or face detection). In some examples, the use of image representations based on user input and/or face detection allows an edge segmentation solution to be computed using even fewer computing resources. In some examples, superpixels that combine information from multiple pixels are used to reduce the computational complexity of image segmentation, thereby using fewer computing resources. After background regions are detected, they can be replaced with corresponding regions from another image before transmitting modified video to another device (e.g., a device receiving video transmissions during a video chat or call).

The disclosed background detection techniques can be combined with the user interface of a mobile device. For example, a user interface allows a user to select what to replace input video background regions with: a uniform color or pattern, a static image, or a dynamic image (e.g., video). In some examples, the user interface concurrently displays an image of the user showing the real background (e.g., input video) and the replaced one (e.g., modified video), so that the mobile device user can observe what modified video will be displayed to a receiving viewer. In some examples, the user interface allows confirmation of a selected face detection region and/or template position.

Example Mobile Device Configuration

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), or tablet computers) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114, including video applications implementing the technologies described herein. The application programs can include common mobile computing applications (e.g., web browsers, video chat, and video messaging applications), or any other suitable computing application.

The illustrated mobile device 100 can include memory 120. Memory 120 can include non-removable memory 122 and/or removable memory 124. The non-removable memory 122 can include RAM, ROM, flash memory, a hard disk, or other suitable memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the application programs 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touch screen 132, microphone 134, camera(s) 136, physical keyboard 138, and/or trackball 140. Additional input devices used for determining position, orientation, and/or proximity of objects to the mobile device 100 include proximity sensor(s) 142, a compass 144, accelerometer(s) 146, gyroscope(s) 148, and/or light sensor(s) 149.

The mobile device 100 can also support one or more output devices 150, such as a speaker 152 and a display 154. Other possible output devices (not shown) can include piezoelectric or other haptic output devices. Some devices can serve more than one input/output function. For example, a touch screen 132 and a display 154 can be combined in a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver and/or a physical connector 190, which can be a USB port, IEEE 1394 (FireWire) port, and/or RS-232 port. The illustrated components 102 are not required or all-inclusive, as any components can deleted and other components can be added.

Example Mobile Device Hardware

FIG. 2A depicts a front view 210 of an example mobile device 200, while FIG. 2B depicts a rear view 250 of the mobile device. As shown, the mobile device 200 includes several hardware buttons mounted on a front surface 202 of the device, including a home button 220, a power button 222, and a camera shutter button 224. Also depicted is a touch screen display 230, which can be used to receive user input for designating foreground and/or background portions of an image. For example, touch screen display 230 can be used to receive user input for positioning a template superimposed over a video image displayed on the touch screen display. A second display 232 is also included on a rear surface 203 of the mobile device 200, and in some examples includes touch screen sensing capabilities.

As shown, the mobile device includes both a front-facing (user-facing) camera 260 and a rear-facing camera 262, which are coupled to image sensor(s) based on CMOS, CCD (charge-coupled device), or other suitable technology for capturing still and/or video images. The mobile device 200 includes a microphone 240 and speaker 242, along with a proximity sensor 246 situated below the surface of the mobile device. In some examples, the touch screen display 230 can be used as a proximity sensor.

The camera shutter button 224 of the mobile device 200 can be used to generate user input data for designating foreground and/or background regions of an image displayed on the touch screen display. For example, input video can be generated with the user-facing (front-facing camera) 260 and displayed in real-time on the touch screen display 230. A user can adjust the physical position of the mobile device 200 (e.g., by moving or rotating the device or touch the touch screen display 230) while viewing a displayed image of the user (e.g., on the touch screen display 230 or display 232) in order to position the displayed image. The mobile device 200 can use input from a proximity sensor (e.g., proximity sensor 246), compass, accelerometer, and/or gyroscope to position an image on the touch screen display 230. For example, an image of a user captured with a camera 260 or 262 can be positioned relative to a template, as described further below.

After the user image is positioned, the camera shutter button 224 (or another button) is pressed to indicate that the template is positioned properly for designating foreground and/or background regions for the user image.

While the camera shutter button 224 is shown located on a front surface 202 of the mobile device 200, in other examples, a camera shutter button can be positioned at alternate locations. For example, the camera shutter button 224 can be located at location 225 (on a side surface 206) or location 226 (on the rear surface 203), respectively, of the mobile device.

Turning to the rear view 250 shown in FIG. 2B, the example mobile device 200 includes a camera 262 and an electronic flash 265. The individual components (e.g., the hardware buttons 220, 222, and 224, microphone 240, speaker 242, touch screen display 230, cameras 260 and 262, and flash 265) can be coupled to a mobile device chassis (not shown), which is connected to internal components of the mobile device 200, for example: one or more processors, a piezoelectric actuator, a power supply, and a modem. As shown, software 280 for implementing the described techniques, including receiving user input for designating regions, generating face detection regions, generating foreground/background regions using edge segmentation based on the user input and/or face detection regions, and producing modified video based on the edge segmentation, can be stored on computer-readable storage media in the mobile device 200.

Example Implementation Environment

Figure 20:
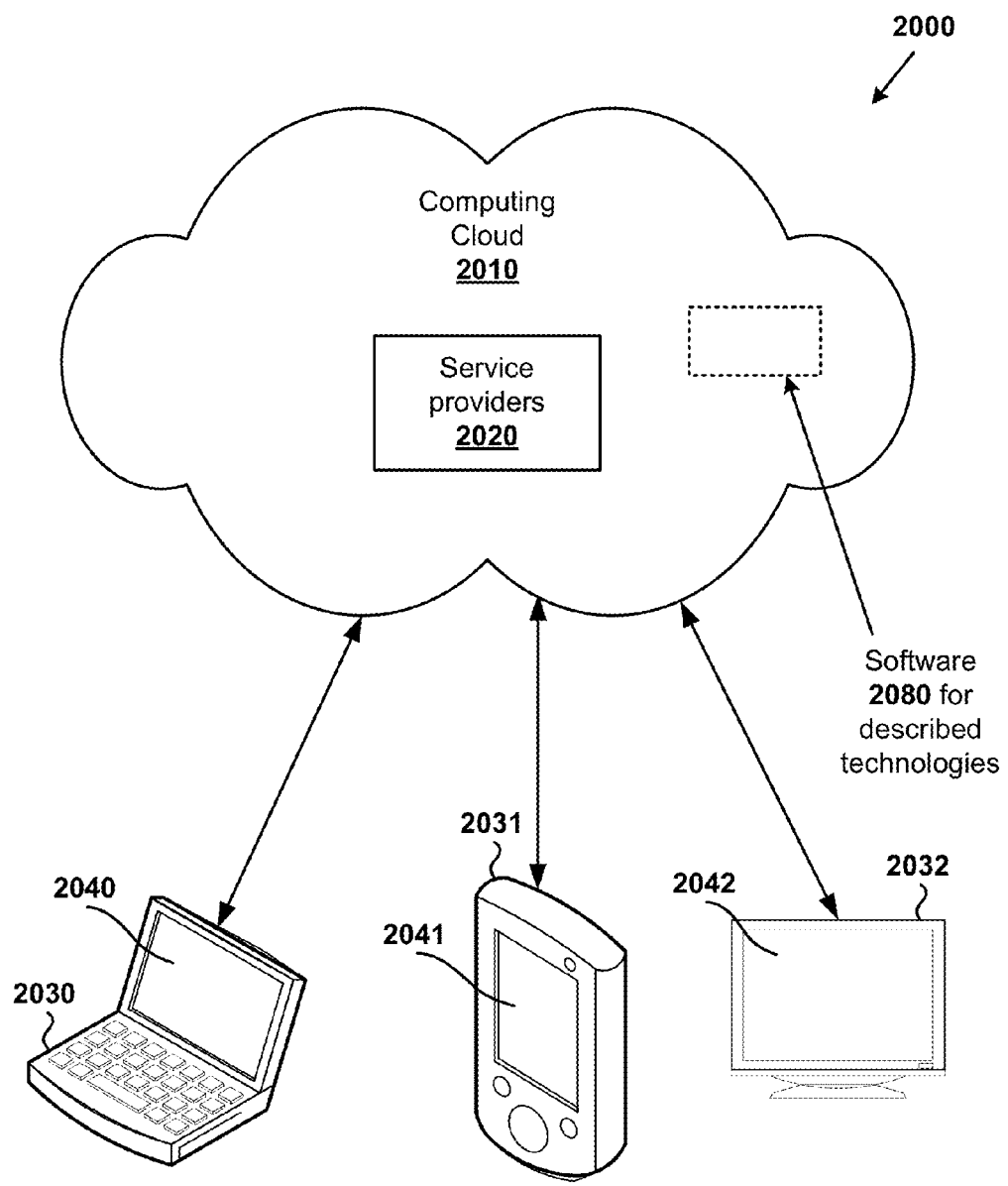
FIG. 20 illustrates a generalized example of a suitable implementation environment for a mobile device connected to a computing cloud and multiple device screens.

FIG. 20 illustrates a generalized example of a suitable implementation environment 2000 in which described embodiments, techniques, and technologies may be implemented.

In example environment 2000, various types of services (e.g., computing services) are provided by a computing cloud 2010. For example, the computing cloud 2010 can comprise a collection of computing devices, which may be located centrally or distributed, that provide cloud-based services to various types of users and devices connected via a network such as the Internet. The implementation environment 2000 can be used in different ways to accomplish computing tasks. For example, some tasks (e.g., processing user input and generating representations based on user input) can be performed on local computing devices (e.g., connected devices 2030-2032) while other tasks (e.g., processing input video based on user input or representations to produce modified video) can be performed in the computing cloud 2010.

In example environment 2000, the computing cloud 2010 provides services for connected devices 2030-2032 with a variety of screen capabilities. Connected device 2030 represents a device with a computer screen 2040 (e.g., a mid-size screen). For example, connected device 2030 could be a personal computer such as desktop computer, laptop, notebook, netbook, or the like. Connected device 2031 represents a device with a mobile device screen 2041 (e.g., a small size screen). For example, connected device 2031 could be a mobile phone, smart phone, personal digital assistant, tablet computer, and the like. Connected device 2032 represents a device with a large screen 2042. For example, connected device 2032 could be a television screen (e.g., a smart television) or another device connected to a television (e.g., a set-top box or gaming console) or the like. One or more of the connected devices 2030-2032 can include touch screen capabilities. Devices without screen capabilities also can be used in example environment 2000. For example, the computing cloud 2010 can provide services for one or more computers (e.g., server computers) without displays.

As described in further detail below, images and video can be displayed on display screens 2040-2042 coupled to a mobile device in varying combinations and subcombinations. For example, input video can be displayed on a mobile device screen 2041 while modified video based on the input video is displayed on the computer screen 2040 or the large screen 2042. Furthermore, in certain examples other images and/or video used with the disclosed methods, such as replacement images and video and/or filtered video can be displayed on one or more of the screens 2040-2042.

Services can be provided by the computing cloud 2010 through service providers 2020, or through other providers of online services (not depicted). For example, cloud services can be customized to the screen size, display capability, and/or touch screen capability of a particular connected device (e.g., connected devices 2030-2032).

In example environment 2000, the computing cloud 2010 provides the technologies and solutions described herein to the various connected devices 2030-2032 using, at least in part, the service providers 2020. For example, the service providers 2020 can provide a centralized solution for various cloud-based services. The service providers 2020 can manage service subscriptions for users and/or devices (e.g., for the connected devices 2030-2032 and/or their respective users). Software 2080 for implementing the described techniques, including receiving user input for designating regions, generating face detection regions, generating foreground/background regions using edge segmentation based on the user input, and producing modified video based on the edge segmentation, can be located in the computing cloud 2010. In some examples, all or a portion of the software 2080 is provided by the service providers 2020. In some examples, all or a portion of the software 2080 is stored at one or more of the connected devices 2030-332.

Example Template Positioning with User Input

Figure 3A:
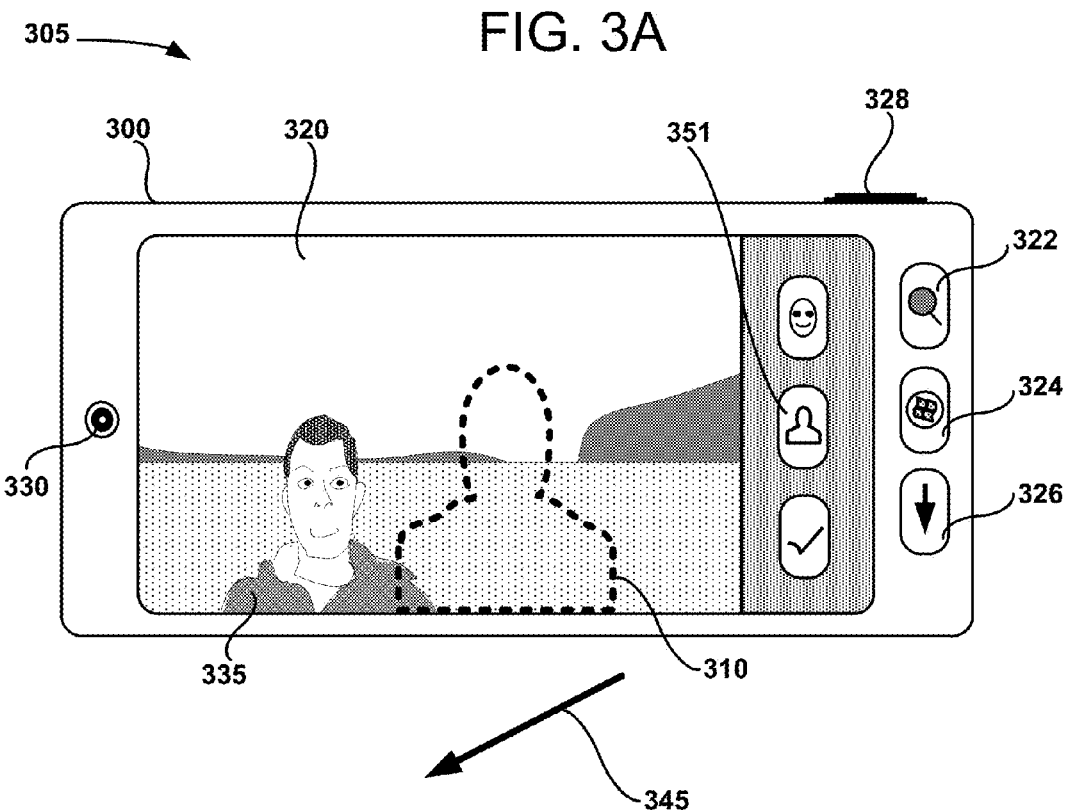
FIGS. 3A and 3B illustrate a generalized example of a mobile device while receiving user input for positioning a template on a mobile device display screen.
Figure 3B:
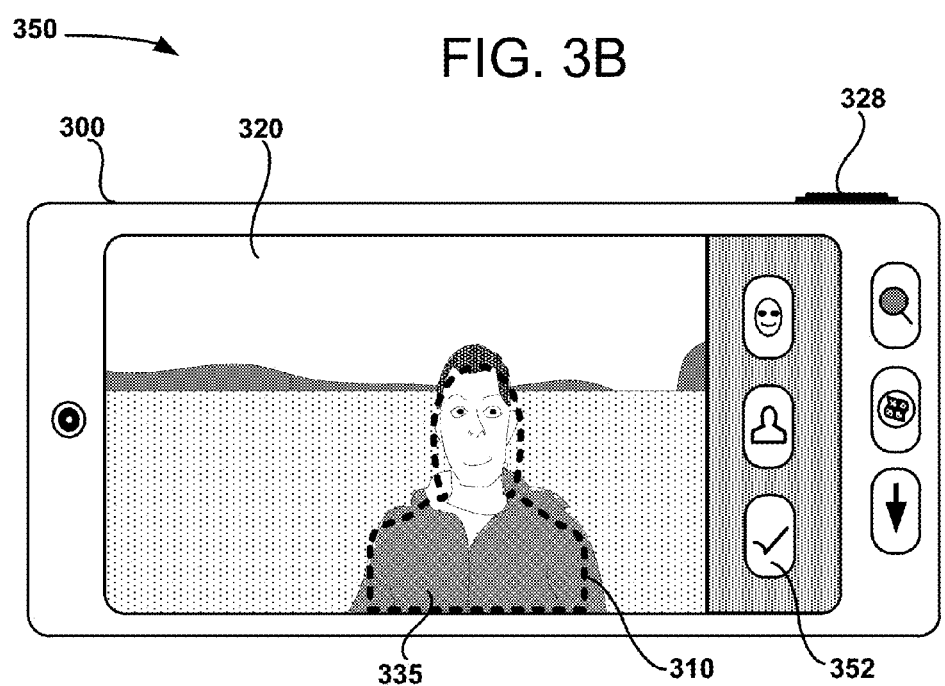

FIGS. 3A and 3B illustrated a generalized example of a mobile device 300 while receiving user input for positioning a template 310 relative to input video displayed on a touch screen display 320.

As shown in the illustration 305 of FIG. 3A, a mobile device 300 includes a number of hardware buttons 322, 324, and 326, a camera shutter button 328, and a video camera 330. Input video captured using an image sensor coupled to the video camera 330 is displayed on the touch screen display 320. Portions of the displayed video include a user image 335 of a mobile device user and the template 310 displayed superimposed over the displayed input video. As shown in FIG. 3A, the user image 335 is displayed substantially outside the boundary of the template 310. In some examples, the user can initiate template positioning by pressing hard ware button (e.g., hardware button 324) or a touch screen button (e.g., touch screen button 351).

FIG. 3B is an illustration 350 of the mobile device 300 after the device has been moved in the direction indicated by an arrow 345 (e.g., by a user holding the mobile device) to reposition the display of the user image 335 relative to the template 310 on the touch screen display 320.

As shown, the user image 335 has been moved to a new position relative to the stationary template 310 by moving the position of the video camera 330. In some examples, movement detection can be enhanced or implemented using, for example, a compass, accelerometers, gyroscopes, proximity sensor, light sensor, or other suitable devices for detecting position of the mobile device 300. In other examples, the position of the template is adjusted by dragging a finger on the touch screen display 320 to move the (non-stationary) template over the user image 335. Regardless of how the template 310 is positioned, the camera shutter button 328 is then pressed to indicate that the template is positioned properly for generating representations for image segmentation. In other examples, another hardware button (e.g., button 322, 324, or 326) or a touch screen button (e.g., touch screen button 352) is pressed, or the user makes a gesture using the touch screen display 320, to indicate confirmation of the desired positioning of the template 310.

Example Template Positioning with Face Detection

Figure 4A:
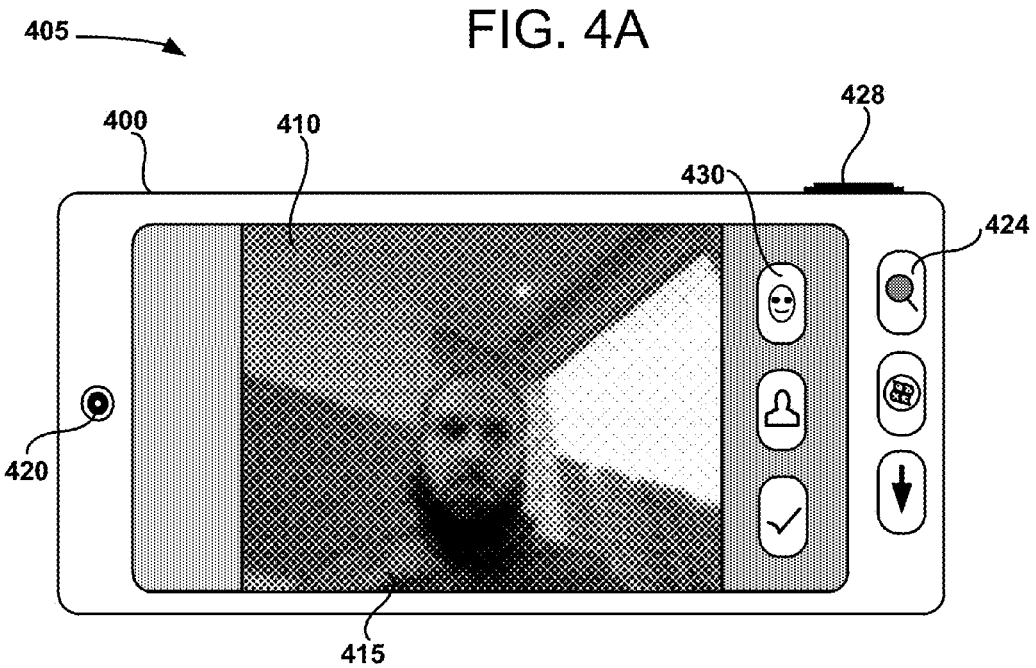
FIGS. 4A-4D illustrate a generalized example of a mobile device while receiving face detection input for positioning a template on a mobile device display screen.

FIG. 4A is an illustration 405 of a mobile device 400 displaying input video on a touch screen display 410 including displaying a user image 415 as it is captured with a video camera 420. As shown, the mobile device 400 includes a number of hardware buttons (e.g., button 424), a camera shutter button (e.g., camera shutter button 428), and a number of touch screen buttons (e.g., touch screen button 430). In some examples, a user can initiate face detection (e.g., by pressing a touch screen button 430), while in other examples, face detection is initiated periodically.

Figure 4B:
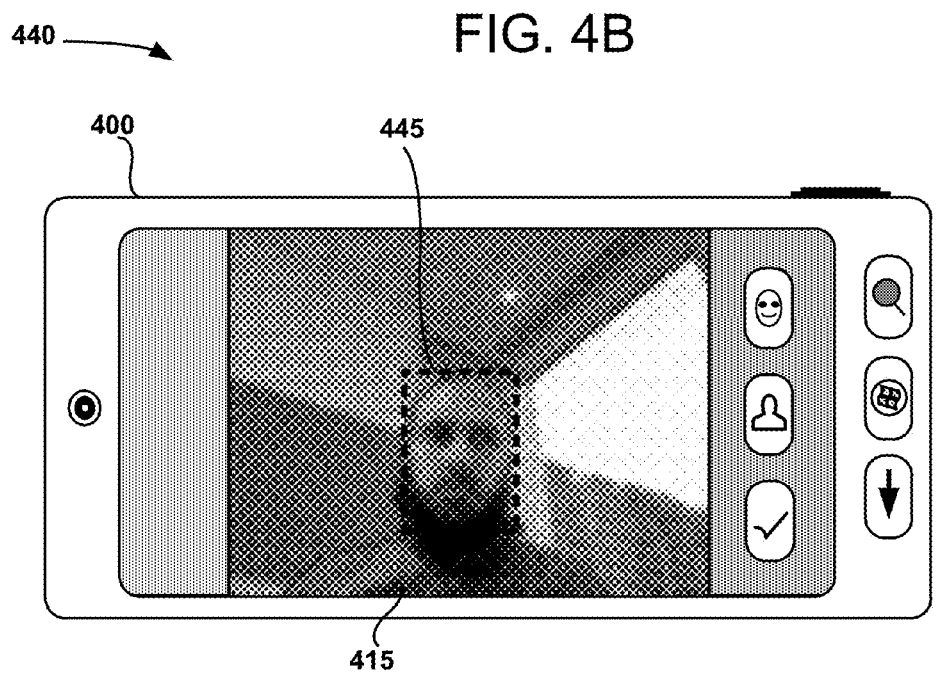

FIG. 4B is an illustration 440 of the mobile device 400 including an indication of a bounding box 445 generated by a face detector. The face detector can be implemented in hardware, software, or a combination of the two, using techniques such as Viola-Jones, which is described in further detail below. As shown, the bounding box 445 encloses a region of the user image 415 (or face detection region) that has been determined to be a likely region of face. In some examples, the bounding box 445 is not actually displayed on the mobile device.

Figure 4C:
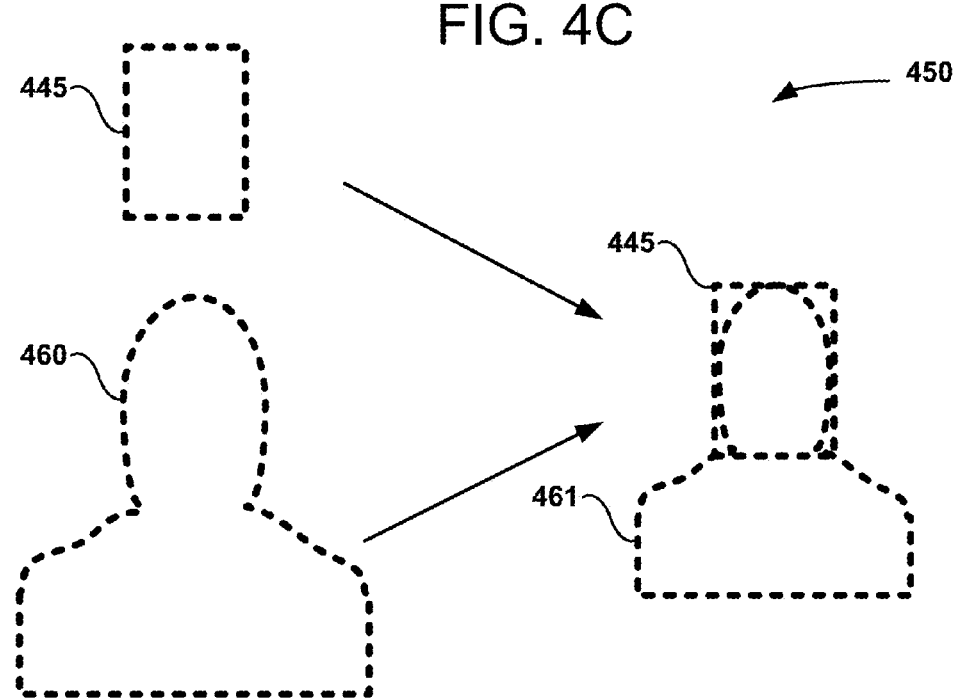

FIG. 4C is an illustration 450 of an exemplary technique for generating a positioned edge segmentation template 461 (e.g., by generating x-y coordinates and a scale factor for a general edge segmentation template 460) based on the bounding box 445. As shown, a general edge segmentation template 460 is shaped as a generic human head and upper torso. The positioned edge segmentation template 461 is positioned based on the bounding box by centering a head region associated with the edge segmentation template 460 with the center of the bounding box 445. Further, the positioned edge segmentation template 461 is scaled from the general edge segmentation template 460 such that the bounding box 445 closely borders the head region of the template.

Figure 4D:
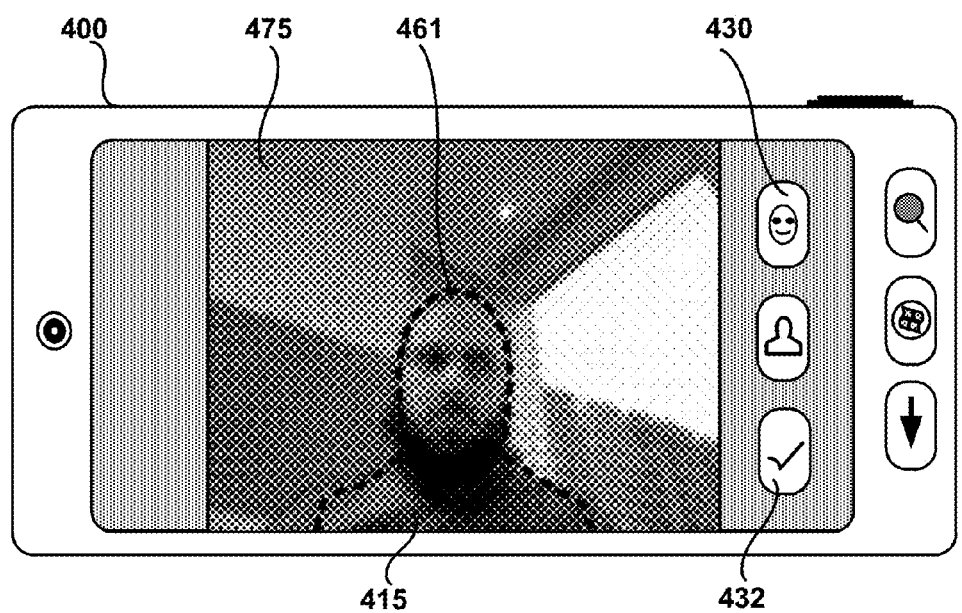

FIG. 4D is an illustration 470 of the positioned edge segmentation template 461 superimposed over an input video image 475 after being positioned based on face detection. As shown, the edge segmentation template 460 approximately conforms to the head and upper torso of the user image 415. Additional input can be used to position the edge segmentation template 461. For example, face detection can be performed periodically, based on a period of time or on a measured accuracy of image segmentation. In some examples, a user can initiate face detection (e.g., by pressing a touch screen button 430). After face detection is performed and the edge segmentation template is positioned, additional user input can be received confirming template positioning. For example, a user can confirm template positioning by pressing another touch screen button (e.g., touch screen button 432). Other examples of combining face detection and user input in order to position templates and perform edge segmentation are described in further detail below.

Example Positioning with Template Outlining or Tapping

Figure 5A:
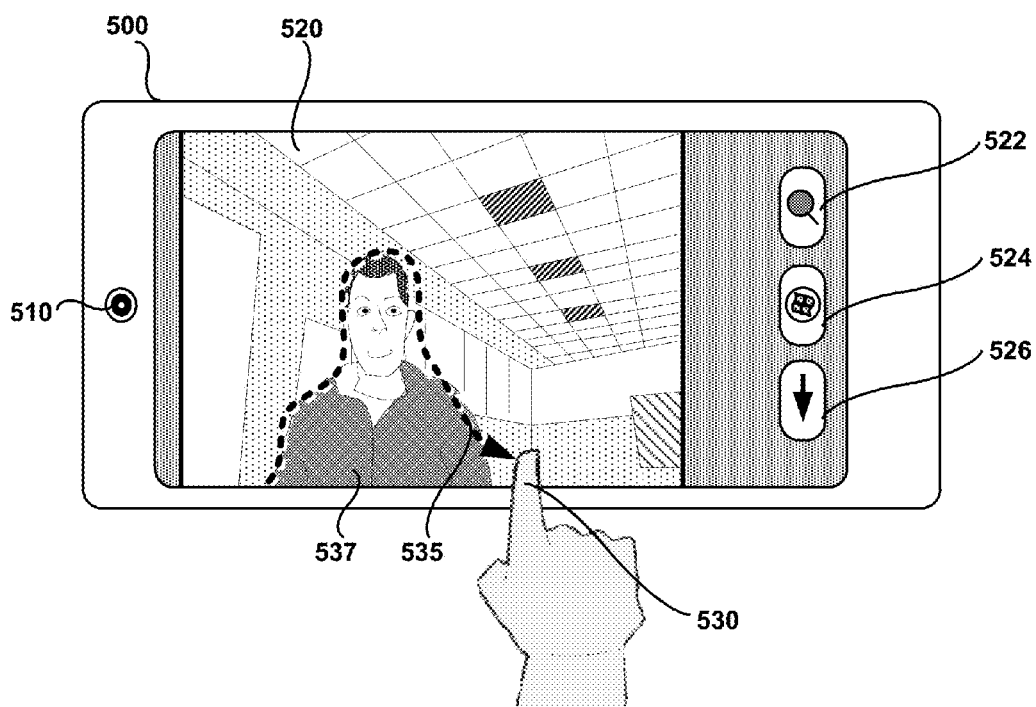
FIGS. 5A and B illustrates a generalized example of a mobile device while receiving user input including touch screen input.

FIG. 5A is an illustration 505 of a mobile device 500 receiving user input for designating background and/or foreground regions of an input video image. As shown, an input video image generated by a video camera 510 is displayed on a touch screen display 520, which also displays a number of touch screen buttons 522, 524, and 526. A user drags a finger 530 over the touch screen display 520 in the direction indicated by the dashed arrow 535 to outline an area for use in generating foreground and background regions. After outlining the area, the user can indicate approval of the template positioning by tapping one of the touch screen buttons 522, 524, and 526. Other gestures and movements can be used. For example, after dragging to outline a template area, the user can tap a finger within the outlined area, or tap another region of the touch screen display 520. Thus, areas of a representation of the image within the concave portion 537 outlined by the dashed arrow 535 can be weighted as foreground regions in an initial representation, and areas outside the concave portion can be weighted as background regions in the initial representation. In other examples, areas of an image representation can be weighted based on other relationships to an outlined area (e.g., a convex region in relation to an outlined area of a touch screen display).

Figure 5B:
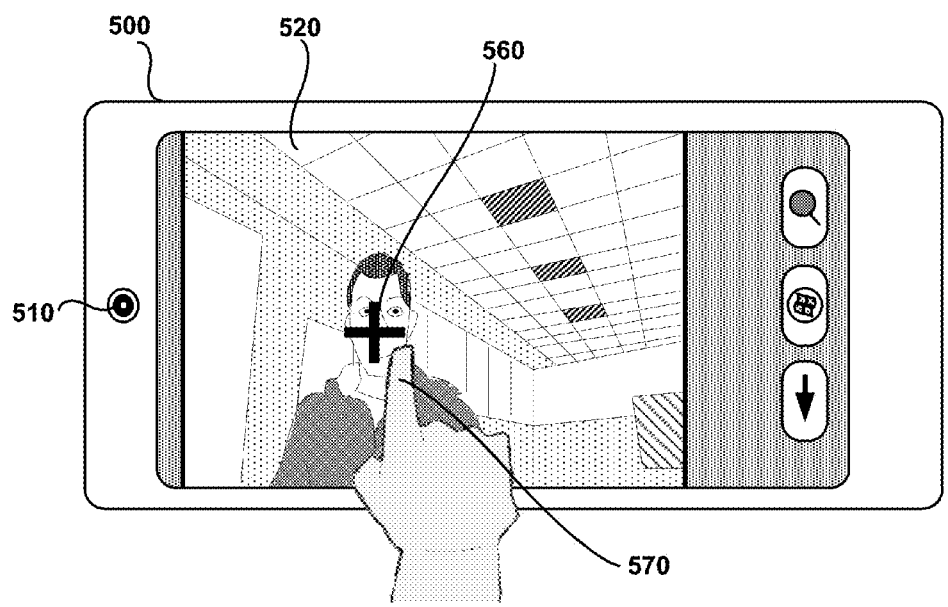

FIG. 5B is an illustration 550 of the mobile device 500 receiving user input for designating background and/or foreground by tapping desired seed regions of an input video image. As shown, an input video image generated by the video camera 510 is displayed on a touch screen display 520. A user taps a finger 570 over the touch screen display 520 at the location indicated by the crosshairs 560 to indicate a desired seed region for use in generating foreground and background regions (the crosshairs are not necessarily displayed on the touch screen display 520). After tapping the area, the corresponding regions in a representation of the image are marked as seed regions, which are strongly associated with the associated nodes being labeled as foreground regions. Thus, pixels at or near the crosshairs 560 can be forced to be designated as part of a foreground region, given weights associated with a high probability of being designated foreground region, and/or be treated as source or sink nodes in examples using a min-cut approach to perform image segmentation.

Side-by-Side Video Display Example

Figure 6A:
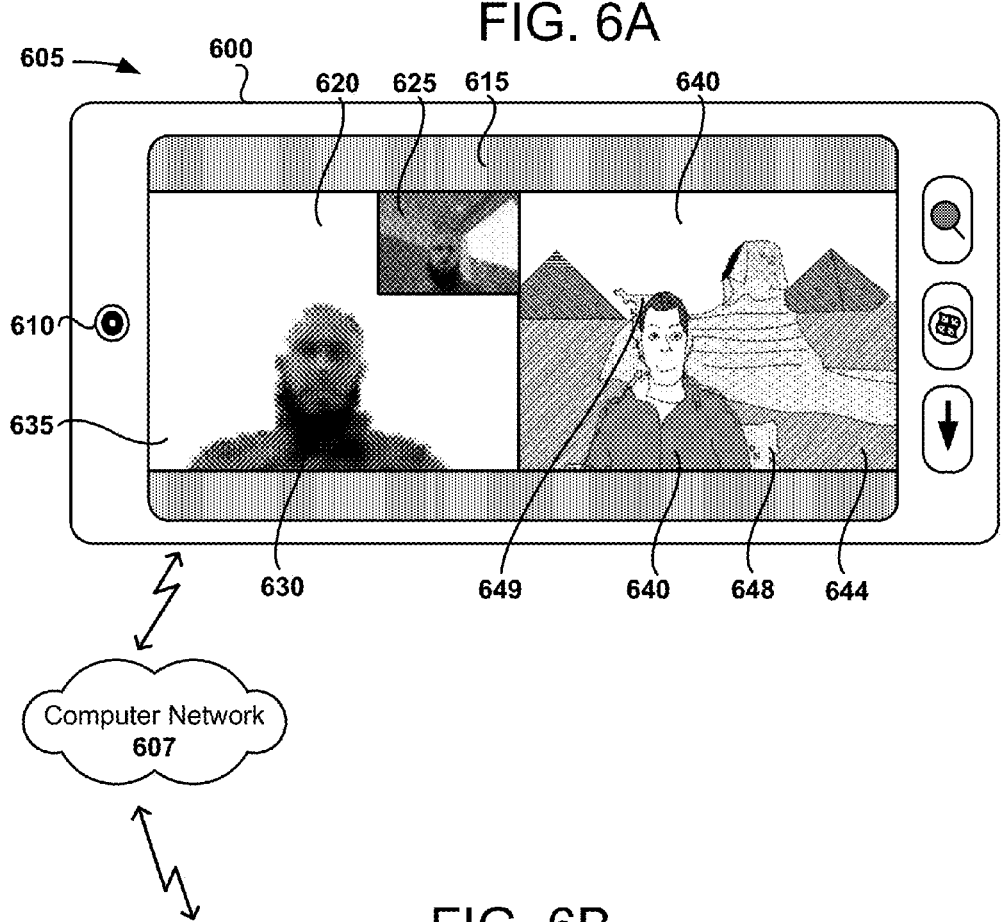
FIGS. 6A and 6B illustrate a generalized example of a mobile device concurrently displaying input video and corresponding modified output video having replaced background regions.
Figure 6B:
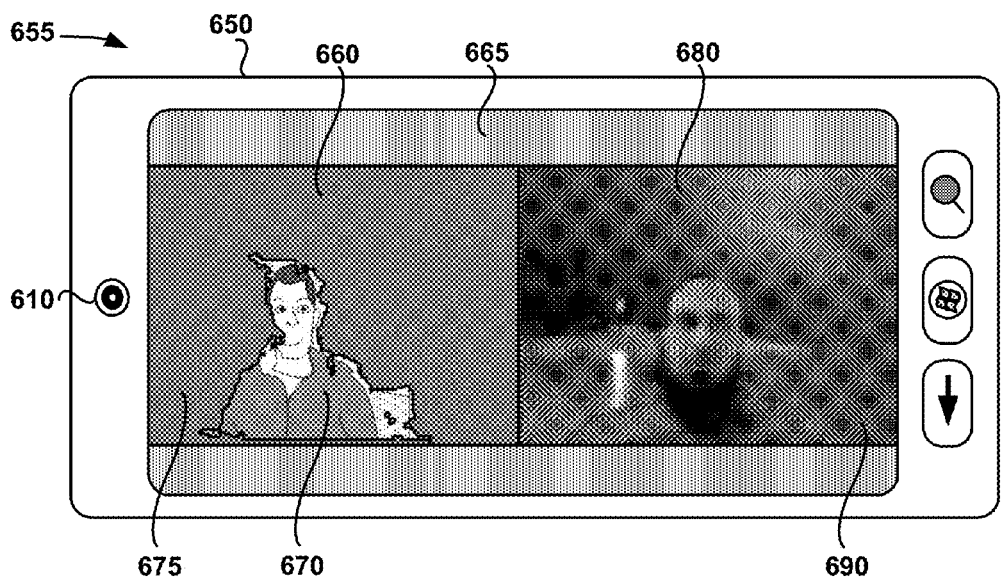

FIGS. 6A and 6B are illustrations 605 and 655 of two distinct mobile devices 600 and 650 transmitting and receiving modified video over a computer network 607 (e.g., a cellular network, an intranet, or the Internet) during a video call application conducted between the two mobile device.

As shown in FIG. 6A, the first mobile device 600 receives input video of a mobile device user with an attached video camera 610 and concurrently displays two video images based on the input video on a touch screen display 615 in real time. Modified input video based on the input is displayed in a first window 620 on the left side of the touch screen display 615. A second window 625, inset in a picture-in-picture format in the first window 620, is shown displaying unmodified input video. The modified video displayed in the first window 620 includes a foreground region 630 (which is produced by segmenting the input video based on user input and/or face detection) and a background region 635 (which is produced by replacing segmented background regions of the input video with a blank fill pattern). Also shown is second modified video (based on second input video) received from the second mobile device 650 in a third window 640. As shown, the second modified video includes a foreground region 640 and a background region 644, where the foreground region is based on input video received using the second mobile device 650 and the background region has been replaced with another image. The foreground regions 630 and 640 are based on one or more regions of the input video that have been designated as foreground based on user input and/or face detection data received with the respective mobile devices 600 and 650. The background region 635 displayed in the first window 620 has the corresponding background regions of the input video replaced with a white background. In other examples, the background regions can be replaced with another image (e.g., another image provided by the system or the user), another video (e.g., video of another location, pattern, and/or text), or with a filtered version of the background region from the input video (e.g., a blurred version of the background region). As shown, foreground detection techniques do not always perfectly detect the region of the video occupied by the user's image, but may also include artifact portions (e.g., artifact portions 648 and 649) from the background in the input video.

FIG. 6B illustrates the second mobile device 650 during the video call with the first mobile device 600 shown in FIG. 6A. As shown, second modified video is displayed in a fourth window 660 on a touch screen display 665 of the second mobile device, including a foreground region 670 and a background region 675. As shown, edge segmentation based on user input and/or face detection has been used to replace the background region 675 with a fill pattern. Also shown in a fifth window 680 is modified video received from the first mobile device. The background region 690 (of which corresponding background region 620 is displayed blank on the first mobile device 600) of the modified video has been replaced with portions of another image (here, an image of a beach).

There are several ways in which input video and modified video can be displayed. For example, the picture-in-picture display of the first and second windows 620 and 625 can swap the display of the input and modified video. In some examples, a user can select whether and how to display the input and modified video. For example, a user can tap the touch screen display 615 over the area of the second window 625 to toggle the display of the unmodified input video on and off. Further, the replacement images used in generating the modified video are not necessarily generated using the mobile device that captures the input video. In some examples, modified video can be generated incorporating another background image or video at a remote server accessible using the computer network 607, or at the receiving mobile device (e.g., the second mobile device 655). For example, the background image 644 can be stored on the first mobile device 600 and displayed in the third window 640, but not be transmitted from the second mobile device 650.

User input used to position a template (e.g., as described in the example above regarding FIGS. 3A and 3B), face detection data (e.g., as described in the example above regarding FIGS. 4A-4D), or user input to outline a template area (e.g., by dragging or tapping a finger on the touch screen display as described in the examples above regarding FIGS. 5A and 5B) can be used to designate foreground and/or background region(s). Once the template has been positioned, a representation of the image is initialized using the template information (e.g., by constructing a graph representation of the image and foreground/background region probabilities based on a template positioned using user input and/or using face detection), and portions of the input video are segmented using suitable techniques (e.g., by using a min-cut, max-flow, or other suitable image segmentation techniques). Example techniques for initializing a representation of the image and segmenting the input video into regions are described in further detail below. Further, the arrangement of windows (e.g., first window 620 and second window 625) is not limited to the examples shown, but can include any suitable arrangement. For example, the second window 625 can be positioned in a different position inset within the first window 620, or displayed in a different portion of the touch screen display 615.

Thus, by displaying two video images side-by-side, a mobile device user can evaluate the performance of the foreground detection during transmission of the modified video, and take measures to correct the foreground detection or stop video transmission if the background replacement is not being performed as desired, for example, by prompting for additional user input or adjusting software parameters. In other examples a mobile device user can correct pixels and/or areas of foreground regions by providing touch input.

Example Face Region Generation

In some examples, the generation of face regions using face detection is performed using variations of the Viola-Jones techniques, which will now be described briefly. It will be readily discernable to one of ordinary skill in the art that other face detection techniques can also be used with the technologies disclosed herein. In particular, face detection techniques that can be carried out in real time are combined with methods of modifying input video from a video camera, as disclosed herein. As used herein, "face detection" refers to techniques for identifying the location of one or more face instances in an image or video frame. Face regions (or face detection regions) can be expressed in a number of ways (e.g., as a bounding box or other suitable shape around detected faces, as an actual pixel level segmentation map of detected facial regions, or as other suitable expressions). In some examples, face detection can include the use of eye detection and face tracking techniques.

A generalized example of face detection using a variant of a Viola-Jones algorithm can be described as including three components: an integral image (or summed area table), a boosting algorithm (e.g., AdaBoost or RealBoost), and an attentional cascade structure.

An integral image, also known as a summed area table, is an algorithm for computing the sum of values in a rectangle subset of a grid. The integral image can be applied for rapid computation of Haar-like features. A generalized example of an integral image can be constructed as follows:

$$ii(x, y) = \sum_{x' \leq x, y' \leq y} i(x', y') \quad \text{(Eq. 1)}$$

where $ii(x, y)$ is the integral image at pixel location $(x, y)$ and $i(x', y')$ is the original image. The integral image can be used to compute the sum of rectangular areas efficiently. Thus, the integral image can be used to compute simple Haar-like rectangular features.

Boosting is a method of finding a highly accurate hypothesis by combining a number of "weak" hypotheses, each having moderate accuracy (e.g., each of the weak hypotheses should have an accuracy greater than random chance). Some known algorithms for boosting include AdaBoost and RealBoost. In a generalized example of AdaBoost, a set of training examples $S=\{(x_i, z_i), i=1, \ldots, N\}$ and T is a total number of "weak" classifiers to be trained. An additive model $F^T(x)=\sum_{t=1}^{T} f_t(x)$ is used to predict the label of an input example x. A base function $f(x)$, also referred to as a classifier (e.g., a stump classifier), can be defined as:

$$f(x)=c_j, \text{ if } h(x) \in u_j, j=1,2,\ldots \quad \text{(Eq. 2)}$$

An example score $F^0(x_i)$ can be initialized using Equation 3:

$$F^0(x_i) = \frac{1}{2} \ln\left(\frac{N_+}{N_-}\right) \quad \text{(Eq. 3)}$$

where $N_+$ and $N_-$ are the number of positive and negative examples in the training data set S. Using an iterative technique, an optimal threshold $F^T(x)$ is determined.

Use of an attentional cascade structure allows smaller and more efficient boosted classifiers to be built that can reject most negative sub-windows while keeping most positive examples. Each node of the cascade structure makes a binary decision whether a window will be kept or discarded. By having fewer weak classifiers at early stages of the cascade structure, the speed of detection using the cascade structure can be improved.

FIGS. 7A-7D illustrate a generalized example of generating input for positioning an edge segmentation template by applying face detection (e.g., using an implementation of a Viola-Jones algorithm) with a mobile device.

Figure 7A:
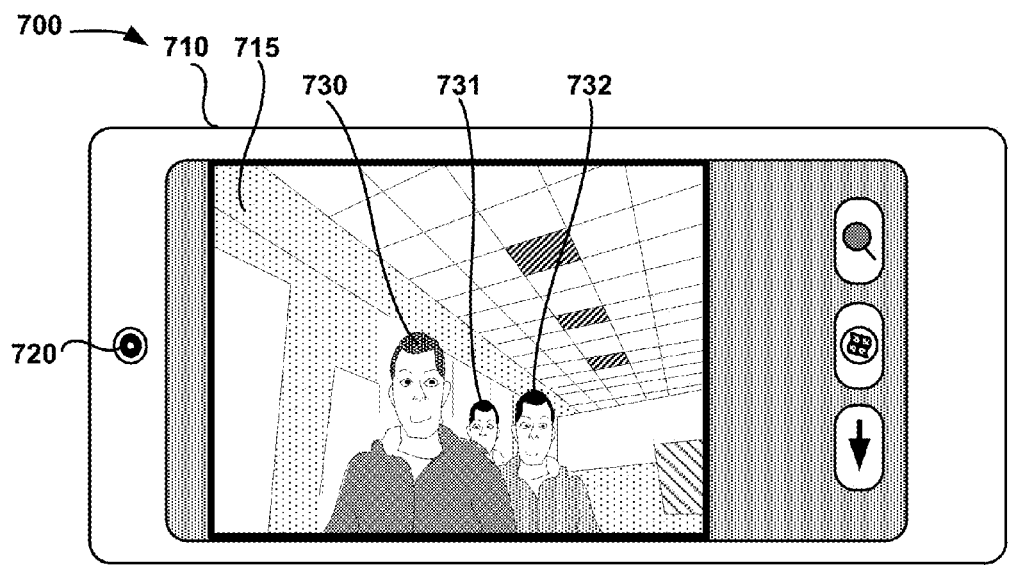
FIGS. 7A-D illustrate a generalized example of a mobile device applying face detection to input video to designate background and foreground regions.

FIG. 7A is an illustration 700 of a mobile device 710 with a touch screen display 715 and video camera 720. As shown, input video including a number of face images 730, 731, and 732 is displayed on the touch screen display 715.

Figure 7B:
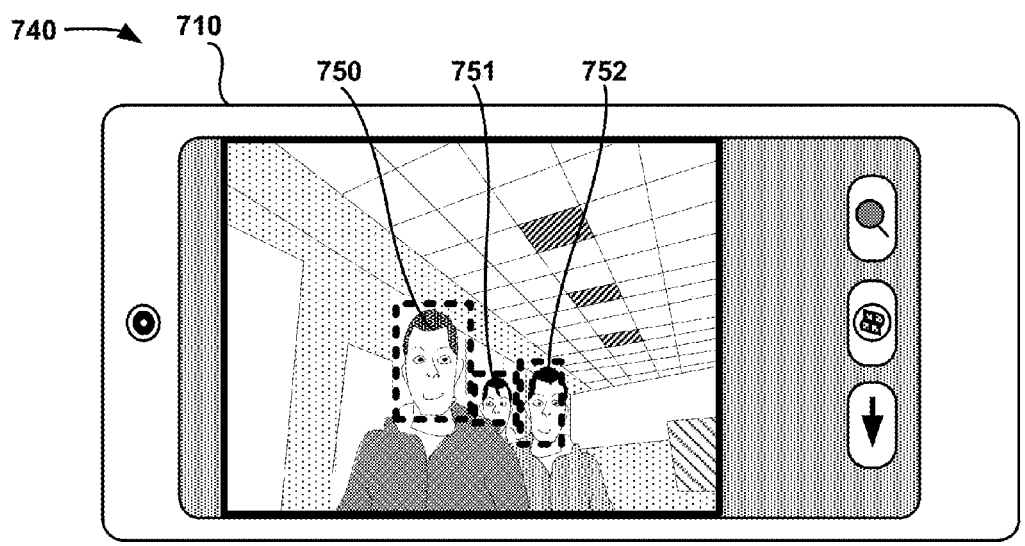

FIG. 7B is an illustration 740 of the mobile device 710 after a number of face regions 750, 751, and 752 have been designated using, for example, a Viola-Jones algorithm, which can be implemented on the mobile device, or another computing device. As shown, a first face detection region 750 is determined to be a primary face region, while face regions 751 and 752 are determined to be secondary face regions. In some examples, determination of the primary face region is based on the relative size or area of the face regions 750, 751, and 752. In some examples, additional user input is provided to identify a primary face region. In some examples, determination of the primary face region 750 is based on the proximity of the region to a template (not shown) or designation of a seed region. In some example, determination of the primary face region 750 is based on comparison of the face regions 750, 751, and 752 to previously-stored data (for example, data from previous training sessions that a user conducts to store data for face recognition). After determining the primary face region 750, a template is positioned and scaled according to the location and size of the primary face region 750 (e.g., as illustrated in FIGS. 4A-4D). The adjusted template is used to designate initial foreground and/or background regions, and also used to compute background and foreground color likelihoods.

Figure 7C:
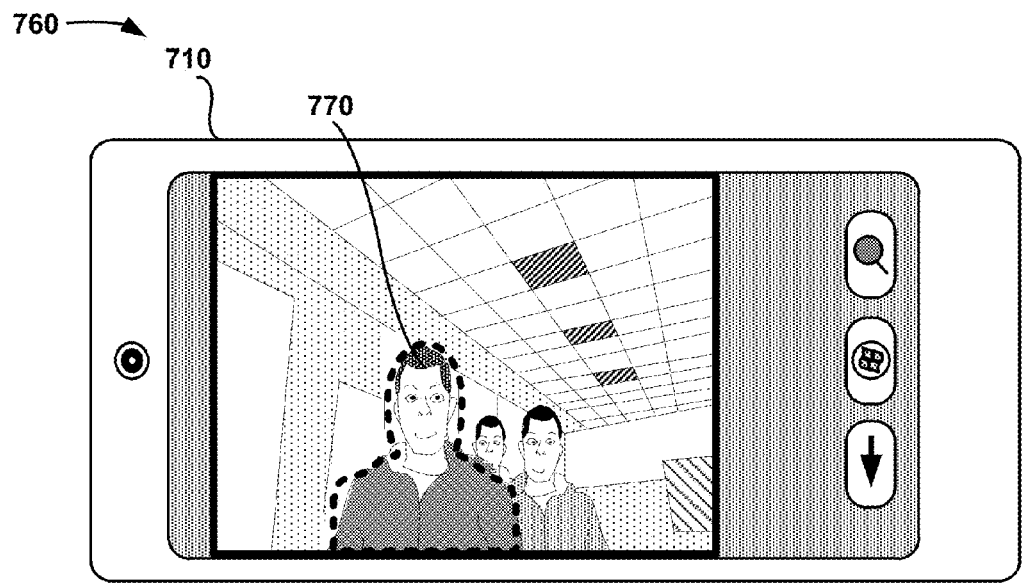

FIG. 7C is an illustration 760 of the mobile device 710 after a positioned edge segmentation template 770 has been generated based on the primary face region 750. As shown, the positioned edge segmentation template 770 is positioned and scaled according to the primary face region 750. In some examples, a user of the mobile device 710 can confirm the template positioning by pressing a touch screen button. In some examples, the user can adjust the template positioning by providing user input (e.g., touch screen input) to fine-tune the template position.

Figure 7D:
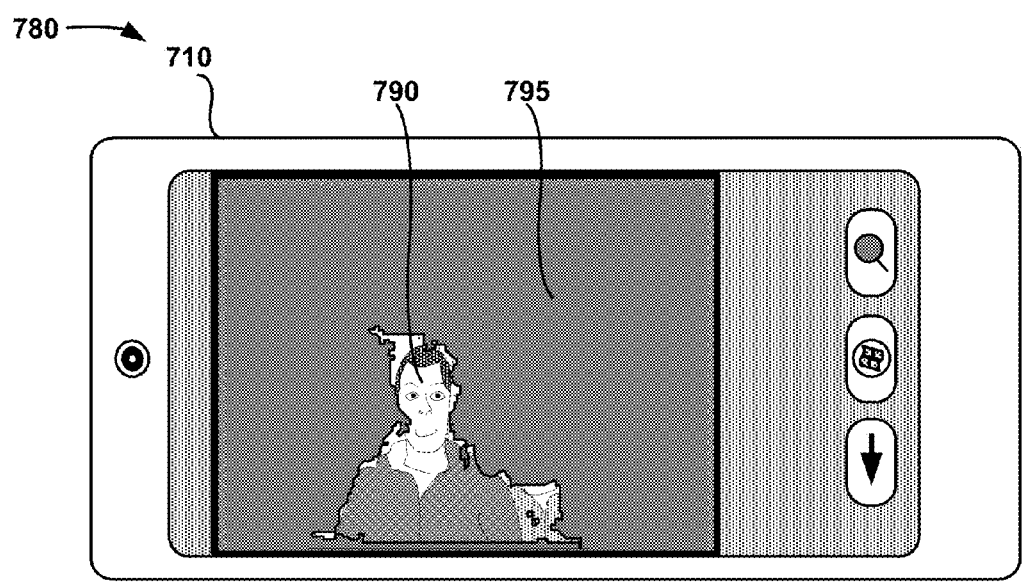

FIG. 7D is an illustration 780 of the mobile device 710 after performing background replacement. Regardless of the manner in which the primary face region 750 is determined, regions associated with the primary face region are used in designating a foreground region 790, while portions of an image associated with the other detection regions 751 and 752 have been added to the replaced background region 795. As shown, the background region 795 has been replaced with a fill pattern. In some examples, information describing the face regions 750, 751, and 752 are combined with other representations of the image(s). For example, face regions can be combined with weights assigned to a graph representation of the image. Thus, the use of primary and non-primary face regions can be used to enhance the performance of image segmentation performed with a mobile device.

Example Foreground/Background Region Detection

FIGS. 8A-8D illustrate a generalized example of detecting a foreground region and a background region in an input image and replacing the background region in the image with another image.

Figure 8A:
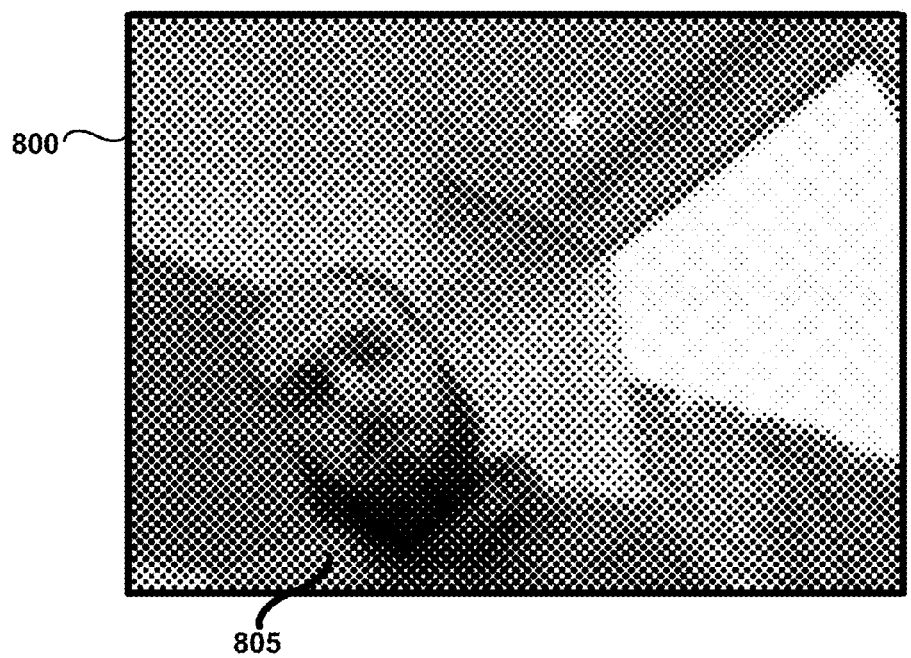
FIGS. 8A-8D illustrate a generalized example of applying background detection in an input image by replacing background regions in the image with another image.

FIG. 8A is an input image 800 (e.g., of input video captured using a video camera coupled to a mobile device) that includes a user image 805 with an office in the background.

Figure 8B:
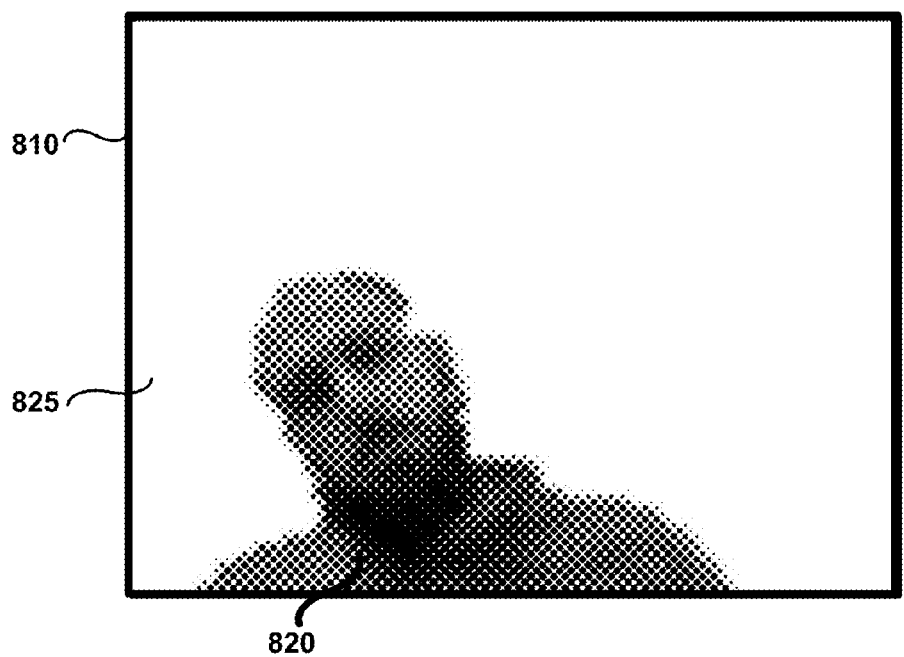

FIG. 8B is an image 810 based on the input image 800 after performing foreground detection and background replacement based on seed regions generated using user input and/or face regions received with a mobile device. As shown, a portion 820 of the input image 800 that has been designated as foreground region is included in the image 810. The remainder portion 825 (e.g., designated background regions) of the input image 800 has been replaced with a blank fill pattern. The foreground portion 820 and remainder portion 825 are not required to be contiguous, and can include "holes." In some examples, holes in foreground and/or background regions can be filled (e.g., by using morphological operations).

Figure 8C:
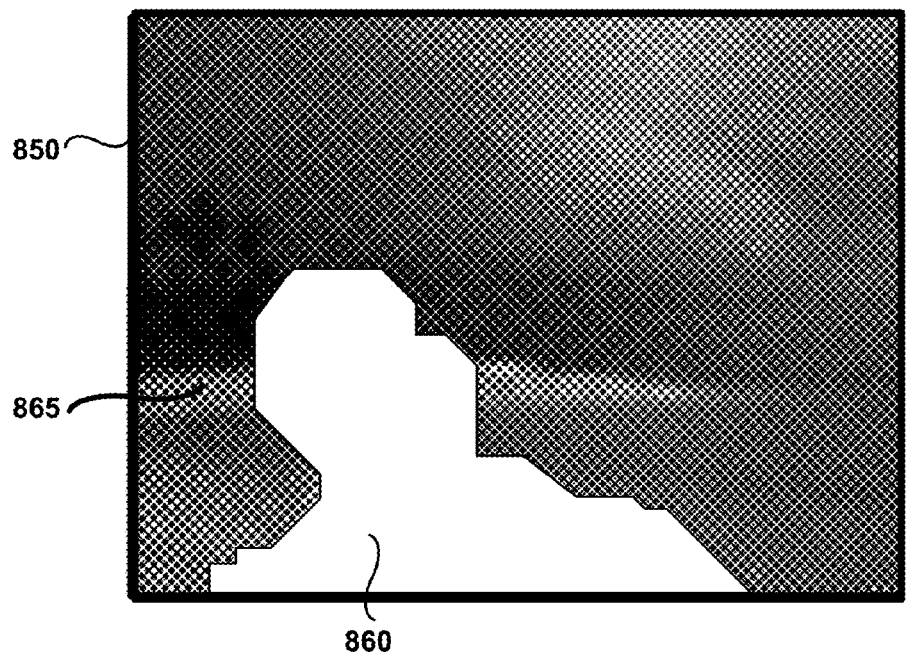

FIG. 8C is an image 850 based on a replacement image (original replacement image not shown) of a beach that is used to replace the remainder portion 825 of the input image 800. As shown, a region 860 of the image 850 that corresponds to the foreground region(s) of the input image 800 is blank. The remaining portion 865 of the replacement image makes up the image 850, which will be used to replace the background portions of the input image 800. The replacement image can be a still image, video, an animation, graphic, or other suitable image. In some examples, the replacement image is provided by an application. In some examples, the replacement image can be selected by a mobile device user, for example, based on a photograph stored on the mobile device or another video image streamed to the mobile device.

Figure 8D:
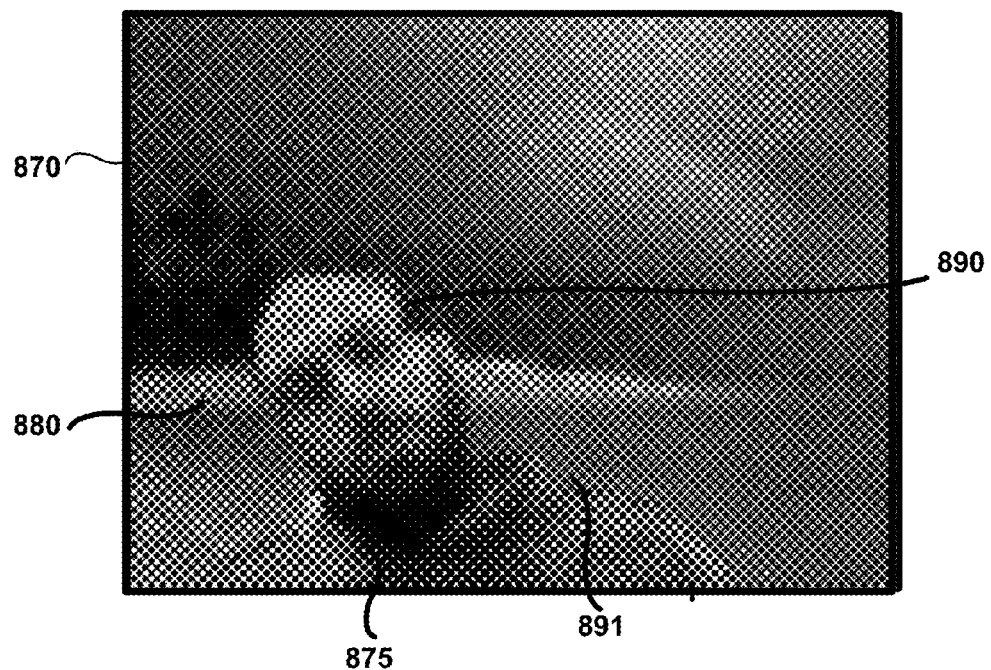

FIG. 8D is a modified image 870 based on foreground portions 875 of the input image combined with corresponding background portions 880 of the replacement image. Even though a number of small artifacts (e.g., artifacts 890 and 891) remain in the modified image 870, modified video based on the modified image 870 has the actual background behind the mobile device user sufficiently obscured to hide the actual background, and provides the illusion that the user is standing in front of a different background.

Figure 9:
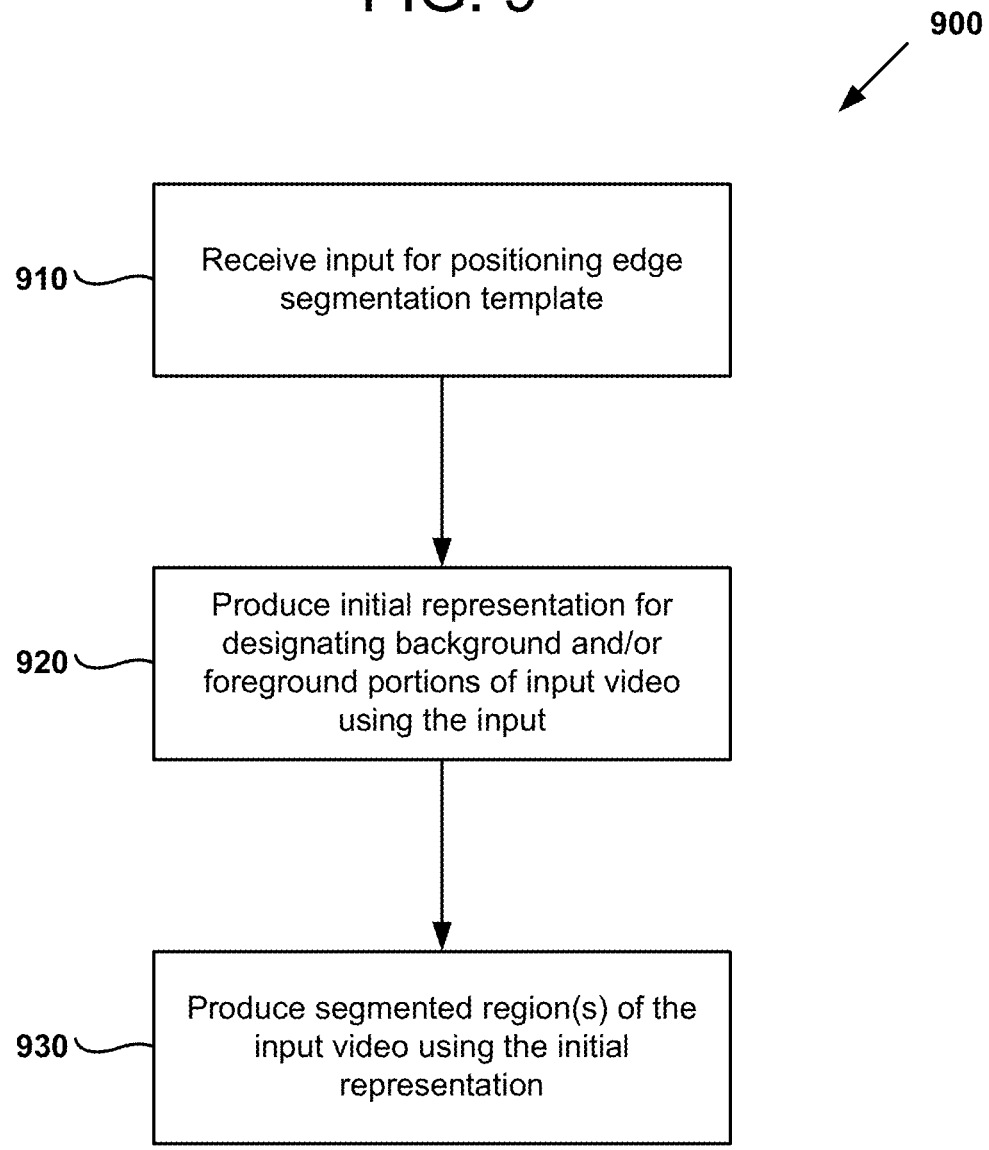
FIG. 9 is a flow chart that outlines an exemplary implementation of the disclosed technology.

Example Generation of Initial Representation for Foreground/Background Region Detection FIG. 9 is a flow chart 900 that outlines an exemplary method of receiving input (e.g., user input or face regions) for positioning an edge segmentation template over input video and producing an initial representation of an image as can be used in certain embodiments of the disclosed technology.

At process block 910, input generated with a mobile device is received for positioning an edge segmentation template. The edge segmentation template can be used in designating background and/or foreground portions of input video captured with a mobile device. For example, user input can be used to position a template superimposed over the displayed input video (e.g., as described above regarding FIGS. 3A and 3B and/or 5A and 5B). The input video can be displayed with an indication for a mobile device user to provide input for determining background and/or foreground regions of the displayed input video. For example, a template 310 as shown in FIG. 3A can be superimposed over input video on a touch screen display 320. While the example template depicted in FIG. 3A is captured with a video camera and displayed on a touch screen display, both connected to a mobile device, other forms of input and output can be used with the methods disclosed herein, as is readily discernable by one of ordinary skill in the art. For example, a video camera coupled to the mobile device via a wired or wireless communication connection (e.g., a network or video connection) can be used to capture input video. In some examples, face detection can be used to supplement, or instead of, user input (e.g., as described above regarding FIGS. 4A-4D). Another display (e.g., a computer screen 2040, television screen 2042, projector, or other suitable display) can be used to display input video and/or modified video. In some examples, all or a portion of the generation of an image representation, edge segmentation, or modification of input video can be performed at a server in a computing cloud 2010, while in other examples, the processing is performed substantially with a mobile device.

In some examples, the template is positioned by adjusting the position of a video camera capturing input video of a user by moving and/or rotating a mobile device with a video camera. In some examples, this template positioning can be augmented with input (e.g., positional or rotation input, or gesture input) from additional sensors coupled with the video camera and/or mobile device, including compasses, accelerometers, gyroscopes, proximity sensors, other suitable device, or combinations of the same. In some examples, user input received from a touch screen display can be used to adjust (e.g., move, zoom, or rotate) the displayed input video and/or the template.

In some examples, touch screen input is used to designate foreground regions of an image (e.g., as described above regarding FIGS. 5A and/or 5B). Once the template has been positioned to a desirable location, additional user input is received to indicate that the template is appropriately positioned, for example, by pressing a hardware button, providing a touch screen tap, or receiving a voice command. In other examples, this additional user input is not provided, but instead the user can continually position the mobile device to maintain the relative positions of the displayed template and user image. In some examples, the passing of a period of time acts as the additional user input indicating appropriate template positioning. Once the template is determined to be in a suitable position, the method proceeds to process block 920. In some examples, the template can be positioned to indicate the location of a face to provide input data for use with face detection techniques.

At process block 920, an initial representation of the input video image is produced for designating one or more portions of the input video as foreground portions based on the input for positioning the template received at process block 910. The initial representation of the image includes a number of weights (e.g., node or edge probabilities) that can be used with foreground/background segmentation techniques, as described further herein. As will be readily understood to one of ordinary skill in the art, the designation of certain image portions as "foreground" and "background" portions is somewhat arbitrary, and once a suitable foreground region has been designated, designation of a background region is trivial, and vice versa. In some examples, more than two region designations can be used. The initial representation can be used with approaches based on Conditional Random Fields (CRFs), which are discussed further below in the section entitled "Example Conditional Random Field Problem Formulation."

At process block 930, one or more segmented regions of the input video are produced. For example, CRF techniques can be applied to the initial representation produced at process block 920. These segmented regions can be used for performing semantic object detection and/or image segmentation. For example, one or more frames of the input video can be segmented into foreground and background regions using the initial representation. The initial representation can be applied to multiple frames of input video when producing segmented regions.

A generalized example of segmenting a video frame is now discussed, but it will be readily apparent to one of ordinary skill in the art that other suitable techniques can be applied using the initial representation. A video frame can be represented as a graph, with pixels in a given frame being assigned to graph nodes and edges joining the nodes being assigned weights (e.g., probabilities) representing the tendency of two pixels joined by a particular edge having the same label. For example, a "0" label can be assigned to background regions and a "1" label can be assigned to foreground regions. The initial representation is used to assign each node of the graph a 0 or 1 label for the image. Other weights can also be used in generating an initial representation, including weights based on node color, node contrast, motion likelihood, previous frames in a sequence of images, face detection, user input, or other suitable items for generating weights for initial representations.

In the constructed graph, individual nodes are assigned a weight based on the individual node's tendency to be labeled as belonging to a particular region (e.g., a foreground or background region). Edges connecting the individual nodes are also assigned weights (e.g., based on the relative difference between two nodes connected by an edge). These tendencies can be described using an energy function. For example, given a table of probabilities for color distribution for foreground and background areas, then a cost (e.g., the "energy" required) to assign any pixel to either background or foreground can be computed. This cost represents a first term in an energy function that has a total value depending on the sum of pixel label assignment costs for a given video frame (dubbed a color likelihood term). A second term for the energy function relates to a cost to assigning adjacent pixels different labels (e.g., a spatial prior term). Two pixels that are close to each spatially have a tendency to be assigned the same label unless there is a high-intensity edge between the pixels (e.g., if there is a high degree of contrast between the two pixels). Additional energy terms can be defined relating to history information of pixel assignment. For instance, the probability of pixel being labeled 0 is assigned based on its respective node being labeled 0 and then 1 in the previous two frames (e.g., using a temporal prior term). Another energy term that can be used to describe the likelihood of image motion (e.g., a motion likelihood term). Thus, by minimizing an energy function by selecting a particular segmentation, a desirable segmentation can be generated. Computed probabilities for the nodes are stored in a table and used to compute the cost of a particular segmentation based on the energy function. The energy function can be defined to comprise additional or different energy terms suitable for finding a suitable image segmentation.

After computing cost functions for the graph, the minimum of a graph cut is computed using a suitable algorithm, such as a minimum-cut algorithm or maximum-flow algorithm (e.g., algorithms that use push-relabel, augmenting paths, or other suitable algorithms). Suitable algorithms include such graph partitioning algorithms as the Kernighan-Lin, Fiduccia-Mattheyses, simulated annealing, Chan-Vese, GrabCut, and/or Kolmogrov algorithms. After a cut is determined using a suitable algorithm, the nodes (pixels) on one side of the cut are assigned a first label (e.g., 0 or background), and cuts on the other side of the cut are assigned a different label (e.g., 1 or foreground). After determining a minimum cut, small components can be filtered to smooth the output before producing the final labels used to partition an image into regions.

As discussed further below, additional optimizations can be applied during graph construction and analysis based on an initial representation based on an edge segmentation template (generated using, e.g., user input and/or face regions) to improve performance in computing energy functions and pixel assignment. Techniques such as working on a sub-sampled image frame, utilizing graphs constructed for other image frames (e.g., previous frames), using solutions of graphs from previous frames to avoid re-computing a graph solution from scratch for the current frame, and/or using "superpixels" comprising information from two or more pixels to avoid construction from scratch, can be applied in some examples of the disclosed technology.

Example Conditional Random Field (CRF) Problem Formulation

A general formulation of applying image segmentation to a sequence of images is now described. One exemplary Conditional Random Field (CRF) problem formulation that can be used with the techniques and apparatus described herein is described in Criminisi et al., "Bilayer Segmentation of Live Video," *IEEE Computer Society Conf. on Computer Vision and Pattern Recognition (CVPR '06)*, pp. 53-60 (2006).

In an exemplary CRF problem formulation a graph can be defined, with nodes for each pixel of an image and edges joining adjacent nodes. An energy function is defined for the graph, and a minimum cut for the graph is determined. As is readily discernable by one or ordinary skill in the art, the "minimum" cut that is determined need not be the graph cut that absolutely minimizes an energy function. For example, other minimizing graph cuts, such as local minima, graph cuts that approach a minimum, or graph cuts that improve over another intermediate graph cut by reducing the total energy of an energy function can be suitable in some examples. Application of heuristics or other techniques can be applied to determine that a graph cut is adequate. As will be readily understood to one of ordinary skill in the art, the application of the techniques described for image segmentation can be adjusted appropriately depending on the parameters of a specific image segmentation application.

For a given input sequence of images (e.g., video), a frame of the sequence is represented as an array $Z=(z_1, z_2, \ldots, z_N)$ of N pixels in a YUV color space. In other examples, the pixels are represented in an RGB color space or other suitable color space (e.g., a black-and-white or grayscale (intensity-only) color space). A frame at time t is denoted $Z^t$. Temporal derivatives are denoted:

$$\dot{Z}=(\dot{z}_1,\dot{z}_2,\ldots,\dot{z}_N) \quad (Eq.\ 4)$$

For each time t, the temporal derivatives are computed as:

$$\dot{z}_n^t = |N(z_n^t) - N(z_n^{t-1})| \quad (Eq.\ 5)$$

where $N(z_n^t)$ is a Gaussian kernel filtered version of $z_n^t$ at a scale of $\sigma_t$ pixels.

Spatial gradients denoted as:

$$G=(g_1,g_2,\ldots,g_N), \text{ where } g_n=|\nabla z_n| \quad (Eq.\ 6)$$

are computed by convolving the images with a first-order derivative of Gaussian kernels with standard deviation $\sigma_s$. In some examples, $\sigma_t=\sigma_s=0.8$ can be used to approximate a Nyquist sampling filter. In some examples, spatial-temporal derivatives are computing on the Y color channel. In other examples, the array Z of pixels can be computed in the RGB color space. Motion observables can be denoted $$m=(G,\dot{Z}) \quad (Eq.\ 7)$$

and used as raw image features for discrimination between motion and stasis in the sequence of images.

Generally speaking, segmentation can be expressed as an array of opacity values $\alpha=(\alpha_1, \alpha_2, \ldots, \alpha_N)$. The examples disclosed in the present application focus on binary segmentation, where $\alpha_n \in \{0, 1\}$, 1 denoting a pixel being assigned to (labeled as) foreground and 0 denoting a pixel being assigned to background, respectively. It should be readily discernible that the disclosed methods and apparatus can be applied to examples that use either binary or non-binary segmentation labels.

For example, consider a graph $G(Z, \epsilon)$ having a set of nodes Z, each node of the set representing a pixel of opacity $\alpha$ and each node joined by a number of edges in a set of edges $\epsilon$. A cost function (e.g., an energy function E( )) for the graph can be represented as the sum of four terms: (1) a color likelihood term, (2) a spatial prior term, (3) a temporal prior term, and (4) a motion likelihood term. In some examples, all four of these terms are used in calculating the cost function, while in other examples the terms may be omitted, or other terms added to the cost function. An example cost function can be expressed as follows:

$$E(\alpha^t,\alpha^{t-1},\alpha^{t-2},Z^t,m^t)=U^C(\alpha^t,Z^t)+U^M(\alpha^t,\alpha^{t-1},m^t)+V^T(\alpha^t,\alpha^{t-1},\alpha^{t-2})+V^S(\alpha^t,Z^t) \quad (Eq.\ 8)$$

where $U^C(\ldots)$ corresponds to the color likelihood term, $U^M(\ldots)$ corresponds to the motion likelihood term, $V^T(\ldots)$ corresponds to the temporal prior term, and $V^S(\ldots)$ corresponds to the spatial prior term. Data for the energy terms $U^C$, $U^M$, $V^T$, and $V^S$ can be stored in a table or database so that energy functions based on the energy terms can be easily accessed and/or used for computing minimum energy across multiple images in a sequence of images (e.g., video). In some examples, the energy terms can be multiplied by a weighting factor for each respective energy term.

A number of energy functions can be used for the color likelihood term $U^C(\alpha^t, Z^t)$, for example:

$$U^C(\alpha^t, Z^t) = -\rho \sum_{p \in v} \log p(z_n | \alpha_n) \quad (Eq.\ 9)$$

where $p(z_n|\alpha_n)$ is the probability of pixel $z_n$ being labeled $\alpha_n$ and $\rho$ is a scalar factor. The probability function p( ) is derived from a histogram of the color distributions for the frame Z. The histogram can be based on a single frame (e.g., an initial frame Z of input video, or an initial frame Z that is updated periodically with subsequent frames in input video), or a number of frames (e.g., an average of a number of frames). In some examples, the probabilities stored in the histogram are generated based on the color distributions combined with input from a mobile device in the form of a template boundary, seed location, and/or face detection information. In some examples, probabilities for the probability function p( ) are based on color values constrained by a template positioned based on user input and/or face regions. In other words, an initial template designates which portions of an image are background regions and foreground regions. Based on this designation, a color distribution is computed for foreground and background regions based on contributing pixels designated inside or outside the template. In other examples, probabilities associated with a template can be averaged with probabilities associated with a color distribution and stored in a table to represent the probability function p( ).

Template boundaries can be applied to generate an image representation that has energy terms at or near the template boundary assigned weights in one or more energy terms that make an edge segmentation near the template boundary more likely. Seed locations can be used to assign nodes with a high probability of being labeled as either foreground or background, for example, by assigning a high weight or assigning a sink node or source node to nodes associated with near or at the seed location. Face detection can also be used to assign node probabilities, for example, by assigning nodes in or near a detected face region with probabilities that make the nodes more likely to be labeled as foreground nodes or background nodes (e.g., by assigning a first detected face region to foreground and a second detected face region to background). Use of template boundaries, seed locations, and face detection is not limited to color likelihood terms, and can be used as additional, distinct energy terms in an energy function, or in calculating energy terms (e.g., color likelihood or spatial prior terms).

A number of energy functions can be used for the spatial prior term $V^S(\alpha^t, Z^t)$. For example, the spatial prior term can be based on an Ising term, which tends to impose spatial continuity on labels of pixels in a given frame. This term can also be thought of as a contrast term, with high contrast edges between nodes (e.g., nodes of less similar colors) being assigned lower energies than low contrast edges nodes (e.g., nodes of more similar colors). Better segmentation solutions will tend to be found at higher contrast edges based on such energy assignments.

For pixels in a two-dimensional grid and having four connected neighbors, an example spatial prior term is:

$$V^S(\alpha_m, \alpha_n) = w_{mn} F(m, n) \quad \text{(Eq. 10)}$$

where for nodes p and q having coordinates m=(i, j) and n=(s, t), if |i−s|+|j−t|=1 then F(m, n)=1, otherwise F(m, n)=0. The term $w_{mn}$ is the edge weight for a given edge, and can be assigned based on the contrast between nodes $z_m$ and $z_n$. In some examples, the edge weight combines contrast information from the corresponding pixel colors with contrast information based on input received with a mobile device in the form of a template boundary, seed region, and/or face detection information.

Another example of an spatial prior term can be expressed as:

$$V^S(\alpha^t, Z^t) = -\gamma \sum_{(m,n)\in C} [\alpha_m \neq \alpha_n] \left( \frac{\epsilon + e^{-\mu \|z_m - z_n\|^2}}{1 + \epsilon} \right) \quad \text{(Eq. 11)}$$

where (m, n) index neighboring pixel pairs, C is the set of neighboring pixels (e.g., the node 1211 in FIG. 12A has 4 neighboring pixels), μ is a contrast parameter, ε is a dilution constant, and γ is a scalar factor. In some examples, μ can be defined as $$\mu = \frac{1}{2\langle \|z_m - z_n\|^2 \rangle} \quad \text{(Eq. 12)}$$

where the < > operator denotes expectation over all neighboring pairs of pixels in a portion of an image. The spatial prior term expressed as Equation 11 thus represents a combination of an Ising prior for labeling coherence together with a contrast likelihood that acts to discount partially the coherence terms. The constant γ is a strength parameter for the coherence prior and also the contrast likelihood. The dilution constant ε can be set to 0 for pure color segmentation, although in some examples 1 (or another appropriate value) can be used.

In some examples, the contrast parameter μ and/or the dilution constant ε can be combined with input received with a mobile device in the form of a template boundary, seed location, and/or face recognition information.

A number of energy functions (e.g., based on Markov chains, including second-order Markov chains) can be used for the temporal prior term $V^T(\alpha^t, \alpha^{t-1}, \alpha^{t-2})$ for example:

$$V^T(\alpha^t, \alpha^{t-1}, \alpha^{t-2}) = \eta \sum_n -\log p(\alpha_n^t \mid \alpha_n^{t-1}, \alpha_n^{t-2}) \quad \text{(Eq. 13)}$$

where η is a scalar discount factor to allow for multiple counting across non-independent pixels. The joint temporal term $p(\alpha_n^t \mid \alpha_n^{t-1}, \alpha_n^{t-2})$ is a second order Markov chain that can be used as the temporal prior term. The immediate history of the segmentation of a pixel can be categorized into one of four transition classes, FF, BB, FB, and BF, where the designation "FF" denotes a pixel being labeled foreground at time t−2 and t−1, "FB" denotes a pixel being labeled foreground at time t−2 and labeled background at t−1, etc. A pixel that was in the background at time t−2 and is in the foreground at time t−1 is substantially more likely to remain in the foreground at time t than to return to the background. Note that BF and FB transitions correspond to temporal occlusion and disocclusion events, and that a pixel cannot change layer without going through an occlusion event. These intuitions can be captured probabilistically and incorporated in an energy minimization framework by using a second order Markov chain.

The transition classes FF, BB, FB, and BF can have a number of probabilities (likelihoods) associated with them, as summarized in Table 1:

TABLE 1

| $\alpha^{t-1}$ | $\alpha^{t-2}$ | $p(\alpha^{t-1} = F \mid \alpha^{t-1}, \alpha^{t-2})$ |
|---|---|---|
| F | F | $\beta_{FF}$ |
| F | B | $\beta_{FB}$ |
| B | F | $\beta_{BF}$ |
| B | B | $\beta_{FB}$ |

The foreground probabilities $\beta_{FF}$, $\beta_{FB}$, $\beta_{BF}$, $\beta_{FB}$ can be determined empirically and previously stored in a table, determined by analyzing a sequence of images in input video, or determined by other techniques. Background probabilities are calculated as the complements of the foreground probabilities. Empirically, the BB probability reflects the relative constancy of the background state. The FF probability tends to reflect larger temporal change, and is somewhat correlated with spatial gradient magnitude. Transitional probabilities FB and BF distributions show the largest temporal changes since the temporal samples at time t−1 and t straddle a foreground/background boundary.

The four foreground probabilities can be stored as 2-D histograms for use in likelihood evaluation. In some examples, the probabilities stored in the histogram are generated based on empirically-determined probabilities that are combined with input from a mobile device in the form of a template boundary, seed location, and/or face recognition information. For example, probabilities associated with a template can be averaged with probabilities associated with empirically-determined probabilities based on a sequence of images in input video to produce foreground probabilities $\beta_{FF}$, $\beta_{FB}$, $\beta_{BF}$, $\beta_{FB}$, which can be stored in a table. These foreground probabilities can be combined with color likelihood terms, or other appropriate energy terms, in an energy function.

A number of energy functions can be used for the motion likelihood term $U^M(\alpha^t, \alpha^{t-1}, m^t)$, for example:

$$U^M(\alpha^t, \alpha^{t-1}, m^t) = -\sum_n \log p(m_n^t | \alpha_n^t, \alpha_n^{t-1}) \quad \text{(Eq. 14)}$$

The probability function $p(m_n^t|\alpha_n^t, \alpha_n^{t-1})$ an of Equation 14 can be computed as follows. The observed image motion features can be modeled as $m_n^t=(g_n^t, \dot{z}_n^t)$ based on the segmentation labels $\alpha_n^t$ and $\alpha_n^{t-1}$. Because the temporal derivative $\dot{z}_n^t$ is derived from frames at time t−1 and t, it follows that it should depend on segmentations from those frames. The transitions can be labeled as FF, BB, FB, and BF, having the same meaning as those for the temporal prior term, as discussed above.

The four motion probabilities can be stored as 2-D histograms for use in likelihood evaluation. In some examples, the probabilities stored in the histogram are generated based on empirically-determined probabilities that are combined with input from a mobile device in the form of a template and/or face recognition information. For example, probabilities associated with a template can be averaged with probabilities associated with empirically-determined probabilities based on a sequence of images in input video to produce foreground probabilities $\beta_{FF}$, $\beta_{FB}$, $\beta_{BF}$, $\beta_{FB}$ that are stored in a table. Additional discussion of generation and application of temporal prior and motion likelihood terms is provided below regarding FIG. 14.

Thus, a conditional random field problem formulation is described, including an exemplary cost function comprising four energy terms. As discussed above, in some examples, all four of these terms are used in calculating the cost function, while in other examples the terms may be omitted, or other terms added to the cost function. User input information can be combined with some, all, or none of the energy terms, depending on the particular example.

In some examples, after deriving cost functions for a conditional random field problem, a minimum graph cut can be computed using a suitable algorithm, such as a minimum-cut algorithm or maximum-flow algorithm (e.g., algorithms that use push-relabel, augmenting paths, or other suitable approaches). Suitable algorithms include such graph partitioning algorithms as the Kernighan-Lin, Fiduccia-Mattheyses, Goldberg-Tarjan, simulated annealing, Chan-Vese, GrabCut, and/or Kolmogorov algorithms. After a cut is determined using a suitable algorithm, the nodes (pixels) on one side of the cut are assigned a first label (e.g., 0 or background), and cuts on the other side of the cut are assigned a different label (e.g., 1 or foreground). After determining a minimum cut, small components can be filtered to smooth the output before producing final labels used to partition an image into regions.

One exemplary graph partitioning algorithm that can be applied to partition graph representations in real time is the Kolmogorov algorithm (e.g., the algorithm as discussed in the paper authored by Boykov & Kolmogorov, "An Experimental Comparison of Min-Cut/Max-Flow Algorithms for Energy Minimization in Vision," *IEEE Transactions on Pattern Analysis and Machine Intelligence (PAMI)*, vol. 26, no. 9, pp. 1124-1137 (September 2004)). Generally speaking, given a graph G(V, E), where V is a set of nodes and E is a set of edges, and having a set of source nodes s and sink nodes t, an augmenting path algorithm can be used to find the minimum cut partition for the graph. The Kolmogorov algorithm operates by maintaining two non-overlapping search trees S and T with roots at the source nodes s and the sink nodes t, correspondingly. In tree S, edges from each parent node to its children are non-saturated, while in tree T, edges from children to their parents are non-saturated. Nodes in the graph G that are not in S or T are called "free" nodes.

The nodes in the search trees S or T can be designated as either "active" or "passive." The active nodes represent the outer border in each tree, while the passive nodes are internal nodes. The algorithm proceeds by allowing trees to "grow" by acquiring new children (along non-saturated edges) from a set of free nodes. The passive nodes cannot grow, as they are completely blocked by other nodes from the same tree. Active nodes may come in contact with the nodes from the other tree. An augmenting path is found when an active node in one of the trees detects a neighboring node that belongs to the other tree.

The Kolmogorov algorithm iteratively repeats the following three stages:

"growth" stage: search trees S and T grow until they touch giving an s → t path
"augmentation" stage: the found path is augmented and search tree(s) are broken into forest(s)
"adoption" stage: trees S and T are restored.

During the growth stage, the search trees are expanded. The active nodes explore adjacent non-saturated edges and acquire new children from a set of free nodes. The newly-acquired nodes become active members of the corresponding search trees. As soon as some or all of the neighbors of a given active node are explored, the active node becomes passive. The growth stage terminates if an active node encounters a neighboring node that belongs to the opposite tree. In this case a path from the source to the sink is detected.

The augmentation stage augments the path found at the growth stage. Since the largest flow possible is pushed through the graph, some edge(s) in the path become saturated. Thus, some of the nodes in the trees S and T may become "orphans," that is, the edges linking them to their parents are no longer valid (they are saturated). In fact, the augmentation phase may split the search trees S and T into forests. The source s and the sink t are still roots of two of the trees while orphans form roots of all other trees.

A goal of the adoption stage is to restore single-tree structure of sets S and T with roots in the source and the sink. At this stage an attempt is made find a new valid parent for each orphan. A new parent should belong to the same set, S or T, as the orphan. A parent should also be connected through a non-saturated edge. If there is no qualifying parent, the orphan is removed from S or T to make it a free node, and its former children are designated as orphans. The stage terminates when no orphans are left and, thus, the search tree structures of S and T are restored. Since some orphan nodes in S and T may become free, the adoption stage results in contraction of these sets.

After the adoption stage is completed, the algorithm returns to the growth stage. The algorithm terminates when the search trees S and T cannot grow (e.g., no active nodes remain) and the trees are separated by saturated edges. This implies that a maximum flow is achieved. The corresponding minimum cut can be determined by partitioning the graph into the sets S and T. For example, the sets S and T can correspond to the foreground and background regions respectively, or vice versa.

Figure 10:
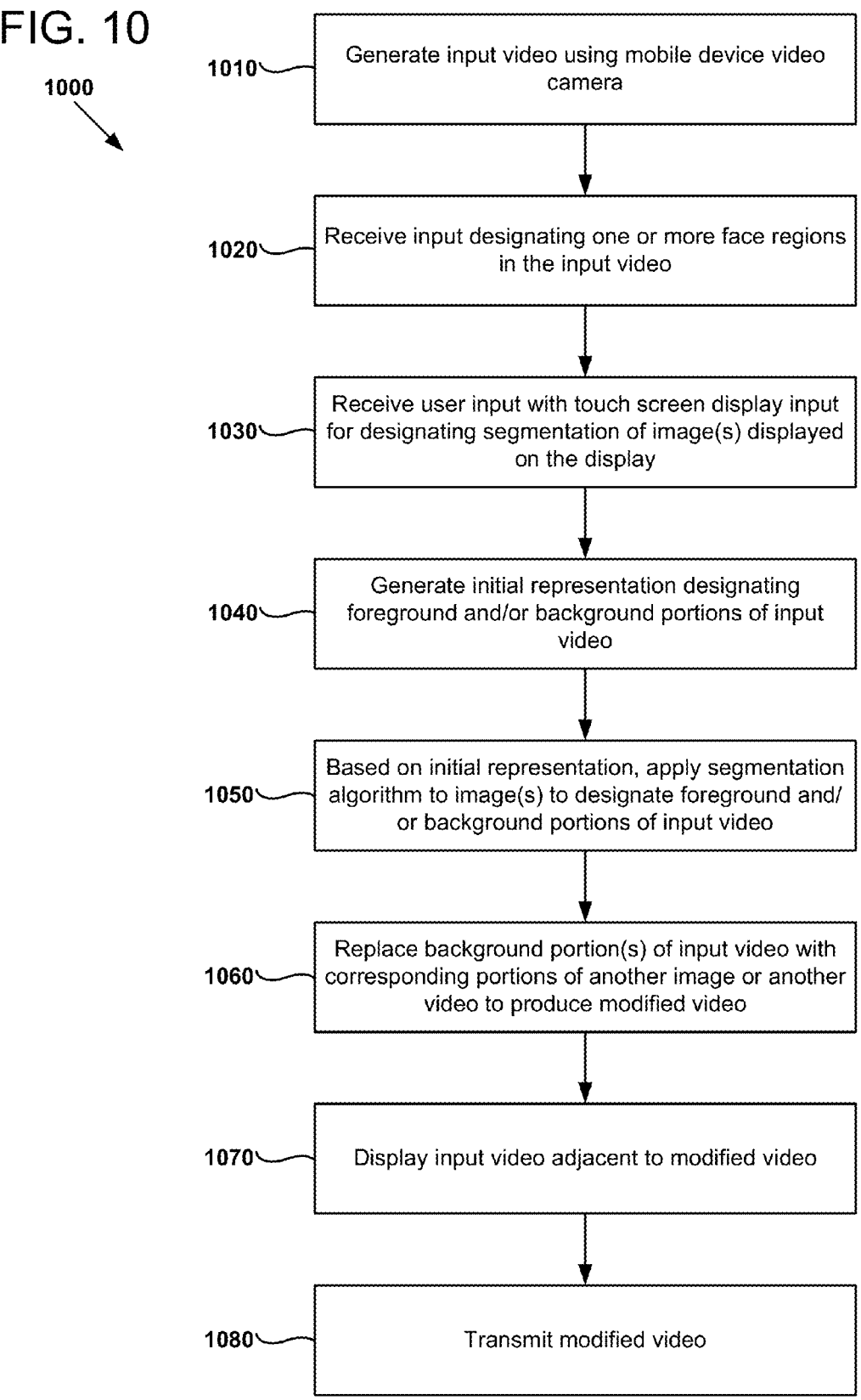
FIG. 10 is a flow chart that further details the exemplary implementation illustrated in FIG. 9.

Example Generation of Initial Representation for Foreground/Background Region Detection FIG. 10 is a flow chart 1000 of another, more detailed exemplary method of generating an initial representation of an image, designating foreground and background regions for the image, replacing background portions of the image with corresponding regions from another image to produce modified video, and transmitting the modified video.

At process block 1010, input video is generated using a video camera, for example, a video camera connected to an image sensor in a mobile device. The video camera can be a front-facing (user-facing) camera (e.g., front-facing camera 260) or a rear-facing camera (e.g., rear-facing camera 262). The input video can be displayed in real-time on a display coupled to a mobile device, such as a touch screen display coupled to a smart phone, tablet computer, television, or other device. As the input video is being displayed, the method proceeds to process block 1020. In some examples, the method skips process block 1020 and proceeds to process block 1030 to position an edge segmentation template based on user input.

At process block 1020, input designating one or more face regions in the input video is received. For example, a software and/or hardware implementation of a Viola-Jones algorithm can be used to designate face regions. As discussed above regarding FIGS. 4A-4D, an edge segmentation template can be positioned by aligning a portion of the template (e.g., a portion associated with a face shape) with a bounding box, x/y coordinates, or other representation of a face region. The edge segmentation template can be scaled according to dimensions of the face region. Further, as discussed above regarding FIGS. 7A-7D, a plurality of face regions is received. In some examples, one face region is selected based on the size of the face region or comparison to previously-generated face detection data. After positioning an edge segmentation template based on the face regions, in some examples, the method proceeds to process block 1030 to receive user input to supplement the face region data, while in other examples, the method proceeds to process block 1040 to generate an initial representation without receiving additional user input.

At process block 1030, user input is received from a touch screen display for designating portions of the input video as foreground or background regions. For example, a template superimposed over the displayed input video, as discussed above regarding FIGS. 3A-B, user touch screen input as described above regarding FIGS. 5A and/or 5B, face detection as described above regarding FIGS. 4A and 4B, and/or 7A-7D, or other suitable input is used. In some examples, additional user input such as a button press or touch screen tap is received to indicate that the user input designating the regions is complete. In other examples, expiration of a time period or other technique is used to determine that the user region designation is complete. The user input designation can be applied to one frame (image) of the input video, or to multiple frames (images) of video (which frames can be periodically selected). In examples where face region data is captured, the user input can be used to fine-tune an initial position of a template. After the user input is received, the method proceeds to process block 1040.

At process block 1040, an initial representation of the foreground and background regions for the image(s) is generated. The initial representation can be generated at least in part based on the face regions received at process block 1020 and/or the user input received at process block 1030. Thus, in some examples, additional information, such as results from face detection (including eye detection and face tracking) received at process block 1020, can be combined with the user input received at process block 1030 to improve the quality of the initial representation. The initial representation can be in the form of a graph for solving a CRF problem, where each pixel of the image(s) being analyzed corresponds to a node, and each node has a number of edges connecting to other nodes. In some examples, each node connects to four other nodes, although different numbers of edges can be used in other examples.

Figure 12A:
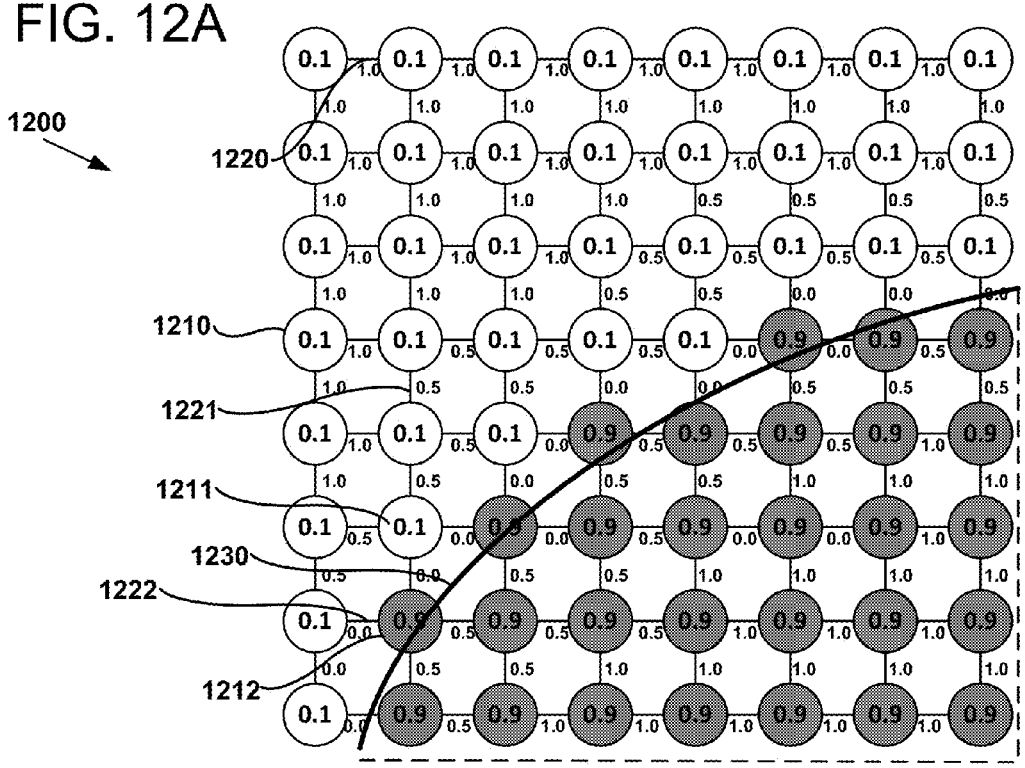
FIGS. 12A-D illustrate a generalized example of a representation for designating foreground and background regions of an image based on a template positioned using user input and/or face detection input.
Figure 12B:
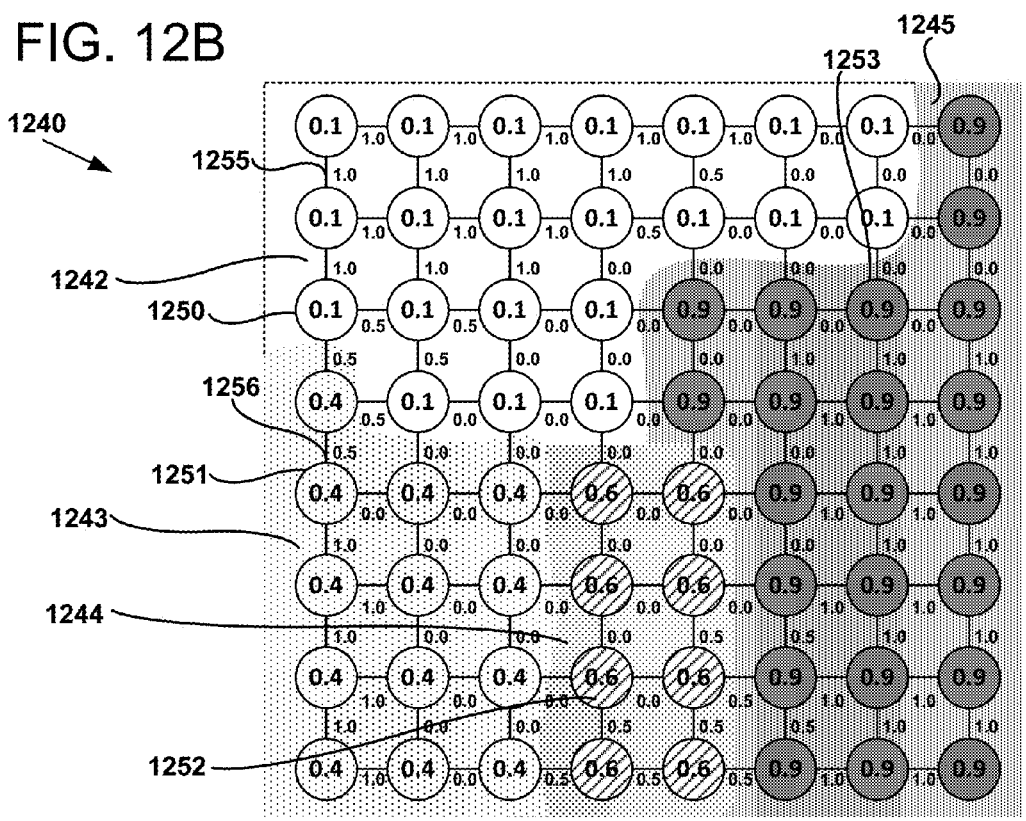
Figure 12C:
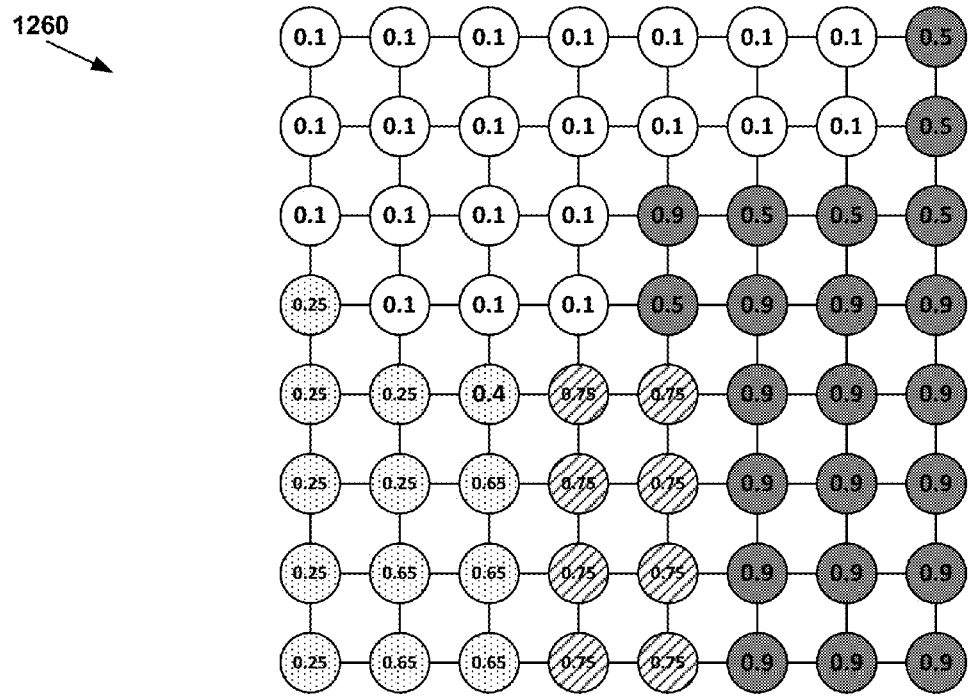

FIGS. 12A-12C depict an example of generating and applying an initial representation as can be used in the example method depicted FIG. 10, in particular, generation of the initial representation at process block 1040. This example of using an initial representation can also be applied to the exemplary methods depicted in FIGS. 9 and 11.

FIG. 12A depicts a portion 1200 of an initial representation (e.g., a graph). As shown, a number of nodes (e.g., nodes 1210, 1211, and 1212) are joined by a number of edges (e.g., edges 1220, 1221, and 1222). Also shown in FIG. 12A is a portion of a template boundary 1230 positioned using user input (e.g., using a finger drag or finger tap, as described above regarding FIGS. 5A and 5B, respectively).

As shown in FIG. 12A, the nodes in the portion 1200 of the initial representation are assigned a foreground probability based on the position of the template. Each node corresponds to a single pixel of an image (e.g., a frame of video), and is assigned a probability value, based on whether the nodes are inside or outside a region defined by the template boundary 1230. Probabilities for color likelihood terms are shown for the nodes in the initial representation of FIG. 12A. A low probability (e.g., p=0.1, assigned to node 1210) is used to indicate that the associated pixel is likely to correspond a background region, and a high probability label (e.g., p=0.9, assigned to node 1212) is used to indicate that the associated pixel is likely to be assigned to a foreground region. The nodes designated as having a high probability of being labeled as foreground are shaded in FIG. 12A for clarity. While the example in FIG. 12A includes two probability values (e.g., 0.1 and 0.9), different probability values for the nodes can be used. In other examples, the probability values can be based at least in part on the distance of a node from the template boundary 1230 (e.g., as a linear or non-linear function of the distance from the template boundary).

FIG. 12A also illustrates a number of edges (e.g., edges 1220, 1221, and 1222) having weights assigned (e.g., 1.0, 0.5, and 0.0, respectively) based on the template boundary 1230 that is positioned using user input. The weights are assigned based on a spatial prior term. Because edges closer to the template boundary 1230 are more likely to be close to the desired image segmentation boundary, those edges are assigned a lower weight (e.g., 0.0), while edges further from the template boundary 1230 are assigned a higher weight (e.g., 1.0). Thus, partitioning solutions with lower energy function values will tend to have partitions along edges having a lower assigned weight.

FIG. 12B depicts a portion 1240 of an image representation based on pixel color values for a number of pixels. The representation includes four different color regions 1242, 1243, 1244, and 1245. As shown, a number of nodes (e.g., nodes 1250, 1251, 1252, and 1253) are assigned different node energies based on the color of the corresponding pixel in each node's respective region (e.g., node energies of 0.1, 0.4, 0.6, and 0.9, respectively). Also shown are a number of edges (e.g., edges 1255 and 1256) that have weights assigned based on the color of the nodes joined by the respective edges (e.g., weights of 1.0 and 0.5, respectively). In some examples, a contrast function can be applied to determine the edge weights. In some examples, only the color of the two nodes joined by an edge are considered for the edge weights, while in other examples, the color of multiple nodes near an edge are considered when weighting edges.

FIG. 12C depicts a portion 1260 of an image representation that combines the node energies and edge energies assigned to the representations of FIGS. 12A and 12B. As shown, the node energies from the portion 1200 of the initial representation in FIG. 12A and the portion 1240 in FIG. 12B have been averaged to produce averaged node energy values. In some examples, the node energy values are averaged evenly, while in other examples, node energy values based on user input can be given a higher or lower weighting (e.g., by applying a linear or non-linear function) compared to the node energy values based on pixel color values. The values for averaged edge weightings are not depicted in FIG. 12C, but are also based on combining edge energies from FIGS. 12A and 12B.

At process block 1050, a graph corresponding to the image representation generated at process block 1030 is analyzed to solve for the min cut of the graph. This cut represents the boundary calculated between foreground pixels and background pixels. For example, a graph partitioning algorithm (e.g., the Kolmogrov algorithm) can be used to generate an edge segmentation of the initial representation designating foreground and/or background portions of the input video.

Figure 12D:
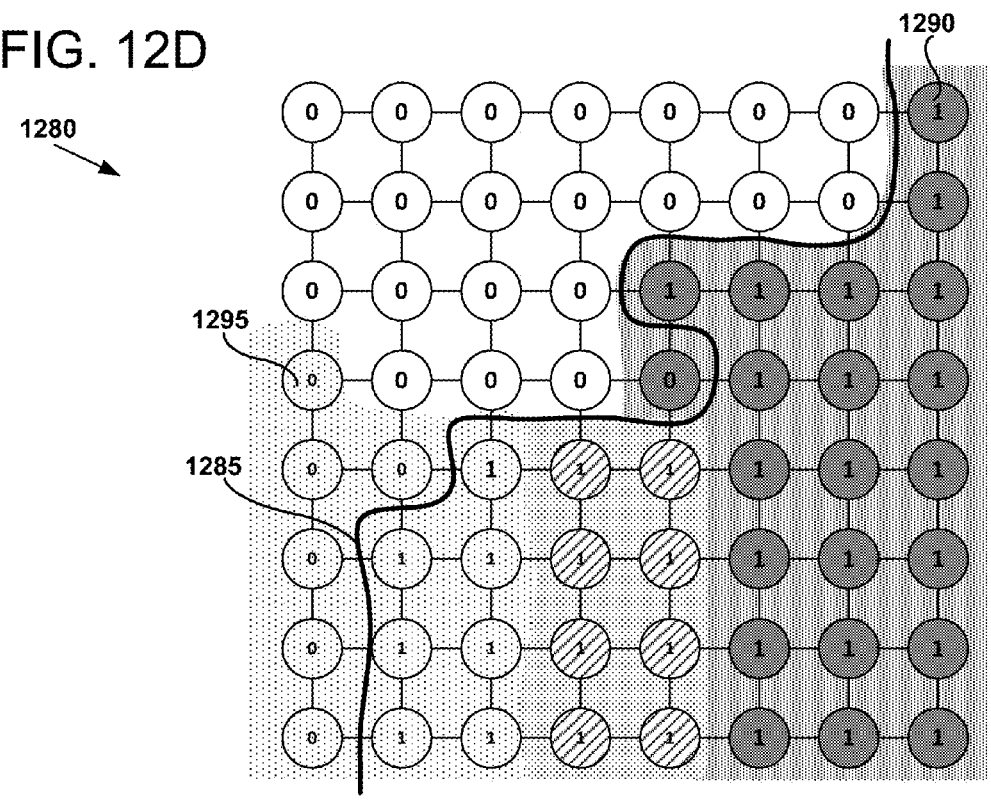

FIG. 12D depicts a portion 1280 of an image representation that has foreground/background labels 1 and 0, respectively, assigned based on an edge segmentation 1285 computed by partitioning the representation of FIG. 12C based on its respective node energies and edge energies. Also shown are the corresponding color regions from FIG. 12B. The edge segmentation 1285 can be generated using a min-cut algorithm to partition the representation of FIG. 12C. As shown, foreground nodes (e.g., node 1290) are labeled 1 and background nodes (e.g., node 1295) are labeled 0.

Figure 14:
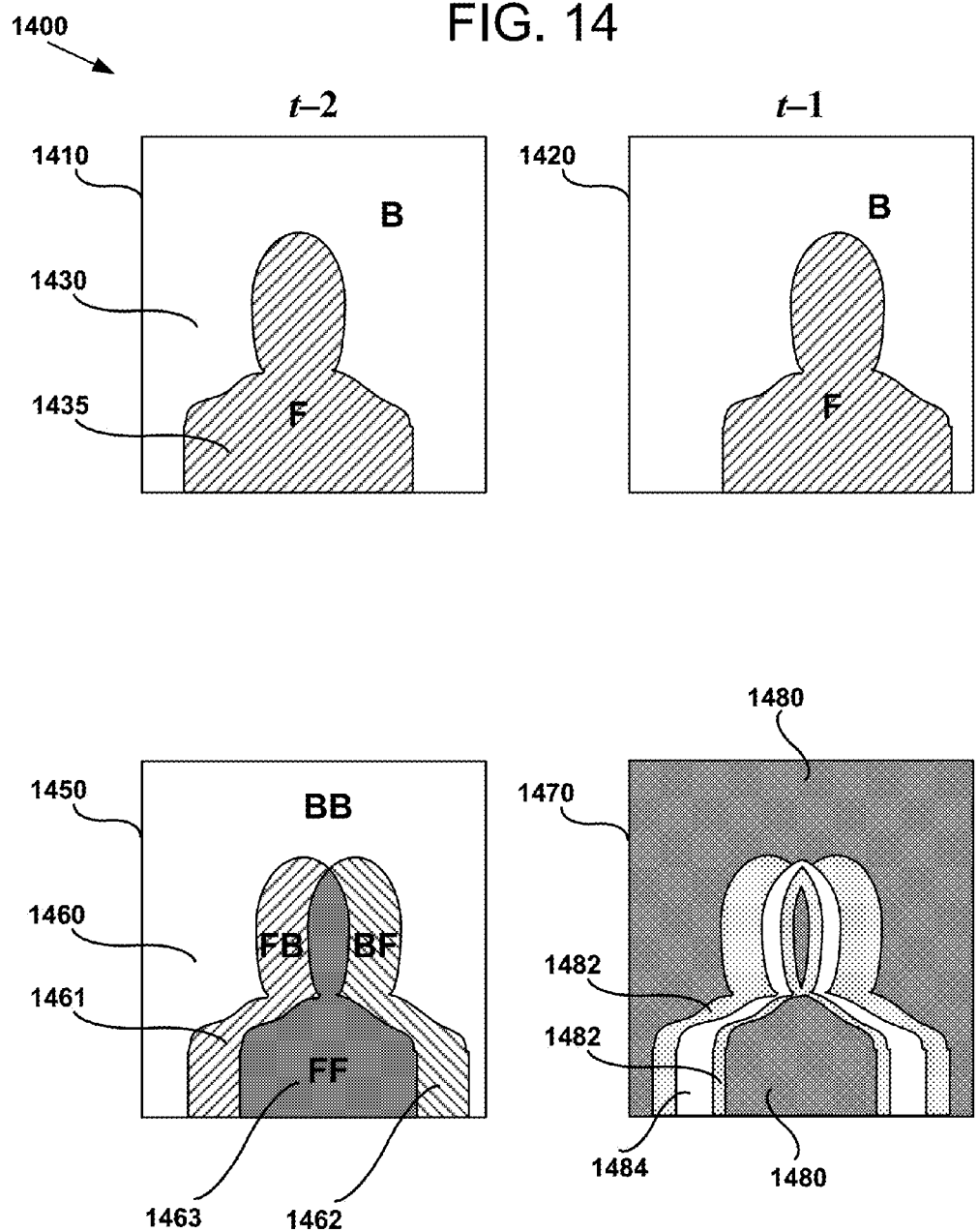
FIG. 14 illustrates a generalized example of temporal prior and motion likelihood energy terms.

FIG. 14 illustrates a generalized example of generating temporal prior and motion likelihood energy terms as can be used at process blocks 1030 and 1040, as well as the CRF techniques incorporating user input, as described above. FIG. 14 is an illustration 1400 that depicts two previous frames 1410 (at time=t−2) and 1420 (at time=t−1) for a current image frame (at time=t) (not shown). As shown, the previous frames 1410 and 1420 have been previously segmented to generate background regions (e.g., background region 1430) and foreground regions (e.g., e.g., foreground region 1435). The foreground region is shown moving from left to right between frames 1410 and 1420.

Also shown in FIG. 14 is a depiction 1450 of the transition classes (1460-1463) for the current image frame based on the two previous frames 1410 and 1420, the transition classes (1460-1463) corresponding to transitions BB, FB, BF, and FF, respectively. The generation and use of the transition classes in temporal prior energy terms is described in further detail above regarding conditional random fields.

Also shown in FIG. 14 is a depiction 1470 of motion likelihoods generated for the current image frame. Generation and use of motion likelihood energy terms is described in further detail above regarding conditional random fields. As shown, the lowest motion likelihood regions 1480 for the image have the darkest shading, higher motion likelihood regions 1482 have lighter shading, and the highest motion likelihood regions 1484 are shown with the lightest shading.

At process block 1060, background portions of the image are replaced with corresponding portions of another image or video to produce modified video. For each pixel in the image, it is determined whether the pixel has been assigned to the foreground or background regions at process block 1050. Then, a corresponding pixel in another image is used to replace the pixel in the background region. In some examples, the other image is a simply a fill pattern (e.g., the fill pattern for the remainder portions 825, as shown in FIG. 8B), while in other examples, the other image is a photograph (e.g., the remaining portion 865 of a replacement image, as shown in FIG. 8C). In some examples, a filter is applied to the background regions of the input video (e.g., a blurring filter to obscure background regions). In some examples, the other image is video. Once one or more frames of modified video are ready for display, the method proceeds to process block 1070.

At process block 1070, the original input video received at process block 1010 and the modified video produced at process block 1060 are displayed concurrently on one or more displays. In some examples, the input video and modified video are displayed adjacent to one another (e.g., as shown in FIG. 6B). In other examples, the input video is displayed as an inset picture within the modified video (e.g., as shown in FIG. 6A). In other examples, input video is displayed on one screen and the modified video is displayed on a second screen. For example, the input video can be displayed on a mobile device screen 2041 while the modified video is displayed on a television screen 2042. By displaying the input video and modified video adjacent to each other, a mobile device user can monitor the quality of background replacement and make adjustments if needed (e.g., by adjusting the position of the video camera or re-positioning the template).

At process block 1080, the modified video is transmitted. The modified video can be received by another user of a video chat, video conferencing, or other suitable application. Hence, a method of masking background areas based on user input and/or face detection is provided. By replacing background portions of the input video with a fill pattern or corresponding portions of another image, as user can preserve privacy by not revealing the background regions to a recipient of the modified video, thus concealing the background area or other persons that may be in the background. Concealing the background can also reduce network bandwidth used to transmit the modified video. For example, replacing the background with a fill pattern produces highly compressible data. In some examples, only foreground regions are transmitted as the modified video, and the background regions are produced by another computing device (e.g., at a server in a computing cloud or at a computing device used by a recipient of the modified video).

Example Re-Use of Image Representation for Foreground/Background Region Detection FIG. 11 is a flow chart 1100 that details another, more detailed exemplary method of generating representations for segmenting a sequence of images using input received with a mobile device (e.g., user input and/or face regions), as can be used in certain embodiments of the disclosed technology.

At process block 1110, a number of processing parameters based on usage of computing resources are determined. Suitable computing resources include processor load, processing resources, type of power source (e.g., whether a battery or AC power is connected to a mobile device), battery state of charge, or other suitable resources. Suitable processing parameters that can be determined based on the usage of computing resources include degree of connectivity of a graph representation of one or more frames of video, whether to use face detection, eye detection, and/or face tracking, resolution of a graph representation used to represent video frames (e.g., whether to use superpixels), whether to operate on a subset (instead of a full set) of pixels (e.g., by eliminating or ignoring some pixels as described below regarding FIGS. 15A and B), whether to subsample frames, complexity of energy function(s) used to model a frame, whether to apply a number of terms of an energy function (e.g., whether and/or how to include: color likelihood terms, spatial prior terms, temporal prior terms, and/or motion likelihood terms), or other suitable processing parameters. The processing parameters determined at process block 1110 can be used to determine parameters used at subsequent process blocks of the method. After determining the processing parameters, the method proceeds to process block 1120.

At process block 1120, a determination is made whether to reuse a previous image representation. In some examples, this determination is based on a period of time. For instance, an image representation can be re-used for a period of one second of input video, after which the image representation is regenerated. In other examples, the determination is based on quality of the modified video, or based on a quality level designated by a mobile device user. In some examples, the determination is based at least in part on input received from one or more input devices, such as proximity sensors, compasses, accelerometers, gyroscopes, or light sensors. In some examples, the determination is based on the input video, for example, the image representation is re-used unless an excessive amount of motion is detected. In some examples, the determination is based on the processing parameters determined at process block 1110. For example, an image representation is re-used for a longer period of time of computing or power resources are more limited, or re-used for a shorter period of time if computing or power resources are less limited. If a determination is made to re-use a previous image representation, the method proceeds to process block 1140 to combine the previous representation with data for the frame currently being proceeds. If a determination is made to not re-use the previous image representation, the method proceeds to process block 1130 to generate a new representation based on user input.

At process block 1130, a new image representation is generated based on an edge segmentation template positioned using input generated with a mobile device. For example, user input and/or face detection can be used in positioning the edge segmentation template. The edge segmentation template is used for generating a number of designated regions for a sequence of images. This new image representation is based on a different image than the one the previous image representation was based on. In some examples, the designated regions can include data representing boundaries between probable background and foreground regions in the sequence of images. Portions of an image near a designated region boundary will tend to have lower energy values assigned, as the uncertainty of the region being foreground or background is high. In some examples, the designated regions include data representing seed regions in the sequence of images. Seed regions designate points, lines, areas, or other suitable portions in the sequence of images as having a very high probability of being labeled as either foreground or background. In some examples, nodes associated with the seed regions are designated as source and/or sink nodes and a max-flow/min-cut algorithm is applied. As described above, face detection can also be used to generate the designated regions. In some examples, a graph representing each pixel as a node in a 4-way connected graph is generated. In other examples, nodes can be connected in an 8-way or other suitable connectivity model (e.g., as discussed below regarding FIG. 16).

At process block 1140, the new image representation produced at process block 1130, or a previously-generated image representation (e.g., an image representation for a different image), is combined with data from a current frame in a sequence of images. For example, labels, energy terms, weights, and/or intermediate solution values (e.g., flows computing when solving a graph representation using maximum-flow techniques) can be combined with the image representation to produce a new image representation.

FIGS. 13A-13D illustrate a generalized example of combining an image representation with data from a current frame in a sequence of images as can be used with the exemplary method of FIG. 11 and in particular, at process blocks 1130 and 1140.

Figures 13A, 13B, 13C, 13D:
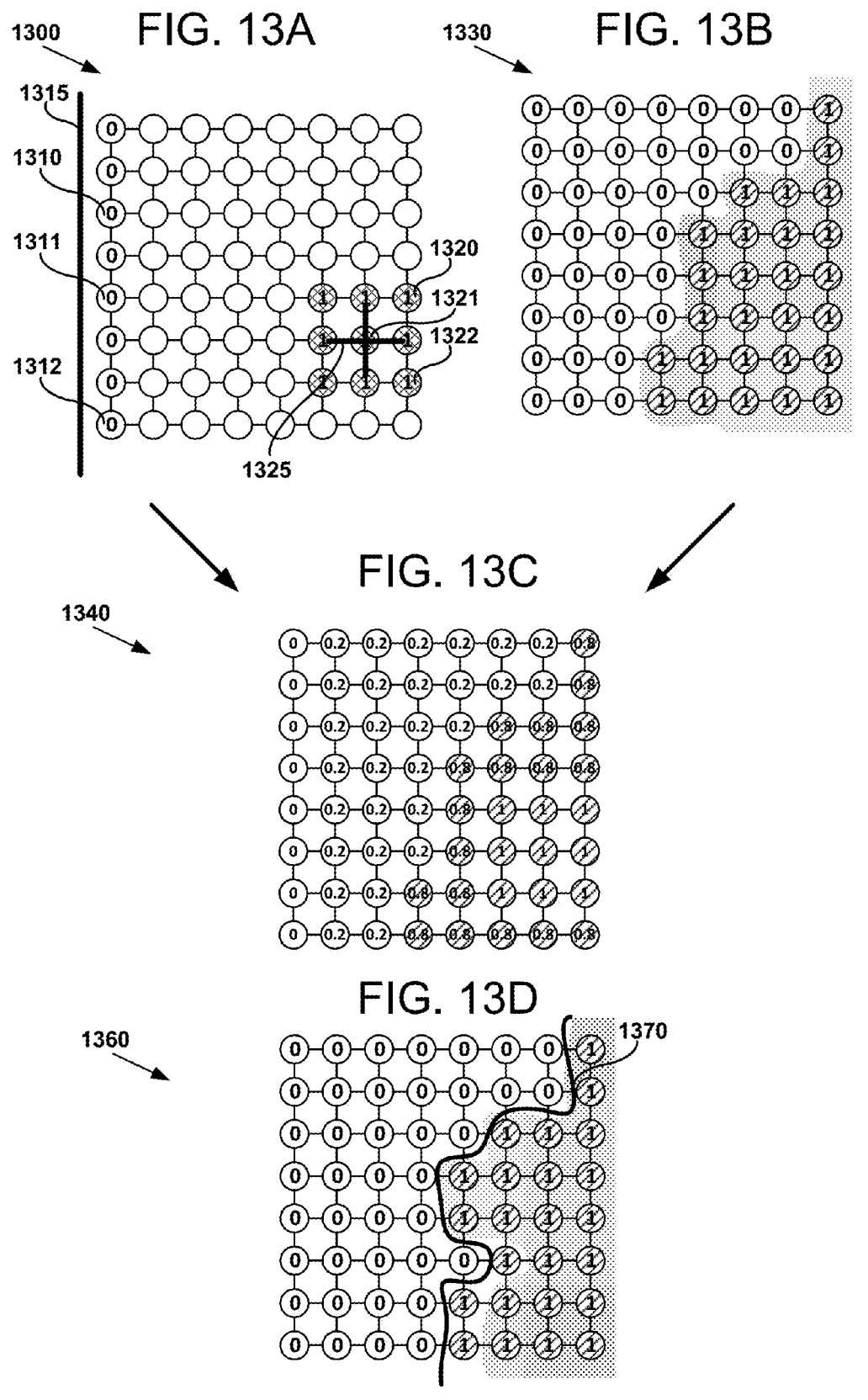

FIG. 13A illustrates a portion 1300 of an image representation including data for designated seed regions. As shown, a number of nodes (e.g., nodes 1310-1312) near an edge 1315 of an image have been designated as surely background nodes by assigning probabilities of 0.0 to the nodes immediately adjacent to the edge. Also shown are a number of nodes 1320-1322 adjacent to crosshairs 1325. The crosshairs 1325 indicate the location of tapping user input received with a mobile device. As shown, the cross-hatched nodes (e.g., nodes 1320-1322) are assigned probabilities of 1.0 to indicate that these nodes have been designated as surely foreground nodes. The portion 1300 of the image representation can be generated at process block 1130, or be a previously-generated image representation.

FIG. 13B illustrates a portion 1330 of a previously-generated image representation that was generated based on a previous frame of video. As shown, a number of nodes are labeled 0 or 1 to correspond to pixels being designated as background or foreground, respectively.

FIG. 13C illustrates a portion 1340 of an image representation generated by combining the image representation portions 1300 and 1330. As shown, a number of probabilities are assigned to the nodes. Nodes corresponding to surely background nodes (e.g., node 1310) and surely foreground nodes (e.g., 1320) are assigned probabilities of 0 and 1, respectively. In other examples, the surely foreground/background nodes are assigned relatively high weights besides 0 and 1. A number of nodes have probabilities assigned by combining node energy values using a linear or non-linear function.

At process block 1150, background regions of an image are designated by computing an edge segmentation for the updated graph representation produced at process block 1140 using a suitable technique. For example, an energy function is generated based on the combined image representation produced at process block 1140. Based on the processing parameters determined at process block 1110, the energy function can include a number of different terms. For example, reduced computing resources are used in an energy function that uses only color likelihood and spatial prior terms in comparison to an energy function that uses color likelihood, spatial prior, temporal prior, and motion likelihood terms. Other parameters of the representation, such as subsampling level, use of superpixels to represent multiple pixels, or other suitable adjustments to the representation used can be made based on the determined processing parameters. A suitable scaling factor can be applied to combine the energies based on the representation produced at process block 1140 and the energies based on the image itself.

Next, an edge segmentation is generated using a suitable techniques, such as graph partitioning. For example, a max-flow/min-cut algorithm as discussed above can solve for the minimum cut of the graph. This minimum cut is then used as the boundary for determining foreground and background regions of the image. After determining a minimum cut, small components can be filtered to smooth the output before producing the final labels used to partition an image into regions in order to produce a final edge segmentation for the image frame.

FIG. 13D illustrates an example of a portion 1360 of an image representation after an edge segmentation 1370 has been generated (e.g., an image segmentation generated based on a combined image representation as at process block 1150). As shown, a number of labels are assigned to designate foreground and background regions for the image.

At process block 1160, one or more designated background regions of the image produced at process block 1150 are replaced with corresponding regions from another image. In some examples, the other image is simply a predetermined pattern (e.g., a solid white background, a background having a filled pattern, or other predetermined pattern). In some examples, the other image is a blurred image of the image being processed. In some examples, the other image is a photograph or image selected from a video source. Examples of this replacement are shown at FIGS. 7A-D and 8A-D. The modified images are produced as a modified sequence of images, which can be transmitted to other users for display (e.g., in a video conferencing application).

At process block 1170, the modified sequence of images is displayed. The sequence of images can be displayed on a screen viewed by a remote video call recipient. The modified sequence can also be displayed to the user of video camera that is capturing the images. For example, the images received at process block 1120 and the modified images produced at process block 1160 can be displayed in a picture-in-picture format, as shown in FIG. 6A.

Example Processing Using a Subset of an Image Representation

Figure 15A:
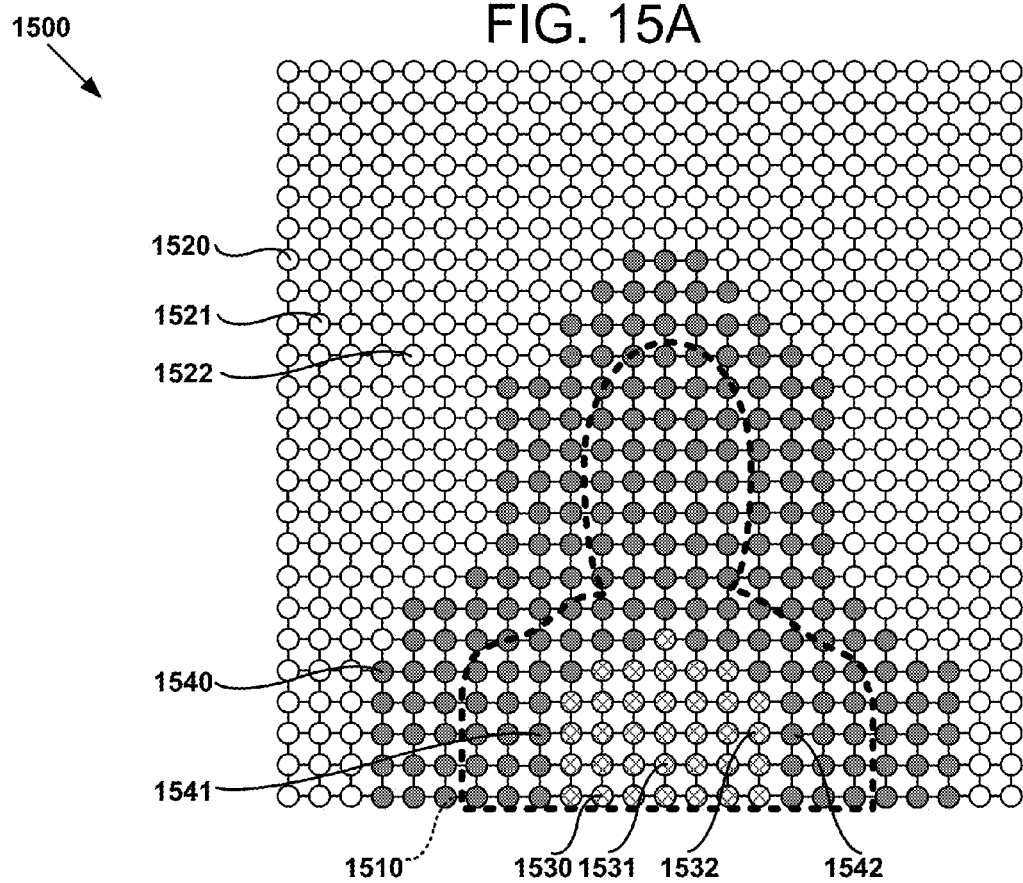
FIGS. 15A and B illustrate a generalized example of generating a partial frame representation to designate foreground and background regions using a subset of an image.

In some examples, user input and/or face regions can be used to reduce the memory and/or computing resource usage needed to generate and apply a representation of an image. FIG. 15A depicts a portion 1500 of an image representation that has assigned nodes to three regions based on user input. As shown, a template 1510 is superimposed over a corresponding image of input video. The corresponding internal representation includes a number of nodes designated as surely background nodes (e.g., surely background nodes 1520-1522), as surely foreground nodes (e.g., surely foreground nodes 1530-1532), or as uncertain nodes (e.g., uncertain nodes 1540-1542). These designations can be based on the distance of the nodes from the superimposed template 1510, which can be positioned using face detection and/or user input. In some examples, these designations are based on other user input in combination with one or more energy terms.

The surely background nodes of FIG. 15A are indicated by no shading, the surely foreground nodes are indicated by a cross-hatch shading (e.g., surely foreground node 1530), and the uncertain nodes are indicated by a different shading (e.g., uncertain node 1540).

Figure 15B:
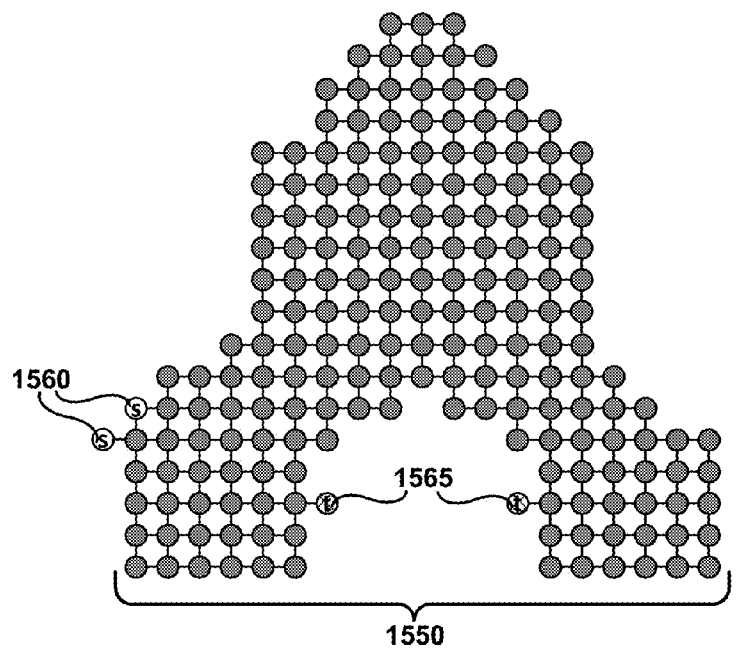

By designating surely foreground and background nodes, these nodes can be eliminated from the internal representation, as shown in FIG. 15B, which depicts an uncertain portion 1550 of the image representation from FIG. 15A. In some examples, computation of an energy function and generation of an image segmentation can be performed only for the subset of nodes in the image representation that are in the uncertain portion 1550. For example, the subset of uncertain nodes can come from one or more previous frame segmentations. In some examples, nodes and/or edges that would be adjacent to the uncertain nodes (e.g., uncertain nodes 1540-1542), are labeled as source and/or sink nodes (e.g., the nodes labeled s 1560 and t 1565), or assigned a very high or very low weighting. Thus, as illustrated in FIGS. 15A and B, an image representation based on a subset of nodes in an initial image representation can be analyzed to produce an edge segmentation. The example techniques illustrated by FIGS. 15A and B can be used, for example, in generating and combining representations, as discussed above regarding FIG. 11, or producing and applying segmentation, as discussed above regarding FIG. 10.

Example Alternative Representation

Figure 16:
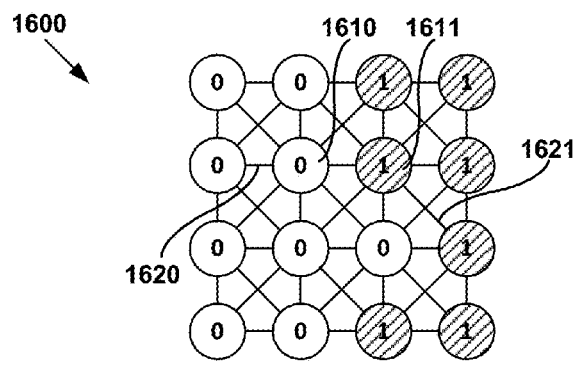
FIG. 16 illustrates a generalized example of a representation for designating foreground and background regions of an image.

FIG. 16 is a diagram of portion 1600 of an alternative representation that can be used in some implementations of the disclosed technology. As shown, a portion of a graph includes a number of nodes (e.g., nodes 1610 and 1611), which are connected to other nodes using a number of edges (e.g., edges 1620 and 1621, respectively). In contrast to the example representations depicted in FIGS. 12A-D, the nodes of the portion 1600 of the graph representation have eight edges connecting them to other nodes. Thus, more accurate edge segmentation results can be obtained, but an increased amount of computing resources will be used. By determining processing parameters while preparing representations for edge segmentations (e.g., as discussed above regarding process block 1110 of FIG. 11), video applications can trade off edge segmentation quality vs. compute resource usage.

Example Superpixel Representations

Figure 17:
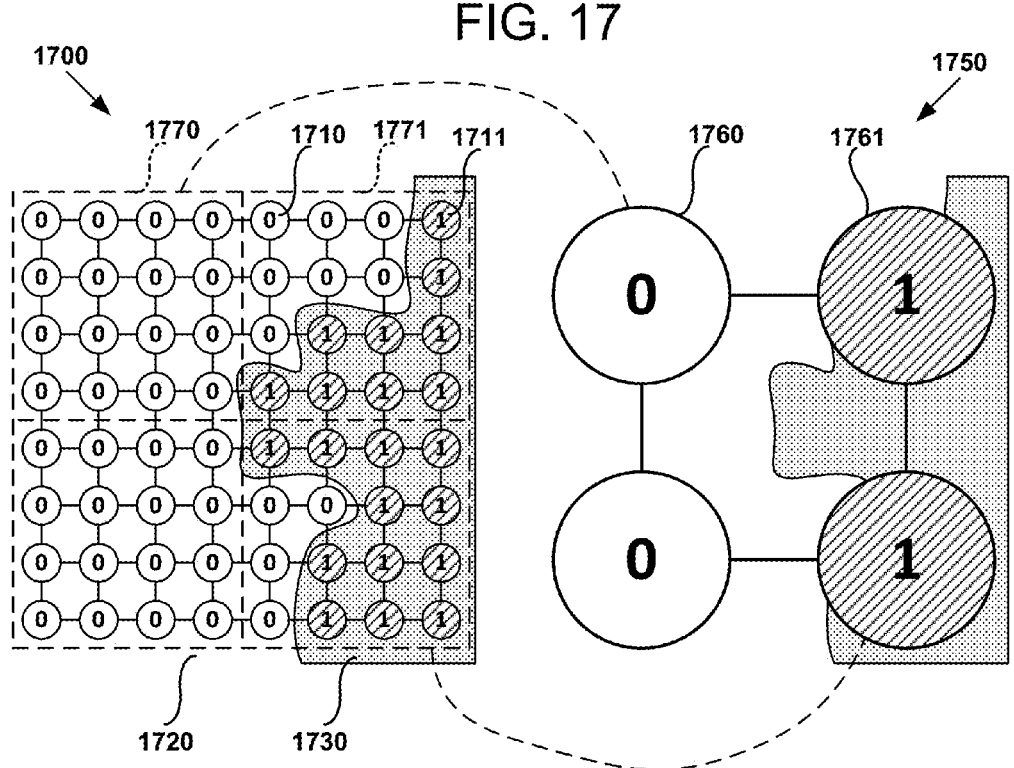
FIG. 17 illustrates a generalized example of assigning superpixels in a representation of an image for designating foreground and background regions of an image.

FIG. 17 is a diagram of an alternative image representation using nodes denoted as "superpixels." As shown, a first representation 1700 includes a number of nodes (e.g. nodes 1710 and 1711) and edges. The nodes represent pixels for a video image frame, including a background region 1720 and a foreground region 1730. A second representation 1750 uses a number of superpixels, which are represented with superpixel nodes (e.g., superpixel nodes 1760 and 1761). As shown, each superpixel node corresponds to a group of 16 pixels of a video image frame. In other examples, a superpixel corresponds to a group of a different number of pixels (e.g., 4, 8, or 32 pixels).

For the example shown in FIG. 17, a first group 1770 of pixels corresponds to superpixel node 1760 and a second group 1771 of pixels corresponds to superpixel node 1761. By using superpixels, the amount of memory used to store the second representation 1750 is substantially reduced in comparison to that used for the first representation 1710. Thus, the second representation 1750 can be modeled, and edge segmentation solutions computed, using less memory and processing time. Determining which nodes are associated with which superpixel nodes (e.g., superpixel nodes 1760 and 1761) can be computed based on an unsupervised over-segmentation of the frame (using, e.g., a mean-shift algorithm, k-means algorithm, or other suitable clustering algorithm). In other examples, nodes are determined to be associated with superpixel nodes based on adjacency to other nodes (e.g., by selecting nodes adjacent to a particular node, or nodes with a designated region).

In some examples, one or more terms of the energy function are based on superpixels, while other terms are based on pixels. In some examples, one or more energy terms are described based on the probability of a superpixel to be assigned a certain label. This probability can be formulated in terms of the superpixel neighborhood, hence encoding relationships between superpixels.

In some examples, a single initial unsupervised segmentation is used. In other examples, multiple initial segmentations are used. In some examples, one or more images are partitioned into a set of non-overlapping superpixels (e.g., by applying QuickShift, as described in Vedaldi & Soatto, "Quick Shift and Kernel Methods for Mode Seeking," *Proc. of the IEEE Conf. on Computer Vision and Pattern Recognition* (CVPR 2008), or another suitable algorithm).

For example, multiple segmentations (e.g., six segmentations) can be used to produce superpixel neighborhoods by varying three parameters: λ (the trade-off between color and spatial importance) σ (the density estimation scale) and τ (the maximum distance in the feature space between members of the same region). For each of the segmentations, a superpixel neighborhood is derived. Superpixels include pixels sharing similar visual properties such as color, intensity and texture. Hence the shape of a superpixel is arbitrary. A superpixel neighborhood can be simply taken as the set of superpixels touching the superpixel under consideration by at least M pixels (e.g., M=1). A superpixel neighborhood can be taken as superpixels at a distance of less than K pixels from a given superpixel under consideration (e.g., K<2). SVM (Support Vector Machine) classifiers are then utilized to compute the likelihood of a superpixel being assigned to each one of the labels. Each of the segmentations is obtained independently from other ones. An exemplary SVM classifier is discussed in Duda et al., "Linear Discriminant Functions," in PATTERN CLASSIFICATION, Chapter 5, (2d ed. 2001).

The superpixel segmentations can then be applied for image segmentations as an additional term in a CRF energy function. A clique (superpixel) c is a set of random variables $X_c$ that are conditionally dependent on each other. Given a set S of the cliques resulting from multiple segmentations for an image I, a labeling is found to minimize an additional clique (superpixel) term in a CRF energy function:

$$E_{superpixel}(x) = +\sum_{c \in C} \psi_i(x_c) \quad \text{(Eq. 15)}$$

In some examples, a superpixel energy term is used in addition to other terms of an energy function (e.g., a color likelihood term). In other examples, the superpixel energy term of Equation 15 can replace one or more other energy terms of an energy function (e.g., replace the color likelihood term). The unary potential is calculated as the negative log likelihood of variable $X_i$ taking the label $x_i$. SVM classifier outputs give the likelihood of a superpixel c to be assigned to one of labels.

It should be noted that as S is a set of different segmentations of the input image, then a pixel may belong to more than one superpixel. However, by using only one segmentation for unary values, each pixel is assigned to only one superpixel.

Figure 18A:
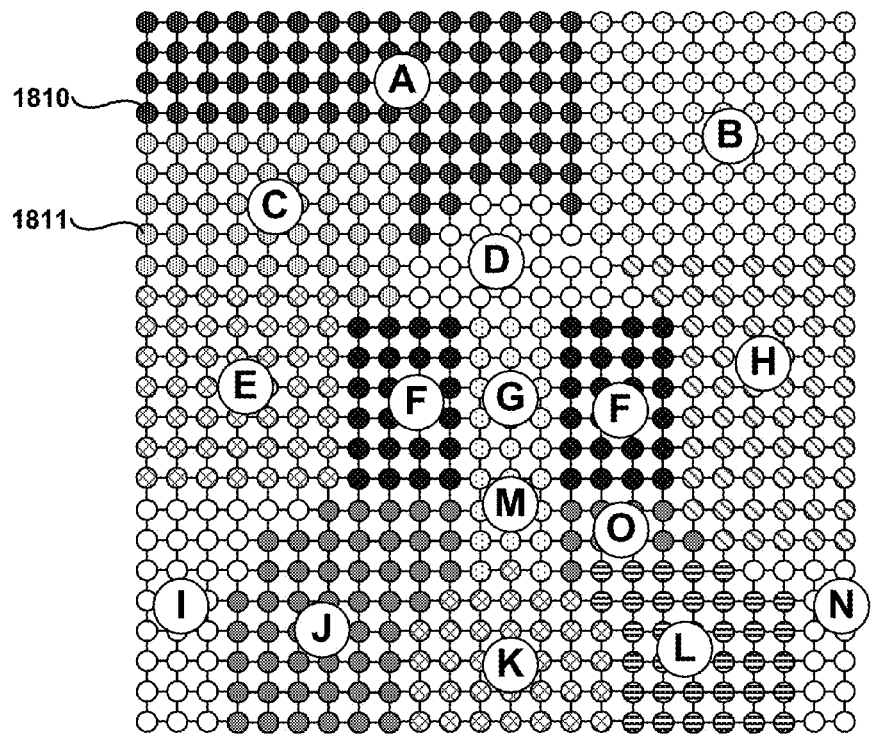
FIGS. 18A-B illustrate another generalized example of assigning superpixels in a representation of an image for designating foreground and background regions of an image.
Figure 18B:
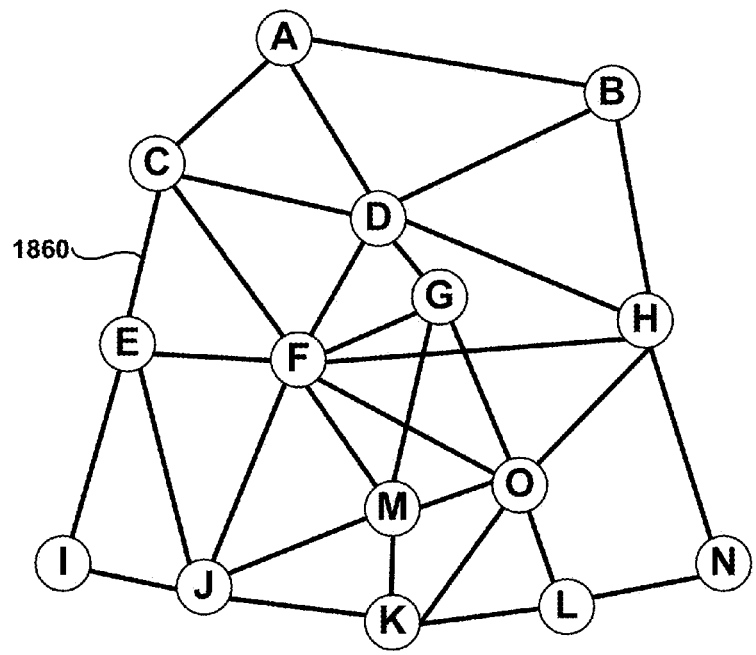

FIGS. 18A-18B are diagrams of an alternative superpixel representation. As shown, a first representation 1800 includes a number of nodes (e.g. nodes 1810 and 1811) and edges. The nodes represent pixels for a video image frame, and have been assigned to superpixel groups (e.g., group A, B, C, D, E, F, etc.) based on one or more of the following terms: pixel color, pixel color likelihood, pixel motion likelihood, or other suitable term. Pixels in a particular group are denoted by shading. In contrast to the superpixel representation of FIG. 17, the nodes of the first representation 1800 are not grouped in regular groups. Further, pixels assigned to a particular group need not be contiguous. For example, group F includes pixels located in two non-contiguous areas. A second representation 1850 uses a number of superpixels, which are represented with superpixel nodes (e.g., superpixel node A, associated with nodes such as node 1810 assigned to group A, and superpixel node C, associated with nodes such as node 1811 assigned to group C). As shown, each superpixel node corresponds to one of the groups of pixels in the first representation 1800. Each of the superpixel nodes has a number of edges (e.g., edge 1860) that connect each superpixel node to another superpixel node within a superpixel neighborhood. Although the edges of the second representation 1850 are based on contiguous groups of superpixels, in other examples edges can be assigned based on other suitable criteria.

Thus, by using superpixels, the computing resources and memory used to generate and store the second representation 1850 is substantially reduced in comparison to that used for the first representation 1800. Thus, the second representation 1850 can be modeled, and edge segmentation solutions computed, using less memory and processing time. As discussed above regarding FIG. 17, determining which nodes are associated with which superpixel nodes can be computed based on an unsupervised over-segmentation of the frame, or based on adjacency to other nodes. In some examples, one or more terms of the energy function are based on superpixels, while other terms are based on pixels. In some examples, one or more energy terms are described based on the probability of a superpixel to be assigned a certain label.

Example Computing Environment

Figure 19:
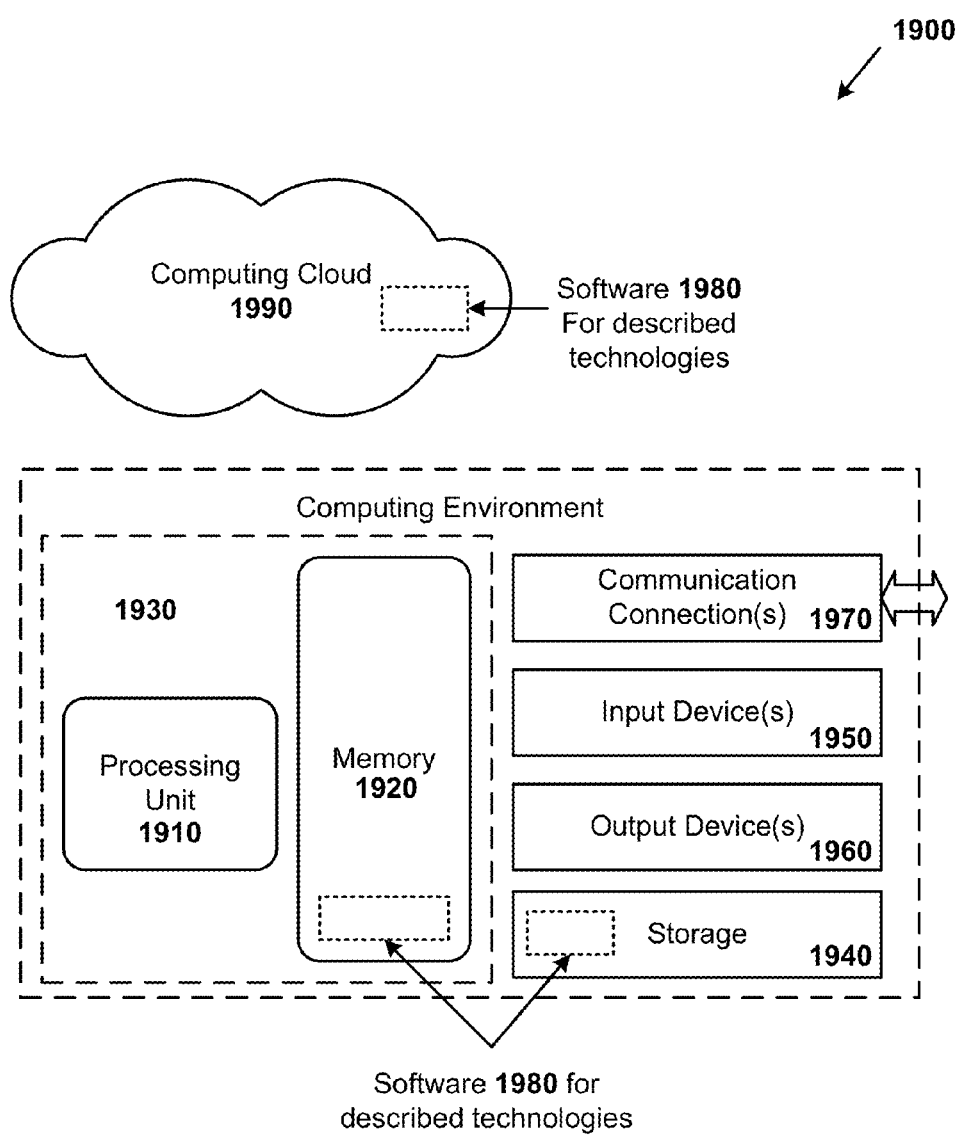
FIG. 19 illustrates a generalized example of a suitable computing environment in which described embodiments, techniques, and technologies can be implemented.

FIG. 19 illustrates a generalized example of a suitable computing environment 1900 in which described embodiments, techniques, and technologies may be implemented. For example, the computing environment 1900 can implement receiving input video, receiving user input, generating face regions using face detection techniques, generating representations (e.g., initial representations), and replacing background regions to produce modified video, as described above.

The computing environment 1900 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 19, the computing environment 1900 includes at least one central processing unit 1910 and memory 1920. In FIG. 19, this most basic configuration 1930 is included within a dashed line. The central processing unit 1910 executes computer-executable instructions and may be a real or a virtual processor. In a multi-processing system, multiple processing units execute computer-executable instructions to increase processing power and as such, multiple processors can be running simultaneously. The memory 1920 may be volatile memory (e.g., registers, cache, RAM), non-volatile memory (e.g., ROM, EEPROM, flash memory, etc.), or some combination of the two. The memory 1920 stores software 1980, images, and video that can, for example, implement the technologies described herein. A computing environment may have additional features. For example, the computing environment 1900 includes storage 1940, one or more input devices 1950, one or more output devices 1960, and one or more communication connections 1970. An interconnection mechanism (not shown) such as a bus, a controller, or a network, interconnects the components of the computing environment 1900. Typically, operating system software (not shown) provides an operating environment for other software executing in the computing environment 1900, and coordinates activities of the components of the computing environment 1900.

The storage 1940 may be removable or non-removable, and includes magnetic disks, magnetic tapes or cassettes, CD-ROMs, CD-RWs, DVDs, or any other medium which can be used to store information and that can be accessed within the computing environment 1900. The storage 1940 stores instructions for the software 1980 and image data, which can implement technologies described herein.

The input device(s) 1950 may be a touch input device, such as a keyboard, keypad, mouse, touch screen display, pen, or trackball, a voice input device, a scanning device, or another device, that provides input to the computing environment 1900. For audio, the input device(s) 1950 may be a sound card or similar device that accepts audio input in analog or digital form, or a CD-ROM reader that provides audio samples to the computing environment 1900. The output device(s) 1960 may be a display, printer, speaker, CD-writer, or another device that provides output from the computing environment 1900.

The communication connection(s) 1970 enable communication over a communication medium (e.g., a connecting network) to another computing entity. The communication medium conveys information such as computer-executable instructions, compressed graphics information, video, or other data in a modulated data signal.

Some embodiments of the disclosed methods can be performed using computer-executable instructions implementing all or a portion of the disclosed technology in a computing cloud 1990. For example, user input can be received in the computing environment 1930 while producing modified video can be performed on servers located in the computing cloud 1990.

Computer-readable media are any available media that can be accessed within a computing environment 1900. By way of example, and not limitation, with the computing environment 1900, computer-readable media include memory 1920 and/or storage 1940. As should be readily understood, the term computer-readable storage media includes the media for data storage such as memory 1920 and storage 1940, and not transmission media such as modulated data signals.

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

We claim:

1. A method of segmenting input video using a mobile device with a video camera and coupled to a display, the method comprising:
    receiving input generated with the mobile device for positioning an edge segmentation template, the template positioning input being generated by:
        displaying a template superimposed over video displayed on the display, and
        receiving user input for positioning the template relative to the displayed video, the user input including at least one or more of the following: moving the video camera, detecting position and/or movement of the mobile device, or receiving touch screen display input using the display;
    generating a positioned edge segmentation template based at least in part on the user input;
    producing an initial representation for segmenting input video into a plurality of portions, the initial representation being based on the positioned edge segmentation template, the initial representation including weights for one or more regions of the input video to be designated as foreground regions or background regions, at least one of the weights being based on a term selected from the group of terms consisting of color likelihood, spatial prior likelihood, temporal prior likelihood, and motion likelihood; and
    based on the initial representation, segmenting the input video by designating one or more of the portions of the input video as foreground regions or background regions.

2. The method of claim 1, wherein the weights are based on a superpixel-based term that includes superpixel neighbor effects.

3. The method of claim 1, wherein the initial representation represents a plurality of pixels of the input video as a single superpixel.

4. The method of claim 1, wherein the template positioning input is generated by:
    generating one or more face regions for one or more regions of the input video using a camera coupled to the mobile device; and
    positioning the edge segmentation template based at least in part on the face regions.

5. A method, comprising:
    receiving input generated with a mobile device for positioning an edge segmentation template, the input being generated by:
        generating one or more face regions for one or more regions of the input video using a camera coupled to the mobile device, wherein:
            the face regions include a foreground face region and one or more background face regions;

the foreground face region is assigned one or more weights associated with being designated as a portion of the foreground region; and the background face regions are assigned one or more weights associated with being designated as a portion of the background regions; and positioning the edge segmentation template based on the face regions;

producing an initial representation for segmenting input video into a plurality of portions, the initial representation being based on the positioned edge segmentation template, the initial representation including weights for one or more regions of the input video to be designated as foreground regions or background regions; and based on the initial representation, segmenting the input video by designating one or more of the portions of the input video as foreground regions or background regions.

6. The method of claim 1, further comprising generating modified video, the modified video comprising at least some of the designated foreground regions but not comprising at least some portions of the input video not designated as foreground regions.

7. The method of claim 6, further comprising transmitting the modified video for use with a video call application.

8. The method of claim 1, wherein the initial representation is based on a first frame of the input video, and wherein the segmenting comprises designating one or more regions of other frames of the input video, the method further comprising:

periodically repeating the act of producing the initial representation for a different first frame of the input video to produce an updated initial representation; and based on the updated initial representation, repeating the act of segmenting for different other frames of the input video, the different other frames not including the different first frame.

9. The method of claim 8, wherein:

the initial representation represents a subset of one or more but not all pixels of one or more frames of the input video.

10. One or more computer-readable storage media storing computer-readable instructions that when executed by a computer, cause the computer to perform a method, the method comprising:

receiving input generated with the mobile device for positioning an edge segmentation template, the template positioning input being generated by:

displaying a template superimposed over video displayed on the display, and receiving user input for positioning the template relative to the displayed video, the user input including at least one or more of the following: moving the video camera, detecting position and/or movement of the mobile device, or receiving touch screen display input using the display;

generating a positioned edge segmentation template based at least in part on the user input;

producing an initial representation for segmenting input video into a plurality of portions, the initial representation being based on the positioned edge segmentation template, the initial representation including weights for one or more regions of the input video to be designated as foreground regions or background regions at least one of the weights being based on a term selected from the group of terms consisting of color likelihood, spatial prior likelihood, temporal prior likelihood, and motion likelihood; and based on the initial representation, segmenting the input video by designating one or more of the portions of the input video as foreground regions or background regions.

11. A method of designating background regions in a first image selected from a sequence of images, the method comprising:

generating one or more energy terms for the first image based on an edge segmentation template positioned using a mobile device touch screen display, at least one of the energy terms being selected from the group of terms consisting of color likelihood, spatial prior likelihood, temporal prior likelihood, and motion likelihood;

based on the energy terms, designating one or more regions of the first image as background regions; and replacing one or more of the designated background regions of the image with corresponding regions from a different image or video than the first image to produce a modified sequence of images.

12. The method of claim 11, wherein the edge segmentation template is positioned using user input received with the mobile device.

13. The method of claim 11, wherein the edge segmentation template is positioned by detecting one or more faces in at least a portion of input video generated with the mobile device.

14. The method of claim 11, further comprising:

repeating the generating one or more energy terms for a second respective image in the sequence of images, wherein the energy terms are based on a subset of pixels in the second respective image; and repeating the designating, the replacing, and the displaying for a different image than the second respective image.

15. A method of designating background regions in a first image selected from a sequence of images, the method comprising:

generating one or more energy terms for the first image based on an edge segmentation template positioned using a mobile device, the one or more of the energy terms being based on seed regions for a second image in the sequence of images, the seed regions designating one or more pixels of the second image as either a foreground region or a background region based on user input received with the mobile device;

based on the energy terms, designating one or more regions of the first image as background regions; and replacing one or more of the designated background regions of the image with corresponding regions from a different image or video than the first image to produce a modified sequence of images, the replacing the background regions comprising applying a filter to the designated background regions of the image to produce the modified sequence of images, the modified sequence of images comprising one or more regions of the image designated as foreground portions.

16. The method of claim 15, wherein:

the image is comprised of a plurality of pixels; and the acts of generating the seed regions and designating the foreground and background regions are performed using superpixels, each of the superpixels representing two or more of the plurality of pixels, wherein the number of pixels each of the superpixels represents is determined based at least in part on usage of a computing resource associated with the mobile device.

17. A mobile device, comprising:
a video camera operable to produce input video;
a touch screen display for receiving touch screen input and displaying video;
at least one processor coupled to the video camera and the touch screen display;
a communication interface coupled to the at least one processor; and
one or more computer-readable storage media storing computer-readable instructions executable by the at least one processor for transmitting modified video based on the input video, the instructions comprising:
instructions for receiving touch screen input from the touch screen display and designating one or more regions of the input video based on the touch screen input,
instructions for designating one or more regions of a portion of the input video using a representation of a conditional random field (CRF),
instructions for replacing one or more of the designated regions in the input video with corresponding regions from a second image or video to produce the modified video, wherein the replacing is based at least in part on the designated regions, and
instructions for transmitting the modified video using the communication interface.

18. The mobile device of claim 17, wherein the instructions further comprise:
instructions for displaying the input video in a first portion of the touch screen display; and
instructions for displaying the modified video in a second portion of the display, wherein the instructions for displaying the input video and the instructions for displaying the modified video can be executed to display the input video and the modified video concurrently.

19. The method of claim 5, wherein the weights are based on a superpixel-based term that includes superpixel neighbor effects.

20. The method of claim 5, further comprising:
generating modified video, the modified video comprising at least some of the designated foreground regions but not comprising at least some portions of the input video not designated as foreground regions; and
transmitting the modified video.

21. The method of claim 5, wherein:
wherein the initial representation is based on a first frame of the input video; and
the initial representation represents a subset of one or more but not all pixels of one or more frames of the input video.

22. The computer-readable storage media of claim 10, wherein the weights are based on a superpixel-based term that includes superpixel neighbor effects.

23. The computer-readable storage media of claim 10, wherein the initial representation represents a plurality of pixels of the input video as a single superpixel.

24. The computer-readable storage media of claim 10, wherein the input for positioning the edge segmentation template is generated by:
generating one or more face regions for one or more regions of the input video using a camera coupled to the mobile device; and
positioning the edge segmentation template based at least in part on the face regions.

25. The computer-readable storage media of claim 10, wherein the method further comprises generating modified video, the modified video comprising at least some of the designated foreground regions but not comprising at least some portions of the input video not designated as foreground regions.

26. The computer-readable storage media of claim 10, wherein the initial representation represents a subset of one or more but not all pixels of one or more frames of input video.

27. A mobile device, comprising:
a video camera;
a touch screen display configured to receive touch screen input and display video;
at least one processor coupled to the video camera and the touch screen display; and
the one or more computer-readable storage media of claim 10, wherein the method is performed using the video camera, the touch screen display, and the processor.

28. The mobile device of claim 27, wherein the computer-readable storage instructions further comprise:
instructions for receiving input generated with the mobile device for positioning an edge segmentation template, the template positioning input being generated by:
displaying a template superimposed over video displayed on the touch screen display, and
receiving user input for positioning the template relative to video displayed on the touch screen display, the user input including at least one or more of the following:
moving the video camera, detecting position and/or movement of the mobile device, or receiving touch screen display input using the display; and
instructions for generating a positioned edge segmentation template based at least in part on the user input, wherein the representation of the CRF is based at least in part on the positioned edge segmentation template.

29. The mobile device of claim 17, wherein the CRF is based at least in part on a superpixel-based term that includes superpixel neighbor effects.

30. The mobile device of claim 17, wherein the computer-readable storage instructions further comprise:
instructions for positioning the edge segmentation template by generating one or more face regions for one or more regions of the input video using the video camera, wherein the representation of the CRF is based at least in part on the positioned edge segmentation template.

31. A mobile device, comprising:
a video camera operable to produce input video;
at least one processor coupled to the video camera;
a communication interface coupled to the at least one processor; and
one or more computer-readable storage media storing computer-readable instructions executable by the at least one processor for transmitting modified video based on the input video, the instructions comprising:
instructions for generating one or more energy terms for a first image of the input video based on an edge segmentation template positioned using the mobile device, at least one of the energy terms being selected from the group of terms consisting of color likelihood, spatial prior likelihood, temporal prior likelihood, and motion likelihood;
instructions for, based on the energy terms, designating one or more regions of the first image as background regions; and
instructions for replacing one or more of the designated background regions of the image with corresponding regions from a different image or video than the first image to produce a modified sequence of images.

32. The mobile device of claim 31, wherein the edge segmentation template is positioned by detecting one or more faces in at least a portion of input video generated with the mobile device.

33. The mobile device of claim 31, wherein the instructions further comprise:
   instructions for repeating the generating one or more energy terms for a second respective image in at least a portion of input video generated with the mobile device, wherein the energy terms are based on a subset of pixels in the second respective image; and
   instructions for repeating the designating, the replacing, and the displaying for a different image than the second respective image.

34. The mobile device of claim 31, wherein:
   the energy terms are based on seed regions for a second image in the at least a portion of the input video;
   the second image comprises of a plurality of pixels; and
   the seed regions and the designated background regions are generated using superpixels, each of the superpixels representing two or more of the plurality of pixels, wherein the number of pixels one or more of the superpixels represents is determined based at least in part on usage of the processor, the communication interface, or the processor and the communication interface.

35. One or more computer-readable storage media storing computer-readable instructions that when executed by a computer, cause the computer to perform a method of designating background regions in a first image selected from a sequence of images, the method comprising:
   generating one or more energy terms for the first image based on an edge segmentation template positioned using a mobile device touch screen display, at least one of the energy terms being selected from the group of terms consisting of color likelihood, spatial prior likelihood, temporal prior likelihood, and motion likelihood;
   based on the energy terms, designating one or more regions of the first image as background regions; and
   replacing one or more of the designated background regions of the image with corresponding regions from a different image or video than the first image to produce a modified sequence of images.

36. The computer-readable storage media of claim 35, wherein the edge segmentation template is positioned using user input received with the mobile device.

37. The computer-readable storage media of claim 35, wherein the edge segmentation template is positioned by detecting one or more faces in at least a portion of input video generated with the mobile device.

38. The computer-readable storage media of claim 35, wherein the method further comprises:
   repeating the generating one or more energy terms for a second respective image in the sequence of images, wherein the energy terms are based on a subset of pixels in the second respective image; and
   repeating the designating, the replacing, and the displaying for a different image than the second respective image.

* * * * *